US011636686B2

(12) United States Patent
Westmacott et al.

(10) Patent No.: US 11,636,686 B2
(45) Date of Patent: Apr. 25, 2023

(54) STRUCTURE ANNOTATION

(71) Applicant: Five AI Limited, Bristol (GB)

(72) Inventors: Thomas Westmacott, Cambridge (GB); Joel Jakubovic, Cambridge (GB); John Redford, Cambridge (GB); Robert Chandler, Cambridge (GB)

(73) Assignee: Five AI Limited, Bristol (GB)

( * ) Notice: Subject to any disclaimer, the term of this patent is extended or adjusted under 35 U.S.C. 154(b) by 0 days.

(21) Appl. No.: 17/279,784

(22) PCT Filed: Sep. 26, 2019

(86) PCT No.: PCT/EP2019/076091
§ 371 (c)(1),
(2) Date: Mar. 25, 2021

(87) PCT Pub. No.: WO2020/064955
PCT Pub. Date: Apr. 2, 2020

(65) Prior Publication Data
US 2021/0342600 A1   Nov. 4, 2021

(30) Foreign Application Priority Data

Sep. 26, 2018  (GB) ...................................... 1815767
Jul. 19, 2019   (GB) ...................................... 1910382
(Continued)

(51) Int. Cl.
G06V 20/56        (2022.01)
G06T 7/246        (2017.01)
(Continued)

(52) U.S. Cl.
CPC ........... *G06V 20/56* (2022.01); *G06K 9/6257* (2013.01); *G06T 7/251* (2017.01); *G06V 10/225* (2022.01);
(Continued)

(58) Field of Classification Search
CPC ........ G06V 20/40; G06V 20/56; G06V 10/62; G06T 2207/10016
See application file for complete search history.

(56) References Cited

U.S. PATENT DOCUMENTS

2012/0050489 A1   3/2012  Gupta et al.
2015/0086080 A1   3/2015  Stein et al.
(Continued)

FOREIGN PATENT DOCUMENTS

WO    WO 2011/049294 A2    4/2011

OTHER PUBLICATIONS

International Search Report and Written Opinion for International Application No. PCT/EP2019/076091 dated Jan. 15, 2020.
(Continued)

*Primary Examiner* — Sam Bhattacharya
(74) *Attorney, Agent, or Firm* — Greenberg Traurig, LLP; Andrew J. Tibbetts

(57) ABSTRACT

A method of annotating frames of a time sequence of frames captured by at least one travelling vehicle comprises, in a frame processing system: determining a three-dimensional (3D) road model for an area captured in the time sequence of frames; receiving first annotation data denoting a known 3D location of a moving object for a first frame of the time sequence of frames; and automatically generating second annotation data for marking an expected moving object location in at least a second frame of the time sequence of frames, by assuming the moving object moves along an expected path determined from the known 3D location and the 3D road model.

20 Claims, 34 Drawing Sheets

(30) Foreign Application Priority Data

| Jul. 19, 2019 | (GB) | 1910390 |
| Jul. 19, 2019 | (GB) | 1910392 |
| Jul. 19, 2019 | (GB) | 1910395 |

(51) Int. Cl.
  *G06K 9/62* (2022.01)
  *G08G 1/056* (2006.01)
  *G06V 10/22* (2022.01)

(52) U.S. Cl.
  CPC .......... *G08G 1/056* (2013.01); *G06T 2200/04* (2013.01); *G06T 2207/10016* (2013.01); *G06T 2207/30252* (2013.01)

(56) References Cited

U.S. PATENT DOCUMENTS

| 2017/0243083 A1 | 8/2017 | Wang et al. |
| 2018/0239968 A1 | 8/2018 | Gupta et al. |
| 2019/0114921 A1 | 4/2019 | Cazzoli |
| 2021/0049780 A1 | 2/2021 | Westmacot et al. |

OTHER PUBLICATIONS

Roberts et al., A Dataset for Lane Instance Segmentation in Urban Environments. ArXiv preprint arXiv: 1807.01347v2. Aug. 2, 2018;2:1-17.
PCT/EP2019/076091, Jan. 15, 2020, International Search Report and Written Opinion.
International Search Report and Written Opinion for International Application No. PCT/EP2019/056356, dated Jul. 23, 2019.
[No Author Listed], mapillary / OpenSfM. Github. Aug. 11, 2020:3 pages. https://github.com/mapillary/OpenSfM [last accessed Jan. 29, 2021].
[No Author Listed], TuSimple / tusimple-benchmark. Github. Jul. 17, 2017:5 pages. https://github.com/TuSimple/tusimple-benchmark/tree/master/doc/lane detection [last accessed Jan. 29, 2021].
Aly, Real time detection of lane markers in urban streets. 2008 IEEE Intelligent Vehicles Symposium Jun. 4, 2008:7-12.
Badrinarayanan et al., Segnet: A deep convolutional encoder-decoder architecture for image segmentation. IEEE transactions on pattern analysis and machine intelligence. Jan. 2, 2017;39(12):2481-95.
Barnes et al., Find your own way: Weakly-supervised segmentation of path proposals for urban autonomy. 2017 IEEE International Conference on Robotics and Automation (ICRA). May 29, 2017:203-10.
Borkar et al., A novel lane detection system with efficient ground truth generation. IEEE Transactions on Intelligent Transportation Systems. Dec. 8, 2011;13(1):365-74.
Brostow et al., Segmentation and recognition using structure from motion point clouds. European conference on computer vision. Oct. 12, 2008:44-57.
Brostow et al., Semantic object classes in video: A high-definition ground truth database. Pattern Recognition Letters. Jan. 15, 2009;30(2):88-97.
Cordts et al., The cityscapes dataset for semantic urban scene understanding. Proceedings of the IEEE conference on computer vision and pattern recognition. 2016:3213-3223.
Fritsch et al., A new performance measure and evaluation benchmark for road detection algorithms. 16th International IEEE Conference on Intelligent Transportation Systems (ITSC 2013). Oct. 6, 2013:1693-1700.
Gaidon et al., Virtual worlds as proxy for multi-object tracking analysis. Proceedings of the IEEE conference on computer vision and pattern recognition. 2016:4340-4349.
Gopalan et al., A learning approach towards detection and tracking of lane markings. IEEE Transactions on Intelligent Transportation Systems. Feb. 17, 2012;13(3):1088-98.
Hillel et al., Recent progress in road and lane detection: a survey. Machine vision and applications. Apr. 2014;25(3):727-45.
Huval et al., An empirical evaluation of deep learning on highway driving. ArXiv preprint arXiv:1504.01716v3. Apr. 17, 2015;3:1-7.
Kim, Robust lane detection and tracking in challenging scenarios. IEEE Transactions on Intelligent Transportation Systems. Feb. 26, 2008;9(1):16-26.
Laddha et al., Map-supervised road detection. 2016 IEEE Intelligent Vehicles Symposium (IV). Jun. 19, 2016:118-123.
Leibe et al., Dynamic 3d scene analysis from a moving vehicle. 2007 IEEE Conference on Computer Vision and Pattern Recognition. Jun. 17, 2007:1-8.
Li et al., Deep neural network for structural prediction and lane detection in traffic scene. IEEE transactions on neural networks and learning systems. Feb. 16, 2016;28(3):690-703.
Mathibela et al., Reading the road: Road marking classification and interpretation. IEEE Transactions on Intelligent Transportation Systems. Mar. 5, 2015;16(4):2072-81.
McCall et al., Video-based lane estimation and tracking for driver assistance: survey, system, and evaluation. IEEE transactions on intelligent transportation systems. Mar. 6, 2006;7(1):20-37.
Neuhold et al., The mapillary vistas dataset for semantic understanding of street scenes. Proceedings of the IEEE International Conference on Computer Vision. 2017:4990-4999.
Neven et al., Towards end-to-end lane detection: an instance segmentation approach. ArXiv preprint arXiv: 1802.05591v1. Feb. 15, 2018:1-7.
Oliveira et al., Efficient deep models for monocular road segmentation. 2016 IEEE/RSJ International Conference on Intelligent Robots and Systems (IROS). Oct. 2016:4885-4891.
Richter et al., Playing for data: Ground truth from computer games. ArXiv preprint arXiv:1608.02192v1. Aug. 7, 2016;1:1-16.
Ros et al., The synthia dataset: A large collection of synthetic images for semantic segmentation of urban scenes. Proceedings of the IEEE conference on computer vision and pattern recognition. 2016:3234-3243.
Scharwächter et al., Efficient multi-cue scene segmentation. German Conference on Pattern Recognition Sep. 3, 2013:435-445.
Sengupta et al., Automatic dense visual semantic mapping from street-level imagery. 2012 IEEE/RSJ International Conference on Intelligent Robots and Systems. Oct. 7, 2012:857-862.
Tang et al., From one to many: Unsupervised traversable area segmentation in off-road environment. 2017 IEEE International Conference on Robotics and Biomimetics (ROBIO). Dec. 5, 2017:787-92.
Xie et al., Semantic instance annotation of street scenes by 3d to 2d label transfer. Proceedings of the IEEE Conference on Computer Vision and Pattern Recognition. 2016:3688-3697.
Zhang et al., Annotating and navigating tourist videos. Proceedings of the 18th SIGSPATIAL International Conference on Advances in Geographic Information Systems. Nov. 2, 2010:260-69.
U.S. Appl. No. 16/980,356, filed Sep. 11, 2020, Westmacott et al.
PCT/EP2019/056356, Jul. .23, 2019, International Search Report and Written Opinion.
Examination Report in Indian Patent Application 202017043356; By: Akshay Kumar; dated May 31, 2022 (6 pages).
European Office Action in EP 197826279.0 dated Feb. 9, 2023. (6 pages).
Yu et al., "BDD100K: A Diverse Driving Video Database with Scalable Annotation Tooling," Published May 12, 2018. (16 pages).

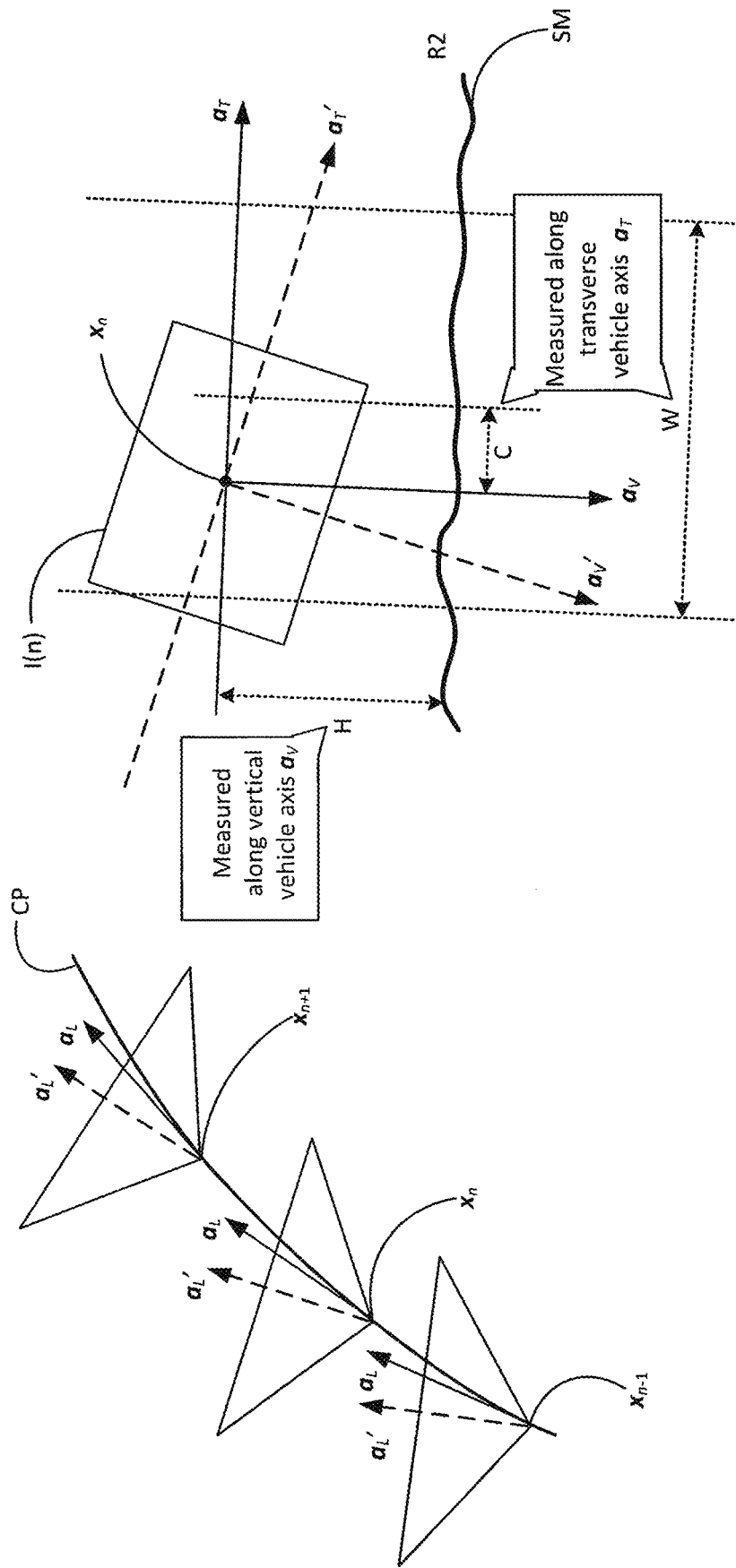

STRUCTURE ANNOTATION

RELATED APPLICATIONS

This application is a national stage filing under 35 U.S.C. § 371 of International Patent Application Serial No. PCT/EP2019/076091, filed Sep. 26, 2019, which claims priority to United Kingdom patent application number GB 1910382.9, filed Jul. 19, 2019; to United Kingdom patent application number GB 1910395.1, filed Jul. 19, 2019; to United Kingdom patent application number GB 1910390.2, filed Jul. 19, 2019; to United Kingdom patent application number GB 1910392.8, filed Jul. 19, 2019; and to United Kingdom patent application number GB 1815767.7, filed Sep. 26, 2018. Each of the foregoing applications is incorporated by reference herein in its entirety.

TECHNICAL FIELD

This disclosure relates to structure annotation, such as the creation of annotated road images which can be used (among other things) for training a machine learning object detection component.

BACKGROUND

A rapidly emerging technology is autonomous vehicles (AVs) that can navigate by themselves on urban and other roads. Such vehicles must not only perform complex manoeuvres among people and other vehicles, but they must often do so while guaranteeing stringent constraints on the probability of adverse events occurring, such as collision with these other agents in the environments. In order for an AV to plan safely, it is crucial that it is able to observe its environment accurately and reliably. This includes the need for accurate and reliable detection of road structure in the vicinity of the vehicle.

Hence, in the field of autonomous driving a common requirement is to have a structure detection component (also referred to as a machine vision component) that when given a visual input can determine real-world structure, such as road or lane structure, e.g. which part of the image is road surface, which part of the image makes up lanes on the road, etc.

This is frequently implemented with machine learning using convolutional neural networks. Such networks require large numbers of training images. These training images are like the images that will be seen from cameras in the autonomous vehicle, but they have been annotated with the information that the neural network is required to learn. For example, they will have annotation that marks which pixels on the image are the road surface and/or which pixels of the image belong to lanes. At training time, the network is presented with thousands, or preferably hundreds of thousands, of such annotated images and learns itself what features of the image indicate that a pixel is road surface or part of a lane. At run time, the network can then make this determination on its own with images it has never seen before, i.e. which it has not encountered during training.

The conventional technique for creating the annotated training images is to have humans manually hand annotate the images. This can take tens of minutes per image (and thus incur very significant time significant costs to obtain the large number of images that are required). Creating hundreds of thousands of training images using this manual process requires significant manual effort, which in turn makes it a costly exercise. In practice, it imposes a limit on the number of training images that can realistically be provided, which in turn can be detrimental to the performance of the trained structure detection component.

An autonomous vehicle, also known as a self-driving vehicle, refers to a vehicle which has a sensor system for monitoring its external environment and a control system that is capable of making and implementing driving decisions automatically using those sensors. This includes in particular the ability to automatically adapt the vehicle's speed and direction of travel based on inputs from the sensor system. A fully autonomous or "driverless" vehicle has sufficient decision-making capability to operate without any input from a human driver. However the term autonomous vehicle as used herein also applies to semi-autonomous vehicles, which have more limited autonomous decision-making capability and therefore still require a degree of oversight from a human driver.

SUMMARY

A core problem addressed herein is that of quickly and efficiently but, nonetheless, accurately annotating road images, where the annotations denote visual road structure. Such images can for example be used to prepare a very large training set of annotated road images suitable for training a convolutional neural network (CNN) or other state-of-the-art machine learning (ML) structure detection component.

Aspect of the present disclosure relate to technology that allows large numbers of road images to be annotated quickly in a semi-automated fashion.

The technology allows large numbers of training images to be generated more efficiently and quickly than such manual annotation, by removing or at least significantly reducing the need for human effort.

The performance of such trained structure detection components has a strong dependence on both the quality and the size of the training set. The ability to generate large training sets of accurately annotated road images, of a size which simply may not be practical using conventional annotation, in turn means that it is possible to increase the accuracy of the trained structure detection component when applied (at run time) to images it has not encountered in training.

A first aspect of the invention provides a method of annotating frames of a time sequence of frames captured by at least one travelling vehicle, the method comprising, in a frame processing system: determining a three-dimensional (3D) road model for an area captured in the time sequence of frames; receiving first annotation data denoting a known 3D location of a moving object for a first frame of the time sequence of frames; and automatically generating second annotation data for marking an expected moving object location in at least a second frame of the time sequence of frames, by assuming the moving object moves along an expected path determined from the known 3D location and the 3D road model.

The terms "frame" and "other frame" may be used interchangeably with the terms "first frame" and "second frame" respectively. Likewise, the terms "annotation data" and "further annotation data" may be used interchangeably with "first annotation data" and "second annotation data. The terms image and frame are used interchangeably, and are used in a broad sense to cover any 2D or 3D structure representation (including point clouds, RGBD images etc.). The term 2D image may be used to specifically refer to e.g. RGB images and the like.

A second aspect of the invention provides a method of annotating road images, the method comprising the following steps, implemented in an image processing system:

receiving a time sequence of images as captured by an image capture device of a travelling vehicle;

determining a three-dimensional (3D) road model for an area captured in the time sequence of images;

receiving annotation data denoting a known location of a moving object in at least one image of the time sequence of images;

automatically generating further annotation data for marking an expected moving object location in at least another image of the time sequence of images, by assuming the moving object moves along an expected path determined from the known location and the 3D road model.

The invention has particular benefits in the context of annotating 2D images based on a 3D road model. The efficiency in this context stems from the use of an object annotation element (e.g. a cuboid or other 3D volume) in 3D space, which is then geometrically projected back into the respective image planes of the 2D images to generate 2D annotation data for the moving object. Provided the location and movement of the object annotation element is accurately captured, this greatly reduces the manual annotation burden.

To account for movement of the object between images, the object annotation element may be moved in 3D space on the assumption that it follows a road shape of the 3D road model (i.e. such that the expected path matches the road shape). In order to do so, the location of the 3D object annotation element in 3D space needs to be known for at least one of the images. This can be established via manual annotation (i.e. the annotation data denoting the known location may be manually generated), however a problem in this context is that only a single 2D view may be available to an annotator, corresponding to the 2D image plane of the image in question. A problem in this context is that there are too many degrees of freedom in placing the 3D annotation element in 3D space: the 3D annotation element can be placed at multiple locations in 3D space, which will all appear correct when projected back into the image plane of the 2D image, but which give incorrect results when the object annotation element is moved between frames, because the actual starting point of the object in 3D space has not been correctly established.

This can be overcome by incorporating a geometric restriction about an elevation of the object annotation element relative to a road surface of the road model (which may be defined in a direction perpendicular to the road surface). For a moving vehicle, for example, the assumption may be that the moving vehicle sits on the road surface at all times as it moves along the path, e.g. that one or more predetermined reference points of the object annotation element (e.g. the four bottom corners of a cuboid) have a zero or substantially zero vertical separation from the road surface.

In this manner, an annotator can define first (3D) annotation data denoting the known 3D location of the moving object (in 3D space), even in the context of 2D images. That is to say, the geometric restriction that is imposed based on the 3D road model has the benefit of allowing an annotator to accurately locate a 3D annotation in respect of a 2D image, which in turn allows 3D and 2D annotations to be determined automatically for further image(s). For example, the 2D annotation may be determined by projected the automatically-determined 3D annotations into the respective image planes of the further image(s).

That is to say, in embodiments, the further annotation data may be automatically generated by assuming the moving object moves along the expected path at a predetermined elevation (which may be zero) from a road surface of the 3D road model.

Further example embodiments of the first and second aspects are set out below.

The further annotation data may be generated for the other image by moving an object annotation element (e.g. cuboid or other 3D volume) from the known location in 3D space along the expected path to the expected location in 3D space, and geometrically projecting the object annotation element at the expected location into a 2D image plane of the other image.

The known location and the expected location may be such that the predetermined elevation from the road surface is maintained at both of those locations.

The annotation data denoting the known location of the moving object may be generated in response to annotation inputs received at a user interface of the image processing system, wherein the annotation inputs may cause the object annotation element to be moved whilst maintaining the predetermined elevation from the road surface. That is to say, a geometric constraint (restriction) may be imposed such that the annotation object can only be moved by the annotator in the plane of the road, such that the predetermined elevation is maintained at all times.

The annotation data may be generated in response to the annotation inputs by geometrically projecting the object annotation element into a 2D image plane of the image. The annotation data may be displayed with the image (e.g. overlaid on the image), and updated as the annotation inputs are received, so that an annotator can see when the object annotation element has been correctly located based on the 2D projection, i.e. so that he can see when the known location has been accurately established (and where applicable that the annotation element has correctly sized and shaped etc.) relative to the image. The geometric constraints that are built in allow the annotator to accurately establish the correct known location in 3D space using only the 2D projection into the image plane of the image in question.

Preferably the expected road model is determined by reconstructing a path travelled by the vehicle whilst capturing the time sequences of images. That is, the 3D road model may exhibit a road shape that corresponds to the shape of the reconstructed vehicle path (i.e. the expected road shape may be a shape of the reconstructed vehicle path).

Further example embodiments are set out below. These are framed in the context of the first aspect, but those same features can also be applied in any of the other aspects set out herein, unless otherwise indicated.

The frames may be 2D images.

The 3D location of the moving object may be determined for the first frame based on an imposed geometric restriction on an elevation of the known 3D location relative to a road surface of the 3D road model.

The geometric restriction may restrict the known 3D location to a predetermined zero or non-zero elevation relative to the road surface of the 3D road model.

A 3D annotation element may be located at an initial 3D location, the 3D annotation element may be geometrically projected into the image plane of the first frame, and the 3D location may be adjusted whilst said geometric restriction is maintained to match the projection of the 3D annotation element to the moving object in the first frame, thereby determining the known 3D location of the moving object.

The 3D location may be manually adjusted to manually match the projection to the moving object in the image plane whilst maintaining said geometric restriction.

The second annotation data may be determined by transforming the 3D annotation element to move it along the expected path to the expected moving object location in 3D space.

The second annotation data may comprise 2D annotation data for marking the expected moving object location in the image plane of the second frame, the 2D annotation data determined by projecting the 3D annotation element at the expected moving object location into the image plane of the second frame.

First 2D annotation data may be determined for the first frame by projecting the 3D annotation element at the known 3D location into the image plane of the first frame.

The expected path may be determined based on a speed of the moving object and a time interval between the first and second frames.

The speed may be assumed to match a speed of the travelling vehicle.

An additional known 3D location of the moving object may be determined for a third of the frames, and the known 3D location and the additional known 3D location may be used to estimate the speed based on a time interval between the first and third frames.

The expected road model may be determined by reconstructing a path travelled by the vehicle whilst capturing the time sequences of images, the 3D road model exhibiting a road shape that corresponds to the shape of the reconstructed vehicle path.

The path may be reconstructed by processing the time sequence of frames.

Alternatively or additionally, the path may be determined from satellite positioning data or other sensor data captured simultaneously with the frames.

The expected path of the moving object may be defined as having zero vertical offset from the reconstructed vehicle path in the direction of a road surface normal.

The expected path of the moving vehicle may be defined as having a fixed lateral offset from the reconstructed vehicle path.

A direction of movement may be inferred for the moving object based on its location relative to a road structure of the 3D road model—e.g. its position may be used to infer whether it is part of the same traffic flow (moving in the same direction), or an oncoming traffic flow (moving in the opposite direction).

The method may further comprise generating classification data for classifying the frames based on a location of the moving object therein relative to road structure of the 3D road model.

The classified frames may be used for validation of a machine learning model.

Alternatively or additionally, the annotated frames may be used to train a machine learning model in a supervised training process.

Location data captured in association with the time sequence of frames may be used to match the time sequence of frames to an area of a map in order to determine a road shape for the 3D road model.

The second annotation data may take the form of a 3D annotation element located at the expected moving object location in 3D space.

As an alternative to 2D images, the frames may be 3D frames. All of the above disclosure applies equally to such frames, unless others indicated. All description herein of 2D images applies equally to other types of frame, unless context demands otherwise.

Each 3D frames may comprise at least one of a depth map and a point cloud.

The 3D annotation element may be a 3D bounding box. Alternatively, the 3D annotation element may be a 3D model.

The 3D model may be derived from one or more of the 3D frames.

Further examples embodiments are set out below, framed in the context of the second aspect. However, the teaching applies equally to any other aspect or embodiment set out herein.

The second annotation may comprise 2D annotation data generated by moving an object annotation element from the known location in 3D space along the expected path to the expected location in 3D space, and geometrically projecting the object annotation element at the expected location into a 2D image plane of the second frame.

The known location and the expected location may be such that a predetermined zero or non-zero elevation from the road surface is maintained at both of those locations.

The annotation data denoting the known location of the moving object may be generated in response to annotation inputs received at a user interface of the image processing system, wherein the annotation inputs may cause the object annotation element to be moved whilst maintaining the predetermined elevation from the road surface.

The annotation data may be generated in response to the annotation inputs by geometrically projecting the object annotation element into a 2D image plane of the image.

The annotation data may be overlaid on or otherwise displayed with the image, and updated as the annotation inputs are received, so that an annotator can see when the object annotation element has been correctly located based on the projection of the 2D annotation element displayed with the image.

The annotation data may be generated in response to annotation inputs received at a user interface of the image processing system.

The further annotation data may be generated in dependence on an expected speed of the moving object along the expected path.

The expected speed of the moving object may be assumed to match a speed of the travelling vehicle.

The annotation data may denote respective known locations of the moving object in at least two of the images, and the expected speed of the moving object may be determined based thereon.

For images between the two images in the sequence, moving object locations may be interpolated along the expected path based on the expected speed for generating further annotation data for those images.

The above description applies equally to frames other than 2D images, unless context demands otherwise.

The path may be reconstructed by processing the time series (sequence) of images.

The expected path of the moving object may be defined as having zero vertical offset from the reconstructed vehicle path in the direction of a road surface normal.

The road surface normal may be determined by processing the time sequence of images.

The expected path of the moving vehicle may be defined as having a fixed lateral offset from the reconstructed vehicle path.

The annotation data may be generated in response to annotation inputs received at a user interface of the image processing system.

The further annotation data may be generated in dependence on an expected speed of the moving object along the expected path.

The expected speed of the moving object may be assumed to match a speed of the travelling vehicle.

Alternatively, the annotation data may denote respective known locations of the moving object in at least two of the images, and the expected speed of the moving object may be determined based thereon. In that case, the at least two images can each be manually annotated as set out above.

For images between the two images in the sequence, moving object locations may be interpolated along the expected path based on the expected speed for generating the further annotation data for those images.

A direction of movement may be inferred for the moving object based on its location relative to road structure of the 3D road model.

The method may further comprise generating classification data for classifying the images based on a location of the moving object therein relative to road structure of the 3D road model. The classified images can for example be used as a basis for Ml validation, as described later.

It is also noted that, whilst a reconstructed vehicle path can be used to infer an expected road shape, the knowledge of the expected road shape can come from any source. For example, location data captured in association with the time series of images may be used to match the time series of images to an area of a map (such as an HD map), in order to determine the expected road shape from the map. In general, the expected path of the moving object can be assumed to match the expected road shape, however that knowledge is obtained.

Object detection can take various form such as bounding box detection, image segmentation in relation to object classes etc. As will be appreciated, in a ML training context, the form of object detection to be learned determines the form of the annotation data to be generated for training images.

Another aspect of the invention provides a method of annotating road images, the method comprising the following steps, implemented in an image processing system:

receiving a time sequence of images as captured by an image capture device of travelling vehicle;

processing the images to reconstruct, in three-dimensional space, a path travelled by the vehicle;

receiving annotation data denoting a known location of a moving object in at least one image of the time sequence of images;

using the known location and the reconstructed vehicle path to automatically generate further annotation data for marking an expected location of the moving object in at least another image of the time sequence of images, by assuming the moving object moves along an expected path determined from the known location and the reconstructed vehicle path.

The road images may be street scene images.

A further aspect of the invention provides a method of annotating frames of a time sequence of frames captured by at least one travelling vehicle, the method comprising, in a frame processing system: determining a three-dimensional (3D) road model for an area captured in the time sequence of frames; and generating annotation data for marking a 3D object location in at least one frame of the time sequence of frames, the annotation data generated based on user inputs received at a user interface of the frame processing system for moving the object location in 3D space subject to an imposed geometric restriction on an elevation of the 3D object location relative to a road surface of the 3D road model.

The geometric restriction may restrict the known 3D location to a predetermined zero or non-zero elevation relative to the road surface of the 3D road model.

A 3D annotation element may be located at an initial 3D location, the 3D annotation element is geometrically projected into the image plane of the first frame, and the 3D location may be adjusted whilst said geometric restriction is maintained to match the projection of the 3D annotation element to the moving object in the first frame, thereby determining the known 3D location of the moving object.

The annotation data may comprise 2D annotation data generated by projecting a 3D annotation element at the determined 3D object location into an image plane of the frame.

The expected road model may be determined by reconstructing a path travelled by the vehicle whilst capturing the time sequences of images, the 3D road model exhibiting a road shape that corresponds to the shape of the reconstructed vehicle path.

Another aspect of the invention provides an image processing computer system comprising one or more processors configured to carry out the above steps, and a computer program comprising executable instructions which, when executed on one or more processors of an image processing computer system, cause the computer system to carry out the above steps.

A computer program product is provided comprising code stored on: a computer-readable storage medium: and configured, when executed on one or more processors, to implement the method or system of any preceding claim.

Another aspect provides a processing computer system comprising one or more processors configured to carry out any of the above steps.

Another aspect provides a computer program comprising executable instructions which, when executed on one or more processors of a processing computer system, cause the computer system to carry out any of the above steps.

BRIEF DESCRIPTION OF FIGURES

For a better understanding of the present invention, and to show how embodiments of the same may be carried into effect, reference is made to the following Figures by way of non-limiting example in which:

FIG. 10 illustrates certain principles of image-based measurement of an angular orientation of an image capture device;

FIG. 11 illustrates certain principles of image-based measurement of road width;

DETAILED DESCRIPTION

Figure 1:
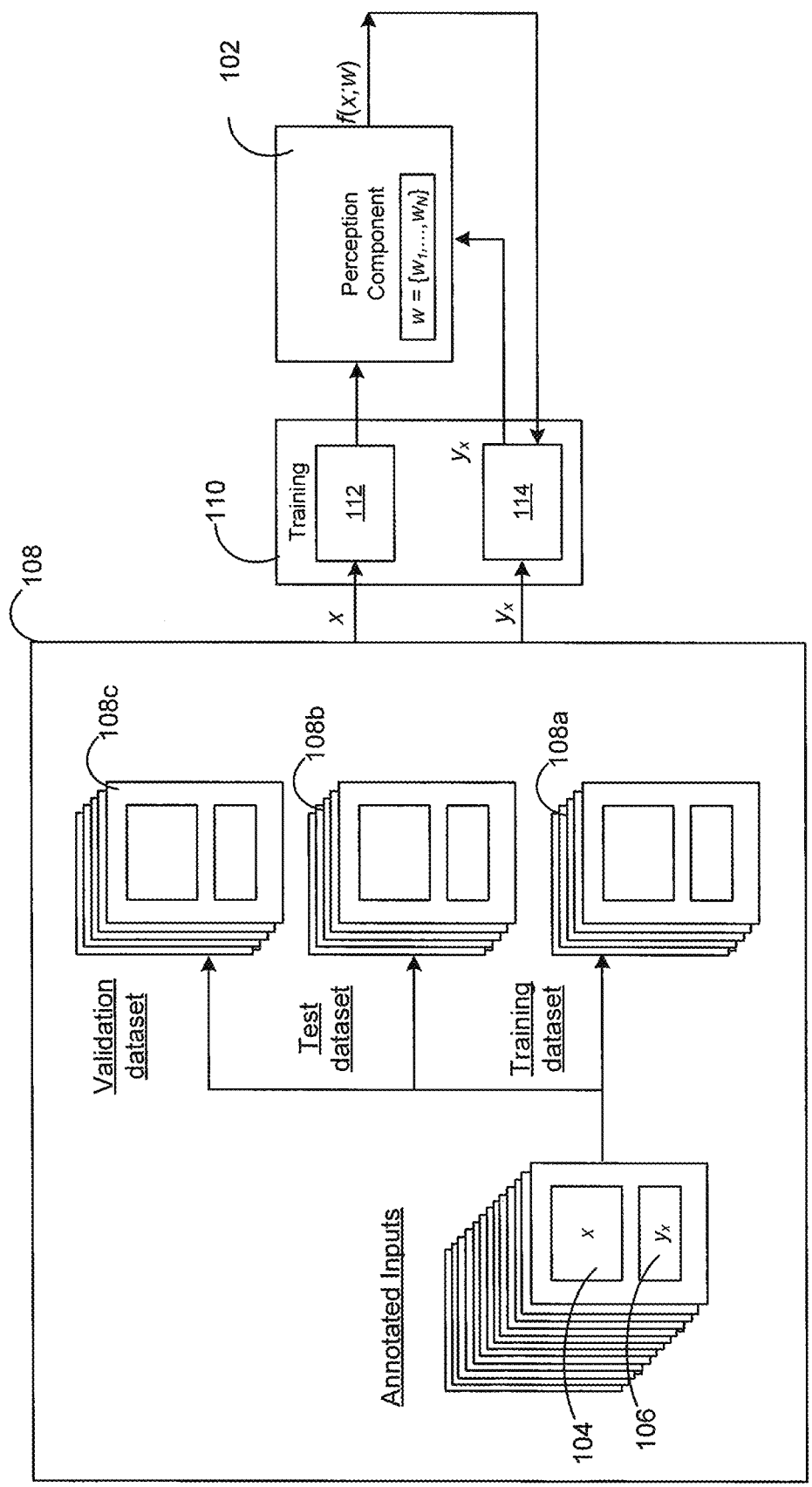
FIG. 1 shows a highly schematic function block diagram of a training system for training a structure detection component.

By way of example, reference is made to International Patent Application No. PCT/EP2019/056356 entitled "Image Annotation" which is incorporated herein by reference in its entirety. This discloses an image processing system in which a 3D path (VP) of a travelling vehicle (ego vehicle) is reconstructed for the purpose of image annotation using simultaneous localization and mapping (SLAM) processing. SLAM processing is applied to images captured by an image capture device (camera) of the vehicle. In processing the images, a respective location of the ego vehicle on the ego vehicle path VP when each of the images was captured is determined (referred to as the capture location of that image).

Further details of the image processing system will now be described to provide relevant context to the embodiments of the invention described below under the heading "ANNOTATING OBJECTS". The present invention uses a 3D road model as a basis for annotating static objects or objects moving between frames. In the embodiments of the invention described below, the 3D road model is inferred from the path of the ego vehicle in 3D space, using the techniques summarized in the preceding paragraph and described. However, the invention is not limited in this respect, and the 3D road model can be determined using other methods (some examples of which are given later).

Image Processing System

Autonomous vehicles require knowledge of the surrounding road layout, which can be predicted by state-of-the-art CNNs. This work addresses the current lack of data for determining lane instances, which are needed for various driving manoeuvres. The main issue is the time-consuming manual labelling process, typically applied per image.

This disclosure recognizes that driving the car is itself a form of annotation. This is leveraged in a semi-automated method that allows for efficient labelling of image sequences by utilising an estimated road plane in 3D and projecting labels from this plane into all images of the sequence. The average labelling time per image is reduced to 5 seconds and only an inexpensive dash-cam is required for data capture.

Autonomous vehicles have the potential to revolutionise urban transport. Mobility will be safer, always available, more reliable and provided at a lower cost.

One important problem is giving the autonomous system knowledge about surrounding space: a self-driving car needs to know the road layout around it in order to make informed driving decisions. This disclosure addresses the problem of detecting driving lane instances from a camera mounted on a vehicle. Separate, space-confined lane instance regions are needed to perform various challenging driving manoeuvres, including lane changing, overtaking and junction crossing.

Typical state-of-the-art CNN models need large amounts of labelled data to detect lane instances reliably. However, few labelled datasets are publicly available, mainly due to the time-consuming annotation process; it takes from several minutes up to more than one hour per image to annotate images completely for semantic segmentation tasks. By contrast, the semi-automated annotation process herein reduces the average time per image to the order of seconds. This speed-up is achieved by (1) noticing that driving the car is itself a form of annotation and that cars mostly travel along lanes, (2) propagating manual label adjustments from a single view to all images of the sequence and (3) accepting non-labelled parts in ambiguous situations.

Some previous work has aimed on creating semi-automated object detections in autonomous driving scenarios. [27] propose to detect and project the future driven path in images, but does not address the problem of lane annotations. This means the path is not adapted to lane widths and crosses over lanes and junctions. Moreover, it requires an expensive sensor suite, which includes calibrated cameras and Lidar. In contrast, the present method is applicable to data from a GPS enabled dash-cam. Contributions of this disclosure include:

A semi-automated annotation method for lane instances in 3D, requiring only inexpensive dash-cam equipment Road surface annotations in dense traffic scenarios despite occlusion Experimental results for road, ego-lane and lane instance segmentation using a CNN A method is described below that provides a fully automatic method of generating training data with only marginally lower quality than the conventional manual process.

An extension to this is also described, which introduces a manual correction ("human fixer") stage. With this extension, the method becomes a semi-automatic method that generates as good quality as the conventional manual method but with order 100 times less human effort, as measured in terms of annotation time per image. This is on the basis of the observation that a typical annotation time—using full manual annotation of the kind currently used at present—can be anything from 7 minutes to 90 minutes per image; whereas, using the method described below, it is possible to achieve an annotation time of around 12 seconds per image.

In the methods described below, the training images are frames of a video image. As will become apparent, the described methods are particularly well suited to batch-annotation of video frames as captured by a moving training vehicle. For a typical training video (formed of a sequence of static 2D images, i.e. frames), it has been possible to achieve an annotation time of 7 minutes per typical training video sequence, which amounts to about 12 seconds per image, whilst still achieving results of good quality.

FIG. 1 shows a highly schematic function block diagram of a supervised training system for training a perception component 102 based on a set of annotated perception inputs 108 (that is, perception inputs together with associated annotation data). The perception component 102 may be referred to synonymously as a structure detector, structure detection component or simply a structure detector in the following description. Perception inputs used for the purpose of training may be referred to herein as training examples or training inputs.

A perception input may be a 2D image, and 2D images annotated with 2D annotation data (e.g. 2D bounding boxed, 2D segmentation maps etc.) may be used to train a 2D perception component such as a 2D object detector, 2D instance segmentation component etc. However, a perception input may also be 3D, i.e. comprise 3D structure data, and 3D structure detector (e.g. 3D bounding box detector, 3D pose estimator, 3D object detector etc.) may be trained using 3D annotation data (such as 3D bounding boxes).

In FIG. 1, a training example is denoted by reference numeral 104 and a set of annotation data associated therewith is denoted by reference numeral 106. The annotation data 106 provides a ground truth for the training example 104 with which it is associated. For example, for a training example in the form of an image, the annotation data 106 may mark the location(s) of certain structure component within the image 104, such as roads, lanes, junctions, non-drivable areas etc. and/or objects within the images, such as other vehicles, pedestrians, street signage or other infrastructure etc.

The annotated perception inputs 108 may be divided into training, test and validation sets, labelled 108a, 108b and 108c respectively. An annotated training example may thus be used for training the perception component 102 without forming part of the training set 108a because it is used for testing or validation instead.

The perception component 102 receives a perception input, denoted x, from one of the training, test and validation sets 108a, 108b, 108c, and processes the perception input x in order to provide a corresponding perception output denoted by $y=f(x;w)$.

In the above, w denotes a set of model parameters (weights) of the perception component 102, and f denotes a function defined by the weights w and the architecture of the perception component 102. For example, in the case of 2D or 3D bounding box detection, the perception output y may comprise one or more detected 2D or 3D bounding boxes derived from the perception input x; in the case of instance segmentation, y may comprise one or more segmentation maps derived from the perception inputs. In general, the format and content of the perception output y depends on the choice of perception component 102 and its chosen architecture, and those choices are, in turn, made in accordance with the desired perception modality or modalities for which it is to be trained.

The detection component 102 is trained based on the perception inputs of the training set 108a so as to match its output $y=f(x)$ to the ground truth provided by the associated annotation data. The ground truth provided for perception input x is denoted $y_x$ herein. So, for the training example 104, the ground truth is proved by the associated annotation data 106.

This is a recursive process, in which an input component 112 of a training system 110 systematically provides perception inputs of the training set 108b to the perception component 102, and a training component 114 of the training system 110 adapts the model parameters w in an attempt to optimize an error (cost) function that penalizes deviation of each perception output $y=f(x;w)$ from the corresponding ground truth $y_x$. That deviation is characterized by a defined metric (such as mean square error, cross-entropy loss etc.). Hence, by optimizing the cost function to a defined extent, an overall error across the training set 108a as measured with respect to the ground truths can be reduced to an acceptable level. The perception component 102 can for example be a convolutional neural network, where the model parameters w are weightings between neurons, but the present disclosure is not limited in this respect. As will be appreciated, there are numerous forms of perception model which may be usefully trained on suitably annotated perception inputs.

The test data 108b is used to minimize over-fitting, which refers to the fact that, beyond a certain point, increasing the accuracy of the detection component 102 on the training dataset 108a is detrimental to its ability to generalize to perception inputs it has not encountered during training. Overfitting can be identified as the point at which increasing the accuracy of the perception component 102 on the training data 108 reduces (or does not increase) its accuracy on the test data, with accuracy being measured in terms of the error function. The aim of training is to minimize the overall error for the training set 108a to the extent it can be minimized without overfitting.

The validation dataset 108c can be used to provide a final assessment of the detection component's performance, if desired.

This description focusses initially on 2D perception inputs, in the form annotated street scene images (also referred to as road images herein). That is, street scene images having associated image 2D annotation data. 3D perception input and 3D annotation data are described later.

The method described below can be used to automatically or semi-automatically generate such annotation data 106, for use in training, testing and/or validation of the detection component 102.

Figure 2:
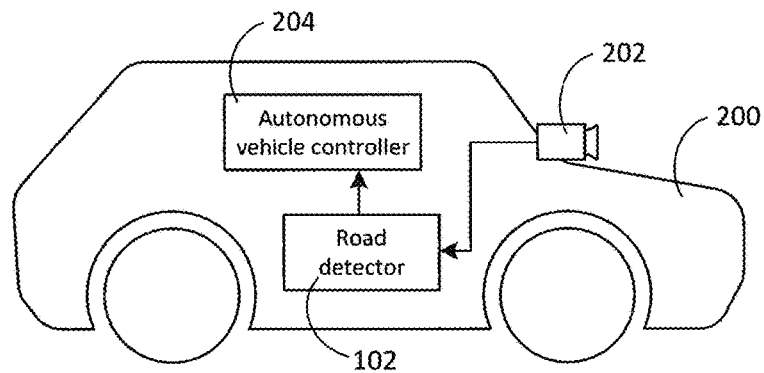
FIG. 2 shows a highly schematic block diagram of an autonomous vehicle.

FIG. 2 shows a highly-schematic block diagram of an autonomous vehicle 200, which is shown to comprise an instance of the trained detection component 102, having an input connected to an image capture device 202 of the vehicle 200 and an output connected to an autonomous vehicle controller 204. In use, the trained structure detection component 102 of the autonomous vehicle 200 detects structure within images captured by the image capture device 102, in real time, in accordance with its training, and the autonomous vehicle controller 204 controls the speed and direction of the vehicle based on the results, with no or limited input from any human.

Although only one image capture device 202 is shown in FIG. 2, the autonomous vehicle could comprise multiple such devices. For example, a pair of image capture devices could be arranged to provide a stereoscopic view, and the road structure detection methods can be applied to the images captured from each of the image capture devices.

As will be appreciated, this is a highly simplified description of certain autonomous vehicle functions. The general principles of autonomous vehicles are known, therefore are not described in further detail.

2 Video Collection

For the purpose of experiments detailed later, videos and associated GPS data were captured with a standard Nextbase 402G Professional dashcam recording at a resolution of 1920×1080 at 30 frames per second and compressed with the H.264 standard (however, any suitable low-cost image capture device could also be used to achieve the same benefits). The camera was mounted on the inside of the car windscreen, roughly along the centre line of the vehicle and approximately aligned with the axis of motion.

Figure 26:
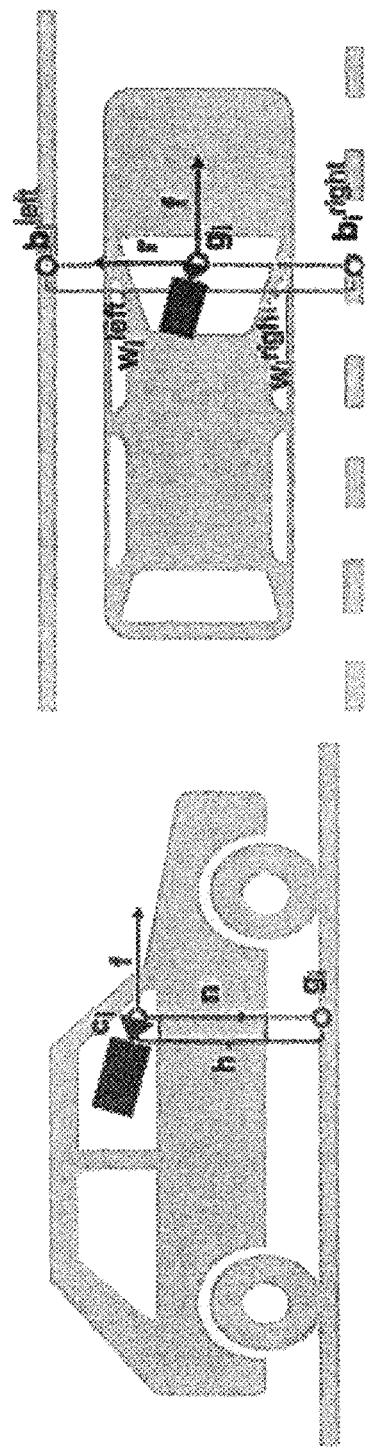
FIG. 26 shows reference points defined relative to an image capture device of a vehicle.

FIG. 26 (top left) shows an example image from the collected data. In order to remove parts where the car moves very slow or stands still (which is common in urban environments), only frames that are at least 1 m apart according to GPS are included. Finally, the recorded data is split into sequences of 200 m in length.

Figure 25:
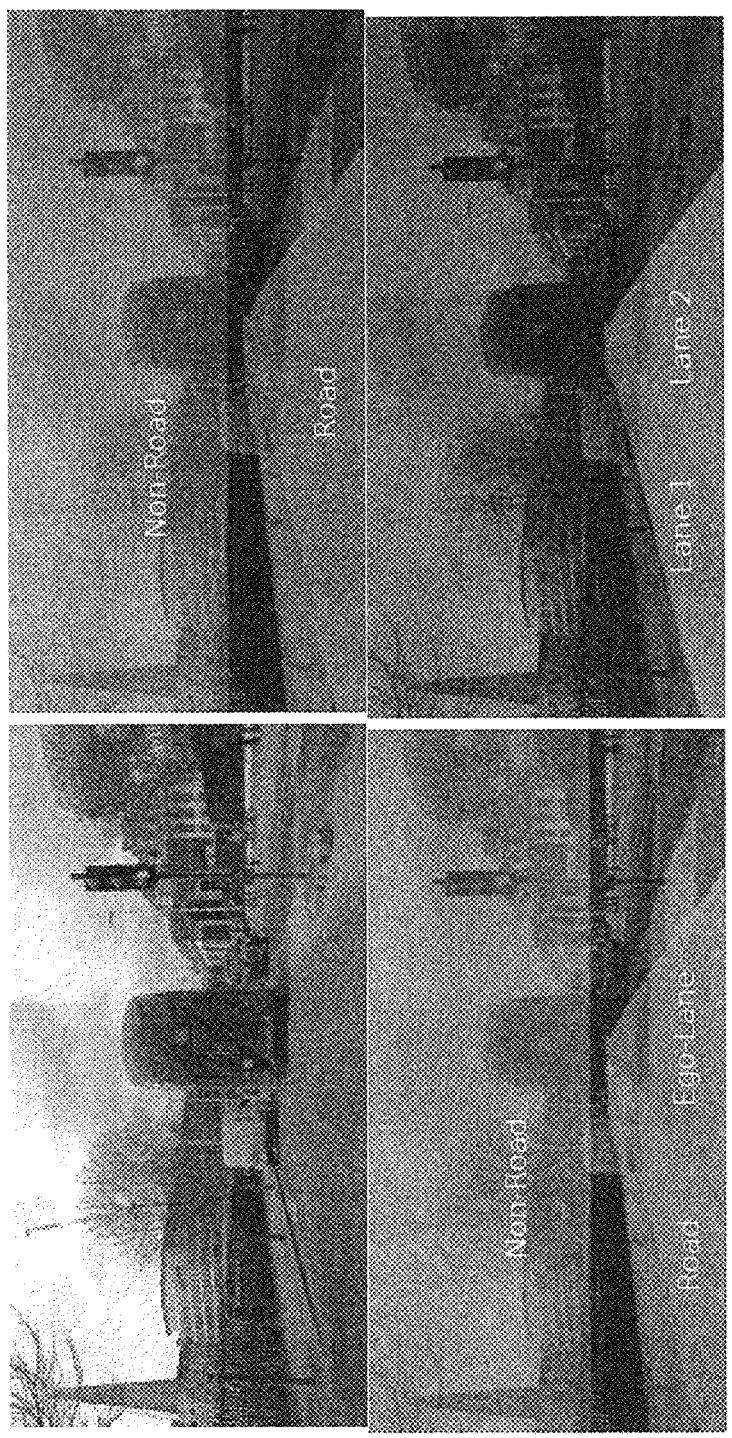
FIG. 25 shows successive annotation applied to a road image.

FIG. 25 shows an example road image (top left), including annotations for road (top right), ego-lane (bottom left) and lane instance (bottom right). Road and lanes below vehicles are annotated despite being occluded. Non-coloured parts have not been annotated, i.e. the class is not known.

Figure 3:
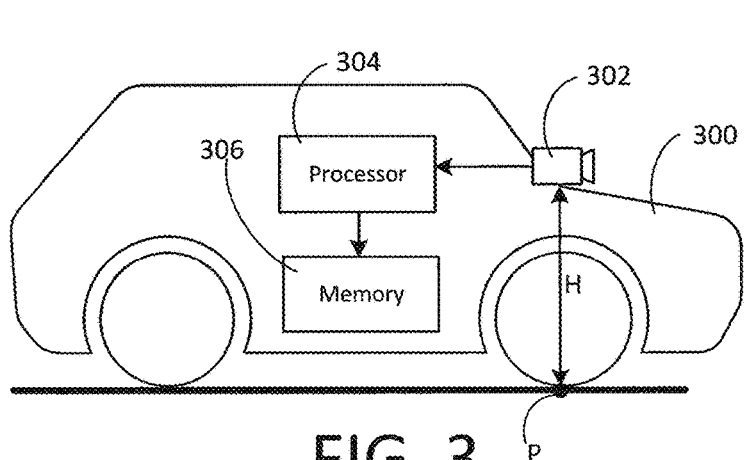
FIG. 3 shows a highly schematic block diagram of a vehicle for capturing road images to be annotated.

FIG. 3 shows a simplified block diagram of a vehicle 300 that can be used to capture road images to be annotated, that is, road images of the kind described above with reference to FIG. 1. Preferably, these images are captured as frames of short video segments recorded as the vehicle 300 drives along a road, in such a way as to allow the path travelled by the vehicle during the recording of each video segment to be reconstructed from the frames of that segment. The vehicle 300 may be referred to as a training vehicle, as a convenient shorthand to distinguish it from the autonomous vehicle 200 of FIG. 2. The training vehicle 300 is shown to comprise an image capture device 302, which can be a forward-facing or rear-facing image capture device, and which is coupled to a processor 304. The processor 304 receives the captured images from the image capture device 302, and stores them in a memory 306, from which they can be retrieved for use in the manner described below.

The vehicle 300 is a car in this example, but it can be any form of vehicle.

Underpinning the invention is an assumption that the path travelled by the human-driven training vehicle 300 extends along a road, and that the location of the road can therefore be inferred from whatever path the training vehicle 300 took. When it comes to annotating a particular image in the captured sequence of training images, it is the hindsight of the path that the training vehicle 300 subsequently took after that image was captured that allows the automatic annotation to be made. In other words, hindsight of the vehicle's behavior after that image was captured is exploited in order to infer the location of the road within the image. The annotated road location is thus a road location that is expected given the path subsequently travelled by the training vehicle 300 and the underlying assumptions about how this relates to the location of the road.

As described in further detail below, the path is determined by processing the captured images themselves. Accordingly, when annotating a particular image with an expected road location, for a forward-facing (resp. rear-facing) image capture device 302, the expected road location in that image is determined from the path travelled by the vehicle after (resp. before) that image was captured, as reconstructed using at least one of the subsequently (resp. previously) captured images in the sequence of captured images. That is, each image that is annotated is annotated using path information derived from one or more of the images captured after (resp. before) the image being annotated.

3 Video Annotation

Figure 27:
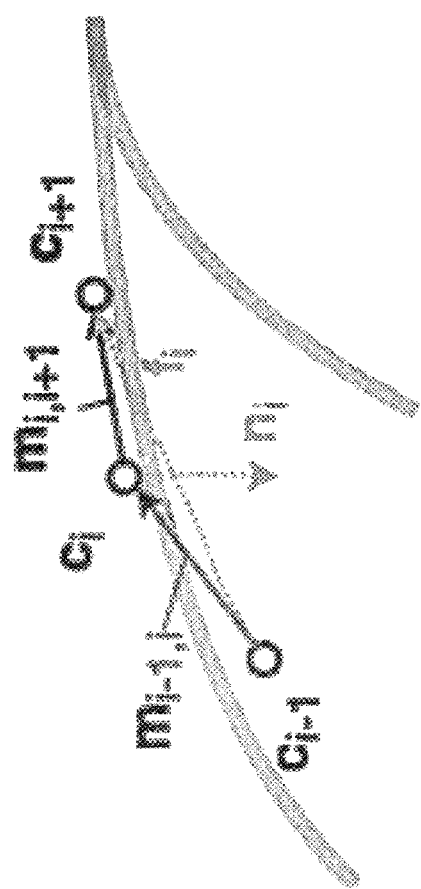
FIG. 27 shows further details of a road normal estimation process.

FIG. 27 shows the principles of the estimation of the lane border points $b_i^{left}$, $b_i^{right}$ at frame i. $c_i$ is the camera position at frame i (obtained via SfM), f is the forward direction and n is the normal vector of the road plane (both relative to the camera orientation), h is the height of the camera above the road, r is the horizontal vector across the lane and $w_i^{left}$, $w_i^{right}$ are the distances to the left and right ego-lane borders.

The initial annotation step is automated and provides an estimate of the road surface in 3D space, along with an estimate for the ego-lane (see Sec. 3.1). Then the estimates are corrected manually and further annotations are added in road surface space. The labels are then projected into the 2D camera views, allowing the annotation of all images in the sequence at once (see Sec. 3.2).

3.1 Automated 3D Ego-Lane Estimation

Given a video sequence of N frames from a camera with unknown intrinsic and extrinsic parameters, the goal is to determine the road surface in 3D and project an estimate of the ego-lane onto this surface. To this end, first OpenSfM [28]—a "structure-from-motion" algorithm—is applied to obtain the 3D camera locations $c_i$ and poses $R_i$ for each frame i∈{1, . . . , N} in a global coordinate system, as well as the camera focal length and distortion parameters.

The road is assumed to be a 2D manifold embedded in the 3D world. Furthermore, the local curvature of the road is low, and thus the orientation of the vehicle wheels provide a good estimate of the local surface gradient. The camera is fixed within the vehicle with a static translation and rotation from the current road plane (i.e. it is assumed the vehicle body follows the road plane and neglect suspension movement). Thus the ground point $g_i$ on the road below the camera at frame i can be calculated as $$g_i = c_i + hR_i n.$$

where h is the height of the camera above the road and n is the surface normal of the road relative to the camera (see FIG. 26, left). The left and right ego-lane borders can then be derived as $$b_i^{left} = g_i + w_i^{left} R_i r$$

$$b_i^{right} = g_i + w_i^{right} R_i r \quad (1)$$

where r is the vector within the road plane, that is perpendicular to the driving direction and $w_i^{left}$, $w_i^{right}$ are the offsets to the left and right ego-lane borders. See FIG. 26 (right) for an illustration. A simplifying assumption is made that the road surface is flat perpendicular to the direction of the car motion (but there is no assumption that the road is flat generally—if the ego path travels over hills, this is captured in the ego path).

Given a frame i, all future lane borders $$b_j (b_j \in \{b_j^{left}, b_j^{right}\} \text{ and } j > i)$$

can be projected into the local coordinate system via $$\hat{b}_j = R_i^{-1}(b_j - c_i) \quad (2)$$

Then the lane annotations can be drawn as polygons of neighbouring future frames, i.e. with the corner points $\hat{b}_j^{left}$, $\hat{b}_j^{right}$, $\hat{b}_{j+1}^{right}$, $\hat{b}_{j+1}^{left}$.

This makes implicitly the assumption that the lane is piece-wise straight and flat between captured images. The following parts describe how to measure or otherwise obtain the following quantities:

$h, n, r, w_i^{left}$ and $w_i^{right}$

Note that h, n and r only need to be estimated once for all sequences with the same camera position.

The camera height above the road ft is easy to measure manually. However, in case this cannot be done (e.g. for dash-cam videos downloaded from the web) it is also possible to obtain the height of the camera using the estimated mesh of the road surface obtained from OpenSfM. A rough estimate for h is sufficient, since it is corrected via manual annotation, see the following section.

FIG. 27 shows the principles of the estimation of the road normal n and forward direction $f_i$ at a single frame i. The final estimate is an aggregate over all frames.

The road normal n is estimated based on the fact that, when the car moves around a turn, the vectors representing its motion m will all lie in the road plane, and thus taking the cross product of them will result in the road normal, see FIG. 27. Let $m_{i,j}$ be the normalised motion vector between frames i and j, i.e.

$$m_{i,j} = \frac{c_j - c_i}{\|c_j - c_i\|}.$$

The estimated road normal at frame i (in camera coordinates) is $n_i = R_i^{-1}(m_{i-1,i} \otimes m_{i,i+1})$, where $\otimes$ denotes the cross-product (see FIG. 27). The quality of this estimate depends highly on the degree of the previous assumptions being correct. To get a more reliable estimate, $n_i$ may be averaged across the journey, and weighted implicitly by the magnitude of the cross product:

$$n = \frac{1}{\sum_{i=2}^{N-2} \|n_i\|} \sum_{i=2}^{N-2} n_i \quad (3)$$

The normal may only be estimated during turns, and thus this weighting scheme emphasises tight turns and ignores straight parts of the journey.

r is perpendicular to the forward direction f and within the road plane, thus $r = f \otimes n \quad (4)$ The only quantity left is f, which can be derived by using the fact that $m_{i-1,i+1}$ is approximately parallel to the tangent at $c_i$, if the rate of turn is low. Thus it is possible to estimate the forward point at frame i $f_i = R_i^{-1} m_{i-1,i+1}$ (see FIG. 27). As for the normal, $f_i$ may be averaged over the journey to get a more reliable estimate:

$$f = \frac{1}{\sum_i a_i} \sum_{i=2}^{N-2} a_i f_i \quad (5)$$

$$a_i = \max(m_{i-1,i}^\top m_{i,i+1}, 0) \quad (6)$$

In this case, the movements are weighted according the inner product in order to up-weight parts with a low rate of turn, while the max assures forward movement.

The quantities $w_i^{left}$ and $w_i^{right}$ are important to get the correct alignment of the annotated lane borders with the visible boundary.

To estimate these, it may be assumed that the ego-lane has a fixed width w and the car has travelled exactly in the centre, i.e.

$w_i^{left} = \frac{1}{2}w$ and $w_i^{right} = -\frac{1}{2}w$ are both constant for all frames. In an extension (see the following section), this assumption is relaxed to get an improved estimate through manual annotation.

Figure 28:
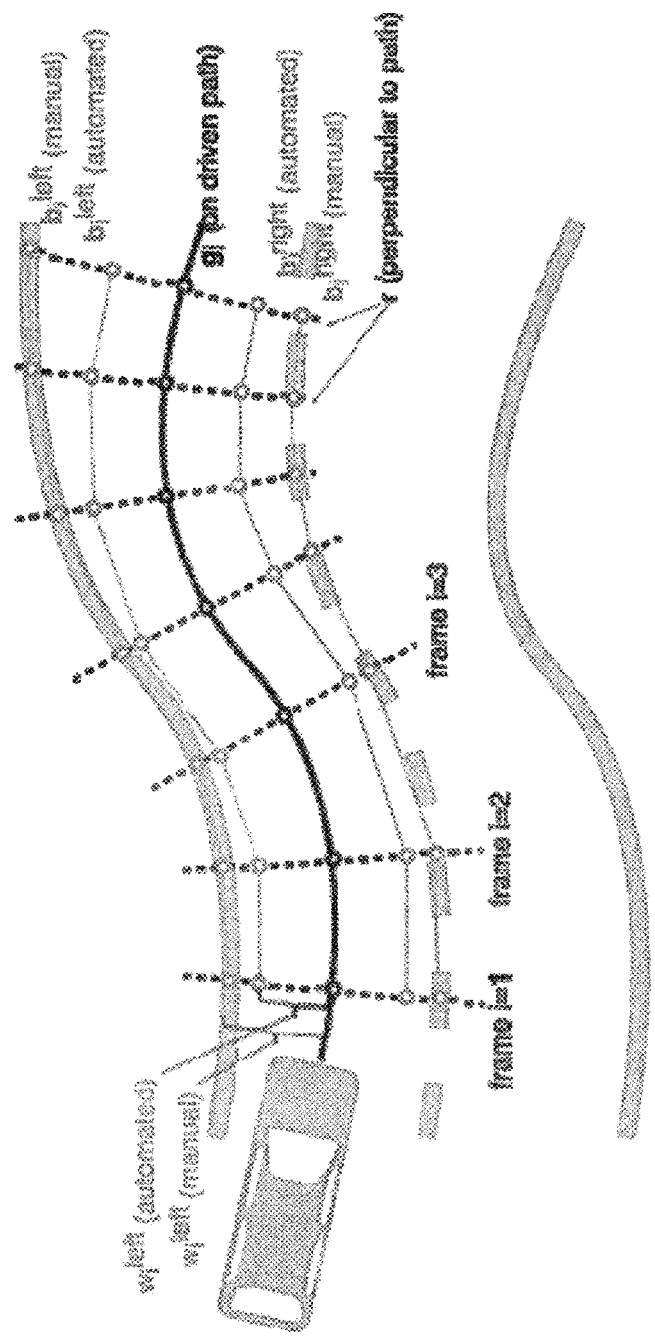
FIG. 28 shows a top-down view of an ego-lane estimate.

In practice, a sequence is selected with a many turns within the road plane to estimate n and a straight sequence to estimate f. Then the same values are re-used for all sequences with the same static camera position. Only the first part of the sequence is annotated, up until 100 m from the end, since otherwise not sufficient future lane border points can be projected. A summary of the automated ego-lane annotation procedure is provided in Annex A (Algorithm 1) and a visualisation of the automated border point estimation is shown in FIG. 28 (see below) and labelled as such.

Further details are described below.

Figure 4:
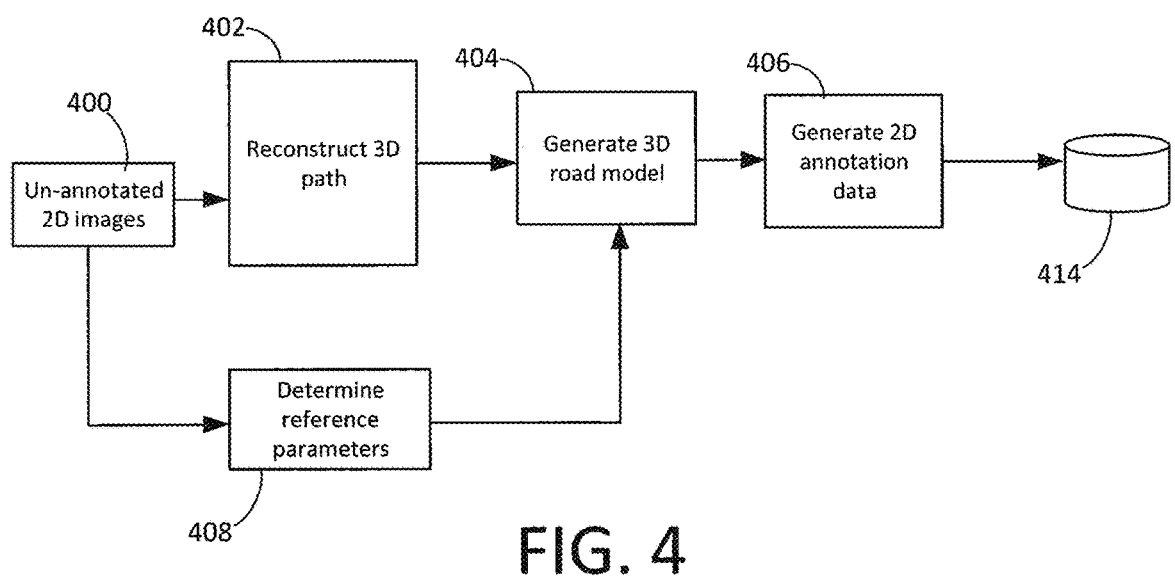
FIG. 4 shows a schematic block diagram of an image processing system.
Figure 4A:
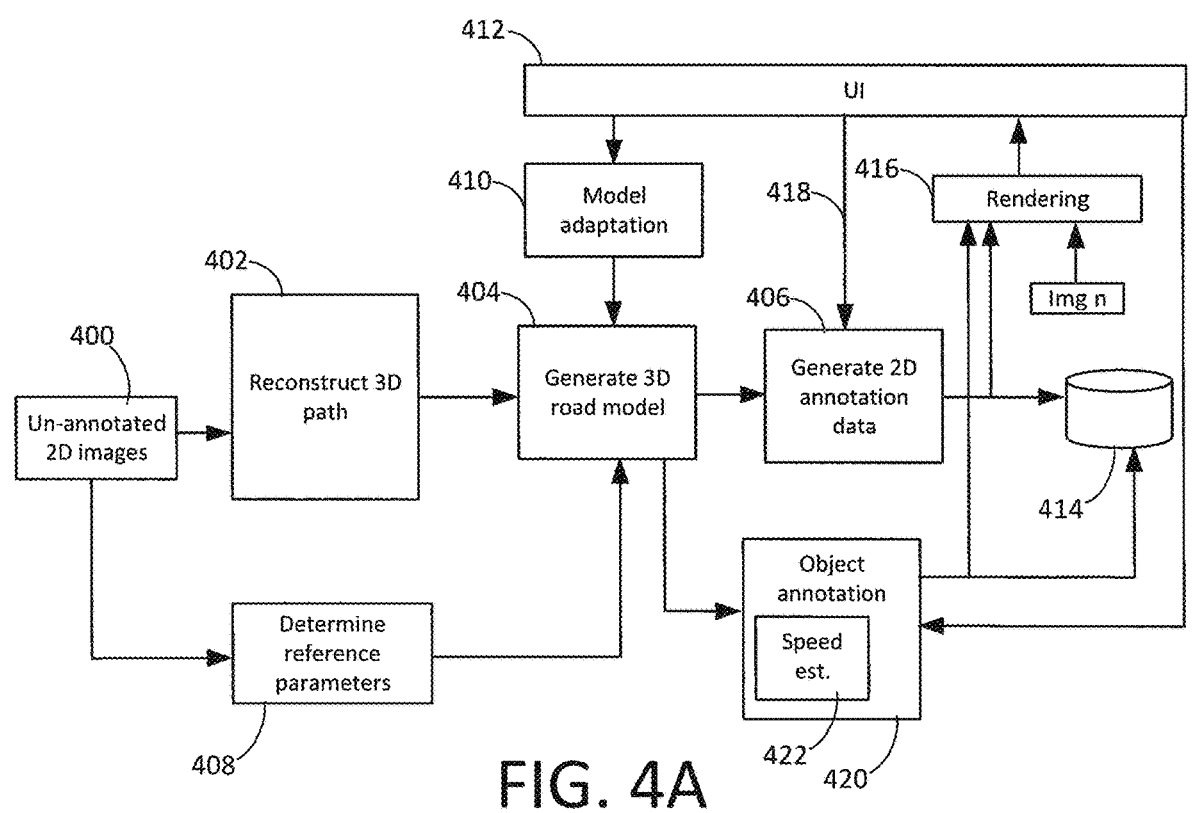
FIG. 4A an extension of the system of FIG. 4.

FIG. 4 shows a schematic block diagram of an image processing system which operates in accordance with the present invention so as to automatically generate annotation data for training images captured in the manner described above with reference to FIG. 3. The annotation data marks expected road locations within the images, where those locations are inferred using the aforementioned assumptions. FIG. 4A shows an extension of this system, which is described below. The system of FIG. 4A includes all of the components of FIG. 4, and all description of FIG. 4A applies equally to FIG. 4A.

Figure 5:
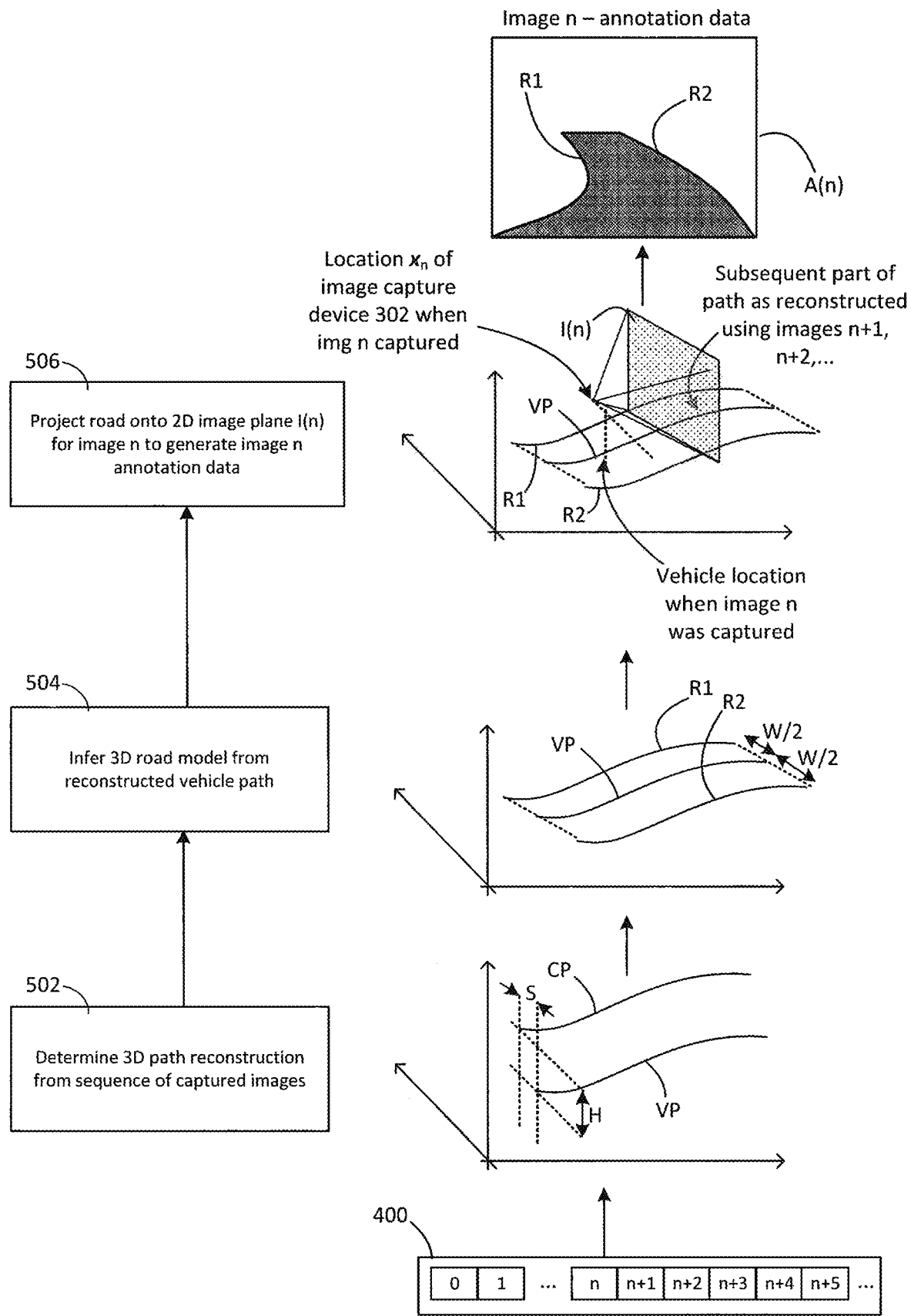
FIG. 5 shows on the left hand side a flowchart for an automatic image annotation process, and on the right hand side an example illustration of the corresponding steps of the method.

FIG. 5 shows on the left hand side a flowchart for the automatic image annotation process implemented by the image capture system, and on the right hand side an example illustration of the corresponding steps.

The image system of FIGS. 4 and 4A and the process of FIG. 5 will now be described in parallel.

The image processing system of FIG. 4 is shown to comprise a path reconstruction component 402, a road modelling component 404 and an image annotation component 406.

The path reconstruction component 402 receives a sequence of captured two-dimensional (2D) images 400 and processes them to create a three-dimensional (3D) reconstruction of the path travelled by the vehicle from the captured sequence of images (Step 502, FIG. 5).

To the right of Step 502, FIG. 5 shows two reconstructed paths in three-dimensional space.

The first path, labelled CP (camera path), is a 3D reconstruction of the path travelled by the image capture device (camera) 302 of the training vehicle 300. Techniques for reconstructing the path travelled by a moving camera from a sequence of images captured by the camera as it moves are known in the art, and are therefore not described in detail herein.

It is possible to recreate the path from other data (accelerometer, highly accurate GPS etc.) however making the reconstruction be only from the video beneficially makes the cost of capturing the data very cheap, due to the fact that even a basic dashcam can be used for data collection, not an expensive car containing expensive accelerometers, expensive accurate GPS etc.

The second path, labelled VP (vehicle path), is a reconstruction of the path travelled by the training vehicle 300, which is defined as the path travelled by a point that lies approximately half way across the width of the training vehicle 300, i.e. equidistant from the right-hand and left-hand sides of the training vehicle, and below the image capture device 300 at approximately road level (labelled P in FIGS. 3 and 3A). That is, at road height and along a center-line (C, FIG. 3A) of the vehicle 300 that extends vertically and lies at the halfway point along the width of the vehicle 300.

Note that it is not essential for these points to be exactly equidistant—the method has been found to give accurate results even when the points are not equidistant.

Figure 3A:
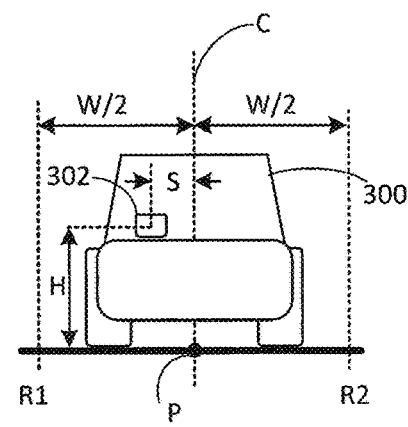
FIG. 3A shows a schematic front-on view of a vehicle.

It is straightforward to determine the vehicle path VP at ground level from the camera path CP if the height of the camera 302 above the surface of the road, labelled H in FIGS. 3, 3A and 5, the horizontal offset of the camera 302 from the center line C, labelled S in FIGS. 3A and 5, and the orientation of the camera relative to the vehicle are known. The relative orientation of the camera can be captured as a "forward point" and "horizon line", as defined below.

Note that the examples shown to the right of FIG. 5 are illustrative, but not exhaustive, and are only intended to illustrate by way of example more general principles according to which the 3D camera path CP can be used to infer the location of road structure, using a small number of reference parameters.

From the 3D path reconstruction, the road modelling component 404 creates a 3D model (602, FIG. 6) of the road the vehicle is assumed to have travelled along (Step 504, FIG. 5).

In the example shown to the right of Step 504, the road model is formed of two geometric curves R1, R2, corresponding to assumed lane boundary locations, which are defined as lying parallel to, and at the same height as, the vehicle path VP, on either side of the vehicle path VP and each at a distance W/2 from it, where W is an assumed road or lane width.

This is based on the assumptions that the training vehicle 300 is travelling along a road lane, the direction of travel of the training vehicle 300 is approximately parallel to the actual lane boundaries of that lane, and that it is driven in approximately the center of the lane.

The expected road locations can for example correspond to an edge of the road itself (so as to mark the road, or the non-drivable area beside the road), or to lane locations of lanes within the road.

In general, the automated annotation techniques can be used to mark the locations of what is referred to herein as "parallel structure", i.e. structure that is expected to run at least approximately parallel to the path driven by the vehicle, or more generally to expected structure that is expected to have a specific orientation relative to the vehicle path. This can be road structure such as roads, lanes, non-drivable areas assumed to lie parallel to the vehicle path, junctions assumed to extend perpendicular to the vehicle path, or real-world parallel structures that might be encountered by vehicles other than cars, such as runways (in the case of autonomous drones, planes etc.) etc. Accordingly, all description of the 3D road model applies equally to any other form 3D structure model of an environment in which the vehicle travelled, for which expected parallel structure can be automatically determined using the methods described herein.

Different assumptions can be used to accommodate different types of parallel structure, on top of the underlying assumption that they lie parallel to the path that was actually travelled by the training vehicle 300.

Herein, the description may make specific reference to roads or lanes, and to related parameters such as road or lane width. However, it will be appreciated that the description applies to any parallel road structure, and that any references to road or lane width (and the like) apply generally to a width parameter determined for the expected parallel structure.

The 3D road model is used by the image annotation component 406 to generate 2D annotation data for marking the individual 2D training images individually with expected road locations (Step 506, FIG. 5).

As illustrated to the right of Step 506 in FIG. 5, the annotation data A(n) for the nth 2D image in the sequence (image n, which can be any image in the sequence of captured training images) is generated by performing a geometric projection of the 3D road model onto the plane of that image, labelled I(n). In this example, this means projecting the 3D road boundaries R1, R2 onto the image plane I(n), such that the projection of those boundaries in the image marks where the road boundaries are assumed to lie in image n.

The image plane I(n) is a plane corresponding to the field of view of the camera 302 when image n was captured, and is thus located at a point corresponding to the location of the vehicle when image n was captured.

A parameter computation component 408 computes various "reference parameters" that are used to construct the 3D model from the reconstructed vehicle path and to perform the geometric projection. These reference parameters comprise the following image capture parameters, relating to the position and orientation of the image capture device 302 of the training vehicle 300:

1) The height H of the camera 302 above the road;
2) The horizontal offset S of the camera from the center line C;
3) The orientation of the camera 302 relative to the vehicle, which can be captured as:
   a. A "forward point" of the camera 302 (as defined below), and
   b. A "horizon line" (as defined below) of the camera;
and additionally:
4) The width W of the road/lane.

These are used in the manner described briefly above, and further details of how they computed are used are described below. For now suffice it to say that these parameters are computed from the captured training images 400 themselves, which has various benefits that are described later.

The annotation data is stored in electronic storage 414, from which it can be accessed or retrieved for use in the training process described above with reference to FIG. 1. In this process, ultimately the automatic structure detection component 102 is learning from the human driver's ability to keep the vehicle 300 in approximately the center of the road most of the time whilst the training images are captured.

3.2 Manual Corrections and Additional Annotations

An annotation interface provides a human annotator with the ability to view the frames in a batch individually with the currently rendered lanes projected into the images. These lanes can be widened, narrowed and moved by the annotator in the most convenient frame and these changes to the lane structure will be projected into all other frames in the batch, providing a clear advantage over annotation of all of the image individually.

FIG. 28 shows a Visualisation of the ego-lane estimate, seen from above. The automated estimate is and manual correction are labelled, respectively, as $$w_i^{left}\text{(automated)}$$

$$w_i^{left}\text{(manual)}$$

Initially, all $w_i^{left}$ and $w_i^{right}$ are set to a constant value, and thus the estimate follows the driven path, but the lane borders are not correctly annotated as can be seen. Then the annotators correct the $w_i^{left}$ and $w_i^{right}$, after which the estimate improves.

Figure 18:
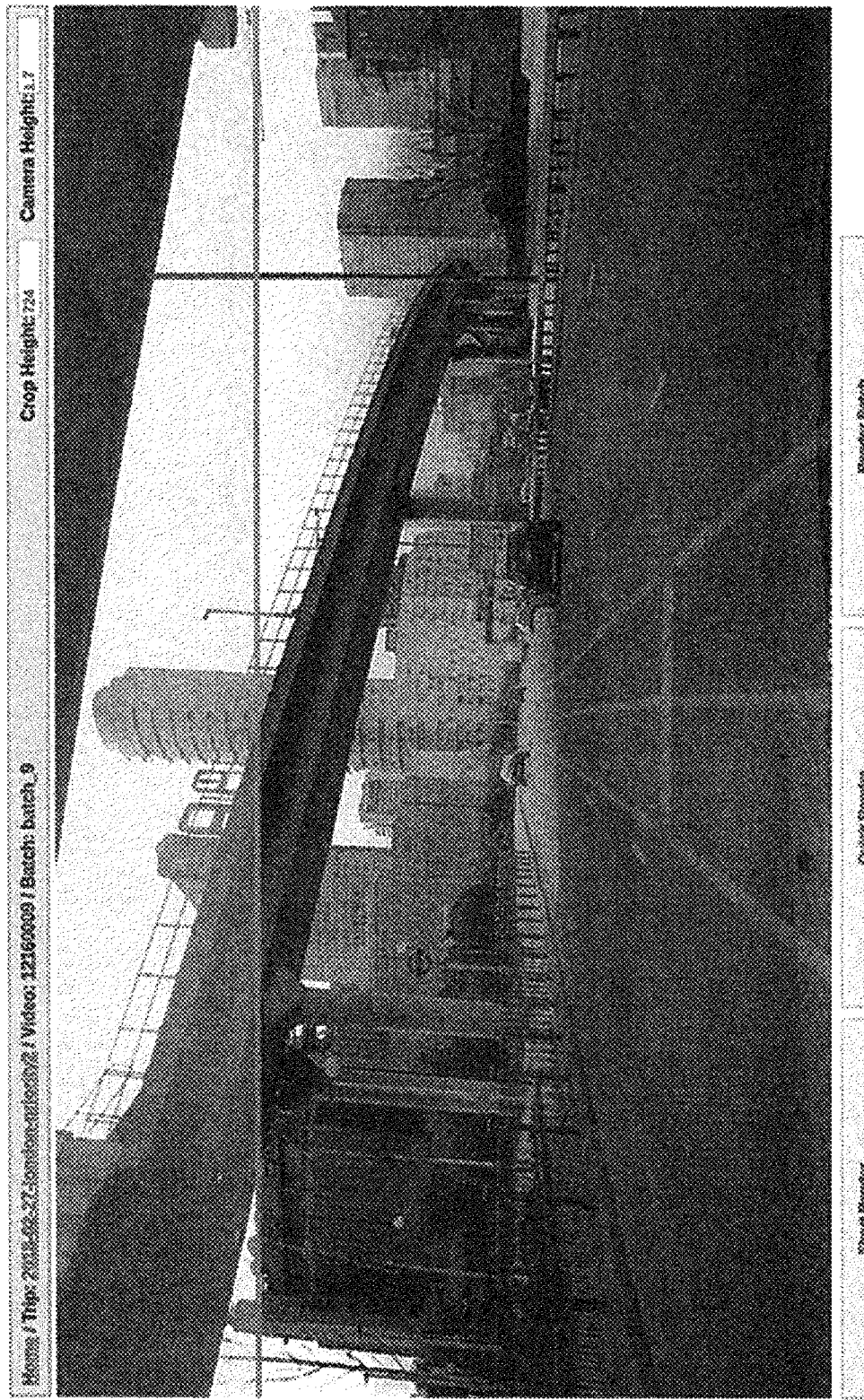
FIGS. 18 to 24 shows examples of an annotation tool user interface for annotating images based on the techniques disclosed herein.
Figure 19:
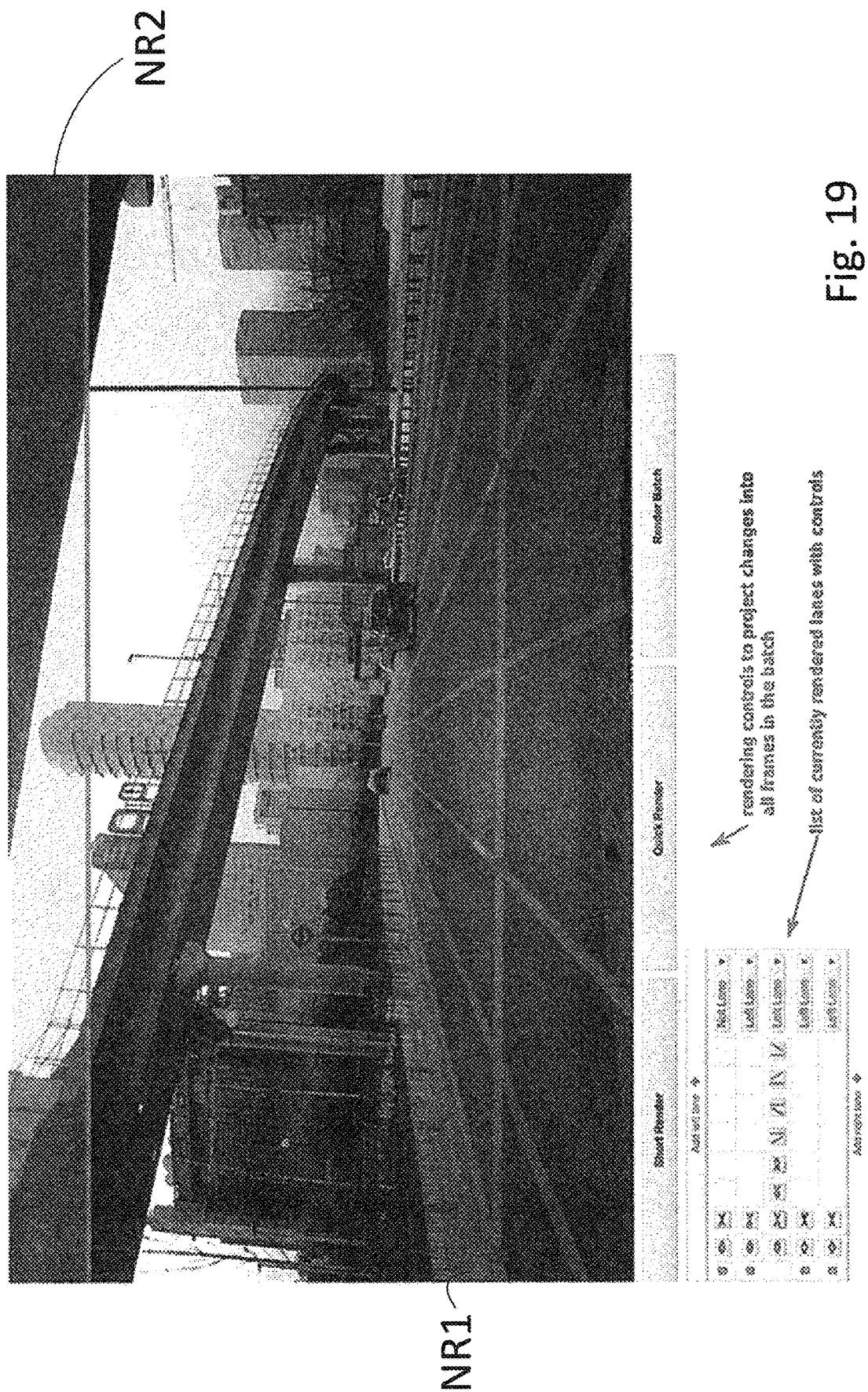

FIGS. 18 to 24 shows examples of the annotation interface used by the annotators. In FIG. 18, in the centre of the image, the ego-path can be seen projected into this frame. In the bottom-left, the annotator is provided with controls to manipulate currently rendered lanes (narrow, widen, move to the left or right, move the boundaries of the lane etc.) and add new lanes. In FIG. 19, the annotator is provided with means to adjust the camera height, to match the reconstruction to the road surface, and the crop height, to exclude the vehicles dash or bonnet. All annotations are performed in the estimated 3D road plane, but immediate feedback is provided via projection in the 2D camera view. The annotator can easily skip forward and backward in the sequence to determine if the labels align with the image, and correct them if needed. An example of a corrected sequence is shown in FIG. 27 (see above).

In addition to the lanes on the road, a strip along the side of road, denoted by reference sign NR1, is annotated as 'non-road'. Further the whole upper part of each image (top strip NR2) is annotated as non-road, where the size is adjusted manually by the annotators. FIG. 25 shows an example of the rendered annotations.

The above is implemented in the extension of FIG. 4A, in which a rendering component 416 is provided, which can render, via a user interface (UI) 412, an individual training image (img n) marked with the expected road annotations determined for that image. Thus a user can check how closely the expected road structure corresponds to the actual road structure visible in the image, and make corrections where necessary.

An output of the UI 412 is shown connected to an input of the image annotation component, via connector 418, to denote the fact that the user can modify the annotation data A(n) for an individual image via the UI 412, in order to better align the assumed lane boundaries R1, R2 with the actual lane boundaries in that image (only). This can be useful for accommodating "one-off" discrepancies, caused for example by unusual localized road structure.

A model adaptation component 410 is also provided to allow efficient manual adaptation of the annotation data via the UI 412 across multiple images simultaneously. This works by allowing the user to adapt the 3D road model with reference to a single image and its rendered annotation data, in order to better align the road boundaries in that image. However, because the 3D road model is being adapted (rather than just the individual image's annotation data A(n)), these adaptations can also be applied to the annotation data for other images, without the user having to manually adapt the annotation data for those other images. For example, a user can adjust the assumed lane width W to better fit one image, and because the road model is being adapted to the new lane width, the annotation data for other images can be automatically adapted based on the adapted model with the new lane width W. This is described in further detail below with reference to FIG. 6.

The above-described components of the image processing system of FIGS. 4 and 4A are functional components of the image processing system representing functions performed by the image processing system. These functions are implemented in software, that is by executable instructions (code) that are stored in memory and executed by a processor or processors of the image processing system (not shown), which can be formed of one or more general purpose processing units (such as CPUs), more specialized processing units (such as GPUs) or any combination thereof. As will be appreciated, these components represent high-level functions, which can be implemented using a variety of code structures. The arrows in FIG. 4 generally denote high-level interrelationships between these high-level functions, and do not necessarily correspond to any specific arrangement of physical or logical connections. The steps of FIG. 5 are computer-implemented steps, which the instructions cause the image processing system to perform when executed on the one or more processors.

Figure 13:
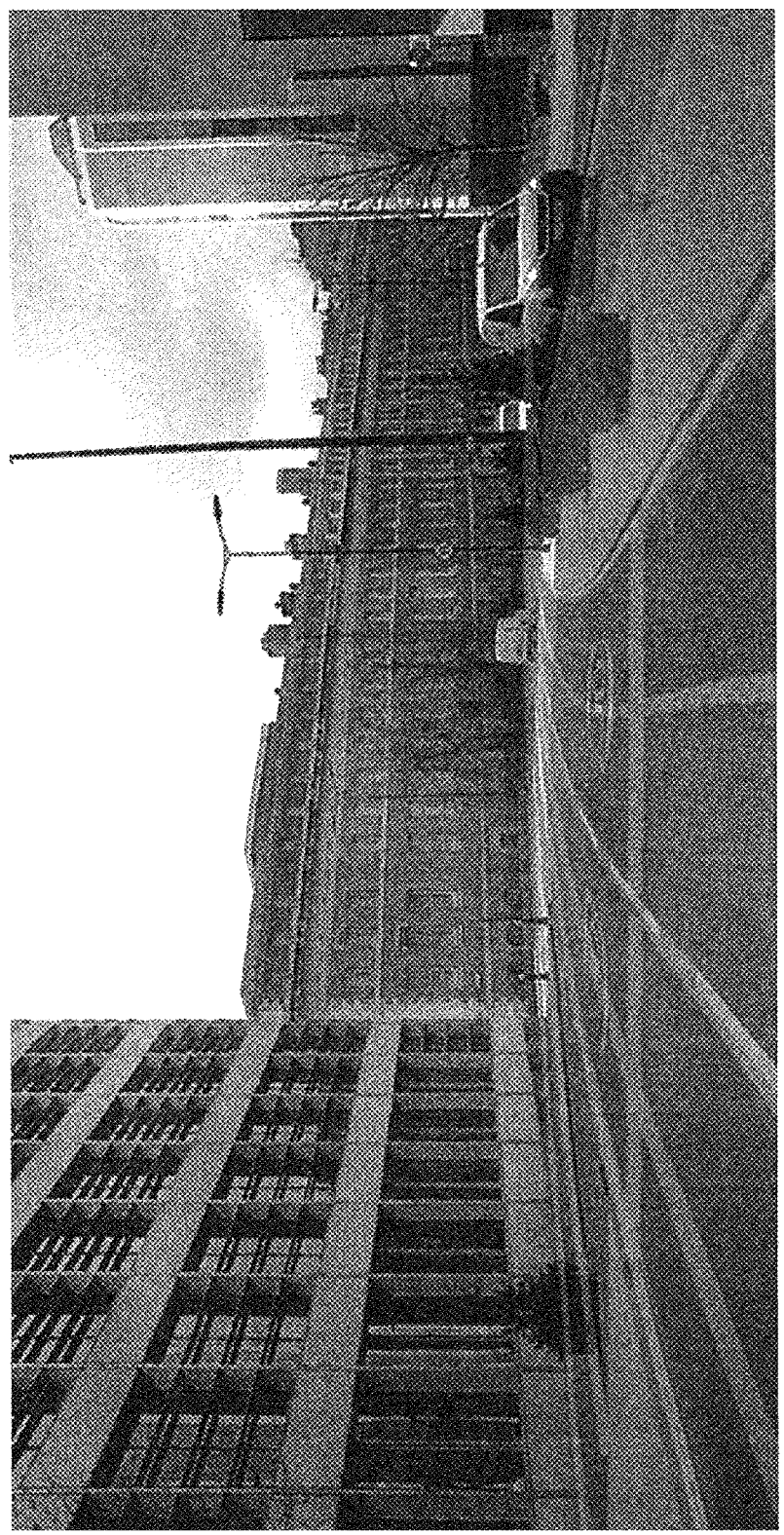
FIG. 13 shows an example of an annotated road image.

Details of Example Implementation:

An example of an annotated image is shown in FIG. 13. In FIG. 13, two drivable lanes are marked: the ego lane towards the middle of the image, and another drivable lane to the left of the image. Two non-drivable regions are marked either side of those lanes, as is a lane for traffic travelling in the other direction on the far right, separated from the ego lane by one of the non-drivable areas.

As indicated above, the methodology exploits the following observations and assumptions:

1) When humans drive cars they mostly follow a path that remains close to the centre of a lane on the road. Thus, if a video camera is placed facing forward (or alternatively backwards) in a human driven car then the path that the camera traces out when projected down onto the ground and expanded to the width of a lane will (mostly) outline where the lane lies.
2) Having found the outline of where the lane lies, then for each image in the video this outline of the lane under the car can be projected back into the image and provides (nearly) exactly the annotation required to mark the lane position.

Preferred embodiments of the invention achieve this with low cost equipment, as explained later.

Determining Path and Reference Parameters:

In order generate the lane position and project it back into each image, as indicated above the following need to be known or deduced:

The path in 3D space that the camera 302 follows (CP, FIG. 5);

The orientation of the camera 302 within the car 300, which can be represented using the following parameters:

The forward point, defined as the pixel that the car appears to travel towards when travelling in a straight line, The horizon line, defined as a line on the image that appears to be parallel to the road;

The height of the camera above the road surface (H, FIGS. 3, 3A and 5)

The left/right position of the camera within the car (captured as the separation S in FIGS. 3A and 5); and The width of the lane (W, FIGS. 3A and 5).

The image processing techniques described below allow all the above to be determined with inexpensive and un-calibrated equipment, such as a mobile phone or a dash-cam costing a few hundred pounds, or other low cost consumer equipment. This is because they can be computed from the images captured by the training vehicle 300, using the image processing techniques described below.

3) The 3D path of the camera CP can be deduced by post processing captured videos from un-calibrated cameras using existing visual SLAM (simultaneous localization and mapping) techniques. Software packages such as OpenSFM and ORB-SLAM can be used to generate accurate camera path information.

Such techniques can be used to construct a 3D map of the environment travelled by the training vehicle 300, whilst simultaneously tracking the vehicles' location within that environment.

Figure 7:
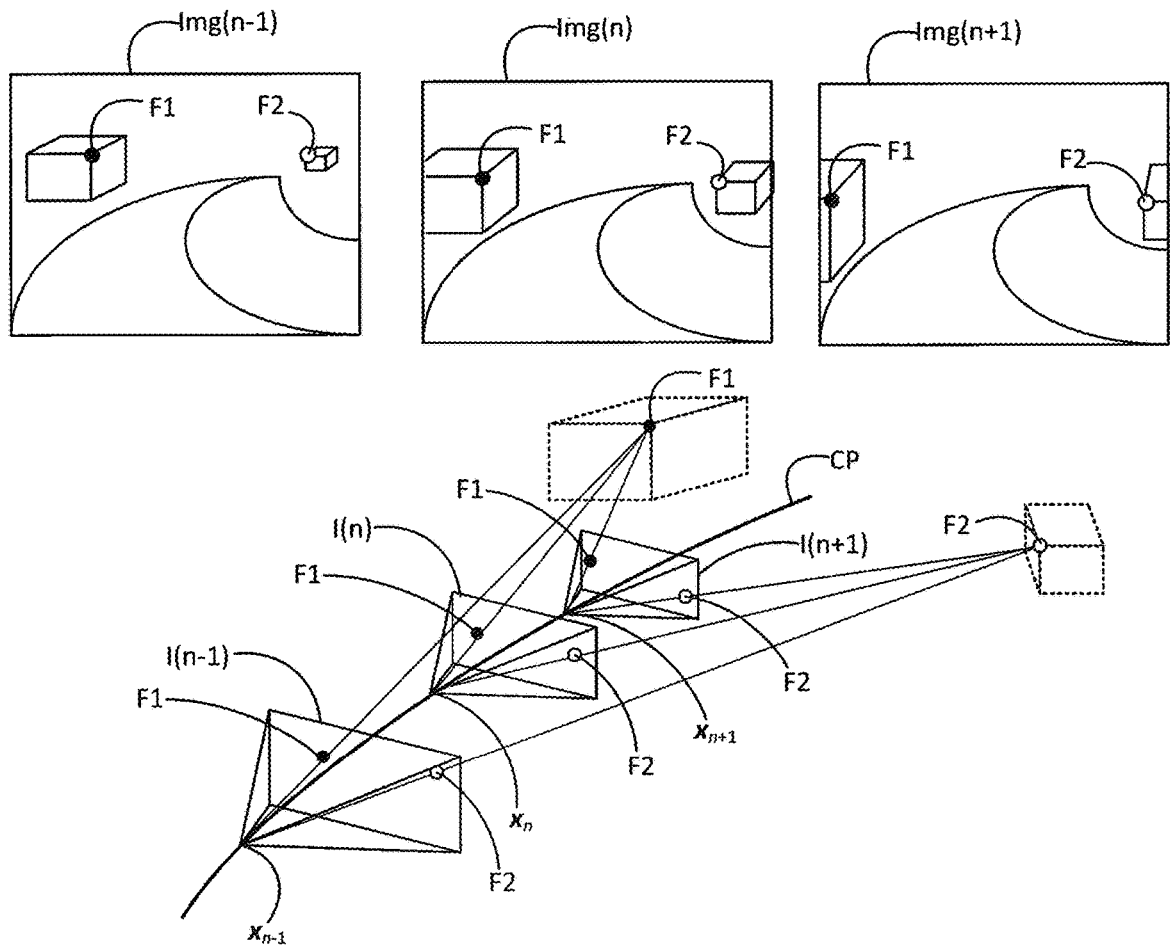
FIGS. 7, 7A and 7B illustrates principles of a simultaneous localization and mapping technique (SLAM) for reconstructing a vehicle path.

Some of the underlying principles of image-based SLAM are briefly illustrated by way of example with reference to FIG. 7. The top part of FIG. 7 shows three captured images—img(n−1), img(n) and img(n+1)—of a real-world environment, at different times and from different but nearby locations. By identifying distinctive reference features that appear within the images—such as those labelled F1 and F2—and matching them up across the images, triangulation can then be used to construct a 3D model of those features, as illustrated in the lower part of FIG. 7. For each of the captured images img(n−1), img(n), img(n+1), a 3D location of the camera 302 at the time that image was captured—labelled $x_{n-1}, x_n, x_{n+1}$ respectively—is estimated, as is an orientation of the camera's field of view within 3D space. For each of the images img(n−1), img(n), img(n+1), a respective image plane I(n−1), I(n), I(n+1) is defined as a plane normal to and intersecting the camera's filed of view when that image was captured, at an arbitrary non-zero distance from the camera location $x_{n-1}, x_{n+1}$. The camera locations and orientations are selected based on ray-tracing principles applied to the reference features F1 and F2, such that for each of the camera locations $x_{n-1}, x_{n+1}$, the rays (straight lines) from each of the references features F1, F2 to that camera location intersect the corresponding image plane I(n−1), I(n), I(n+1) at locations that at least approximately correspond to the locations at which that reference feature appears in the corresponding images, i.e. that feature's pixel location within the images. The camera path CP can then be reconstructed from the resulting sequence of camera locations $x_{n-1}, x_n, x_{n+1}$.

Note that this 3D model constructed as part of the SLAM process is distinct from the 3D model constructed by the modelling component 404. The former is in the form of a surface map constructed based on image triangulation, whereas the later represents expected structure that is inferred based on the vehicle path, which in turn is determined from the image capture device locations derived in performing the SLAM process.

Figure 7A:
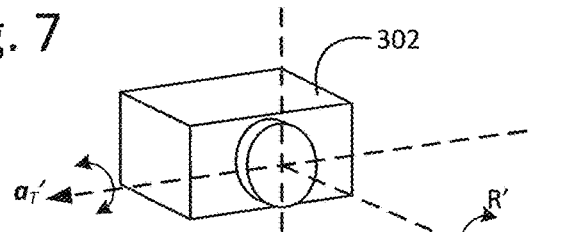
Figure 7B:
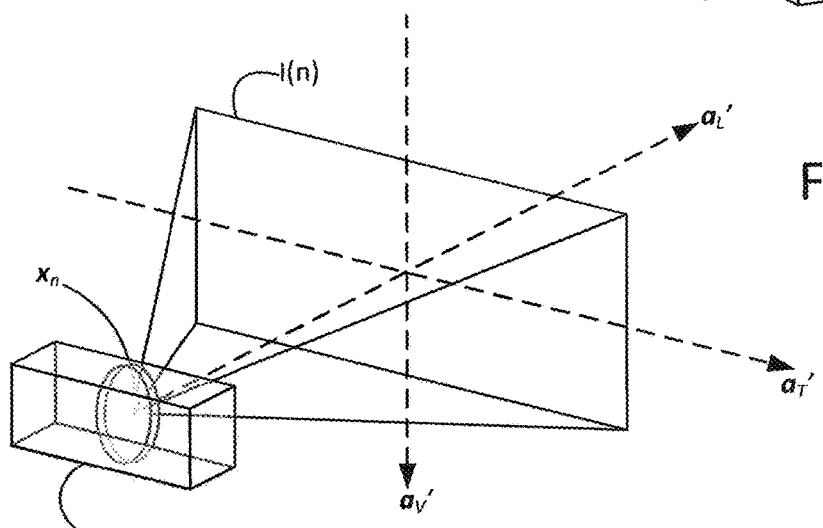

With reference to FIGS. 7A and 7B, the 3D orientation of the camera 302 can be represented using pitch (P'), roll (R') and yaw (Y') angles. A longitudinal axis $a_L'$ can be conveniently defined as parallel the camera's optical axis, with transverse and vertical axes $a_T', a_V'$ corresponding to the horizontal and vertical orientations within the image plane (i.e. to the directions that appear as horizontal and vertical in the captured images), with the camera's pitch P', roll R' and yaw Y' defined as angles about the camera's transverse, longitudinal and vertical axes $a_T' a_L', a_V'$ (camera axes), respectively. Vector notation is used herein, with $a_T' a_L', a_V'$ being unit vectors in the direction of the corresponding axis. With this definition, the image plane I(n) lies perpendicular to the camera's transverse axis and is horizontally/vertically aligned with the transverse/vertical camera axes.

Such SLAM techniques do in fact generate surface reconstructions of the environment. Whilst such surface reconstructions could be used be used to determine road/lane positions directly in theory, generally the quality of the surface reconstructions is not sufficient to do so in practice. However, the quality of the motion of the camera through the 3D scene is good, and thus provides a sufficiently accurate reconstruction of the camera path CP (this is because the camera positions are based on order hundreds of feature points where as surface positions are only based on a handful of feature points), which in turn allows the road/lane positions to be inferred using the present techniques, with sufficient accuracy.

Note that some of these techniques can also automatically deduce the camera characteristics such as focal length and even lens distortion parameters. It may be possible to use such parameters to optimize the present techniques but they are not essential.

Figure 14:
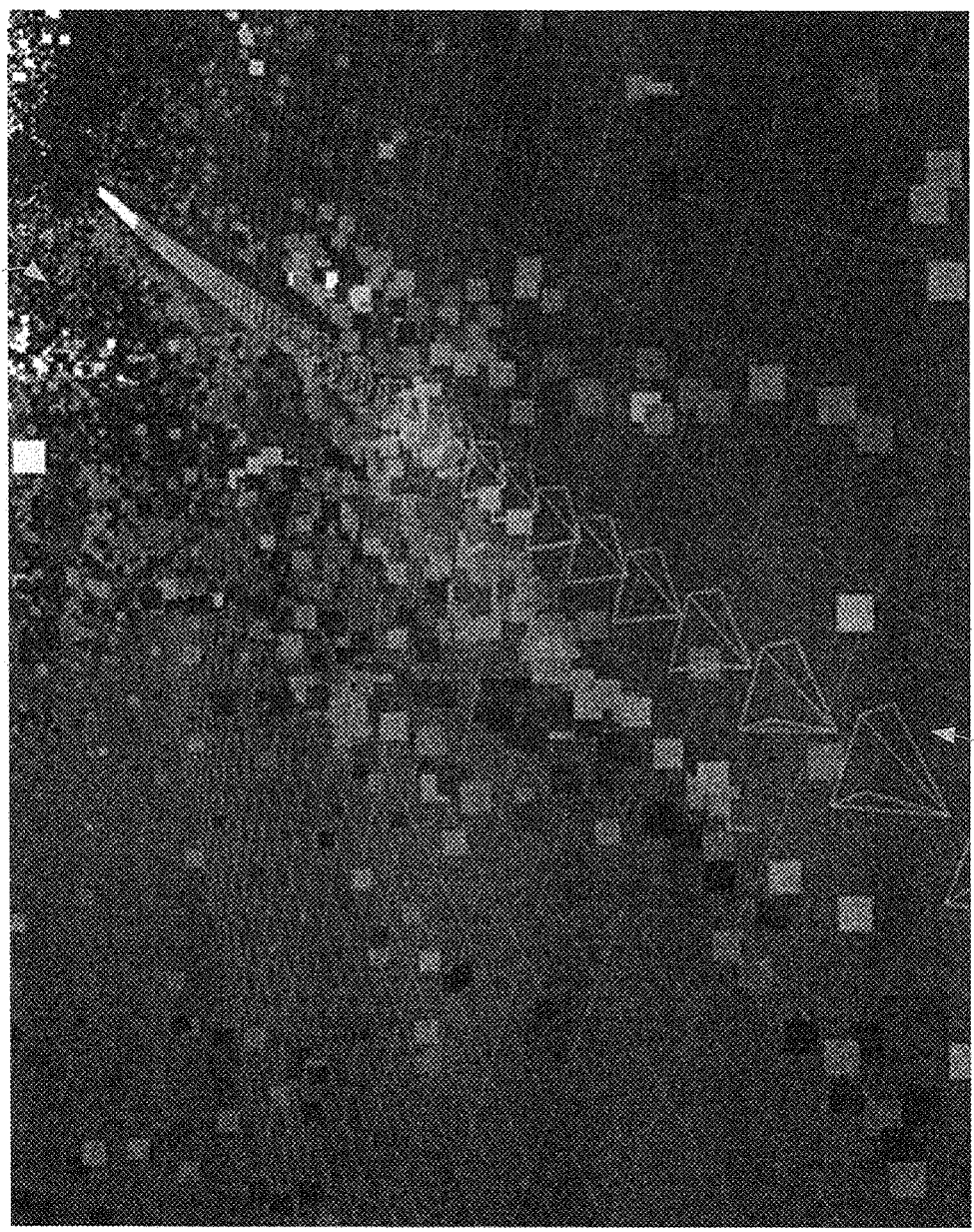
FIG. 14 shows an example SLAM output.

An example image of an SLAM reconstruction of camera positions moving through a point cloud world is shown in FIG. 14. The sequence of pyramid structures labelled 1400 represent the locations and orientation of the image capture device when the different images were taken, as estimated via the SLAM process. Collectively these define the camera path CP. The blocks labelled 1402 constitute a 3D surface map generated as part of the SLAM process. Both of these aspects are described in further detail later.

The remaining reference parameters are computed by the parameter computation component 408 via image processing, as described below. First some of the underlying considerations are briefly introduced.

Figure 8:
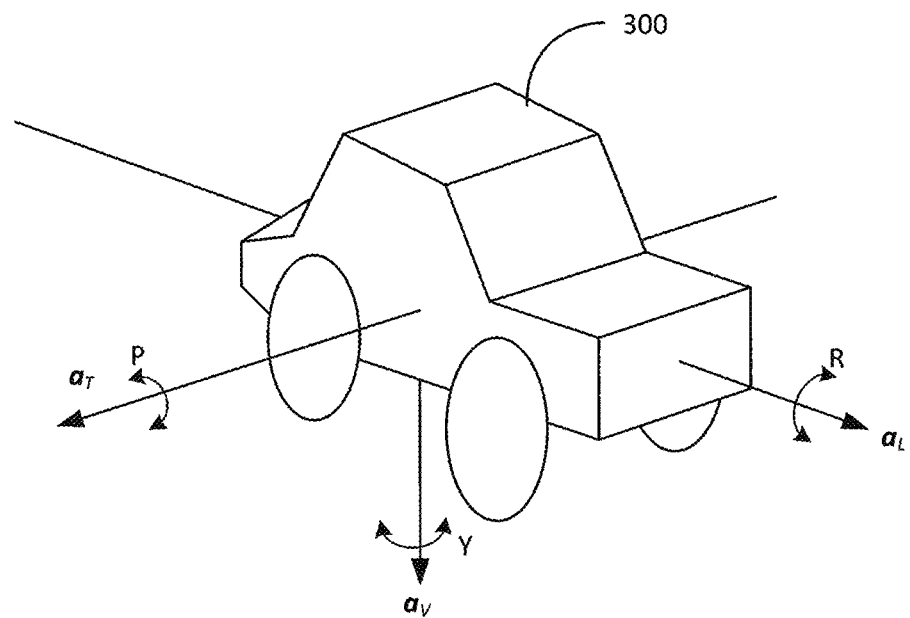
FIG. 8 shows a schematic perspective view of a vehicle.

With reference to FIG. 8, the 3D orientation of the training vehicle 300 can be defined in the same way as the camera. Here, the vehicle's pitch, roll and yaw are labelled P, R and Y respectively, and the training vehicle's transverse, longitudinal and vertical axes (vehicle axes) are represented by unit vectors $a_T, a_L, a_V$ respectively. The longitudinal axis corresponds to the direction in which the vehicle travels when travelling in a straight line (forward direction). The vertical axis is the direction normal to the road surface (that is, to the plane in which the contact points between the vehicle's wheels and the road lie). The transverse axis runs along the width of the vehicle 300, perpendicular to the longitudinal and vertical axes.

Note, unless otherwise indicated, the term "absolute" herein is used herein to refer to orientation and locations within the environment in which the vehicle is travelling. That is, as defined relative to an (arbitrary) global coordinate system of a global frame of reference of the environment in which the vehicle moves. This can be defined as an inherent part of the SLAM process. This is the coordinate system in which the reconstructed vehicle path, the orientation of the image capture device within the environment (absolute orientation) and the surface reconstruction are defined.

The term "relative" is used to refer to locations and orientations relative to the vehicle, that is, defined relative to a coordinate system of the vehicle, such as the coordinate system defined by the vehicle axes $a_T$, $a_L$, $a_V$.

Figure 9:
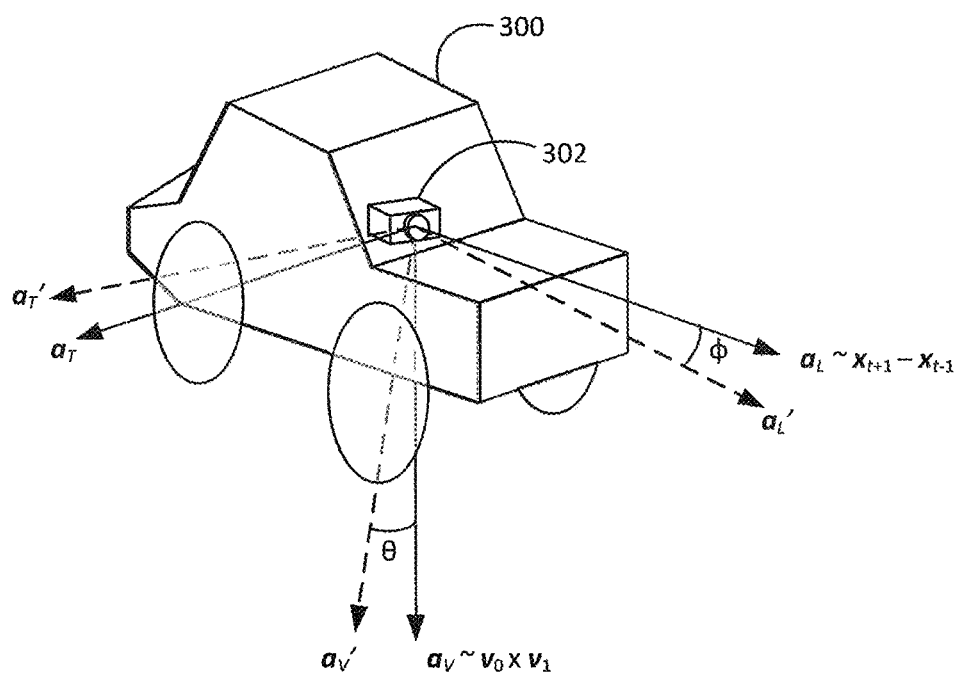
FIG. 9 shows a schematic perspective view of a vehicle equipped with at least one image capture device.

With reference to FIG. 9, the method does not require the orientation of camera 302 to be perfectly aligned with the orientation of the training vehicle 300. Angular misalignment of the camera axes relative to the vehicle axes is acceptable, because this misalignment can be detected and accounted for using the techniques described below.

4) The angular orientation of the camera within the car—i.e., the angular offset between the camera's longitudinal axis $a_L'$ and the vehicle's longitudinal axis $a_L$ (that is, the vehicle's longitudinal axis $a_L$ as measured within a frame of reference of the image capture device, i.e. in a reference frame in which the image capture device's orientation remains fixed)—can be deduced automatically by using the fact that when the car drives straight the vector of motion of the car will be parallel to the car body (i.e. the vehicle's longitudinal axis) and thus the camera orientation relative to the car body can be calculated. This orientation is captured as the forward point of the camera, defined to be the pixel that the car appears to head towards when travelling in a straight line (as noted above).

It is not possible to rely on there being sections of the video where the car travels in a perfectly straight line. To overcome the fact that the car may never travel in a perfectly straight line the following approach is taken.

Three equidistant points on the path are taken, the outer two are joined and this vector is used as an approximation of the forward direction at the central point. This approach is continuously averaged weighted by the dot product of the vectors between the central point and the two outer points. Thus, times when the car is travelling nearly straight are weighted much more strongly than times when the car is turning. Using this method can produce sub-pixel accuracy.

Figure 15:
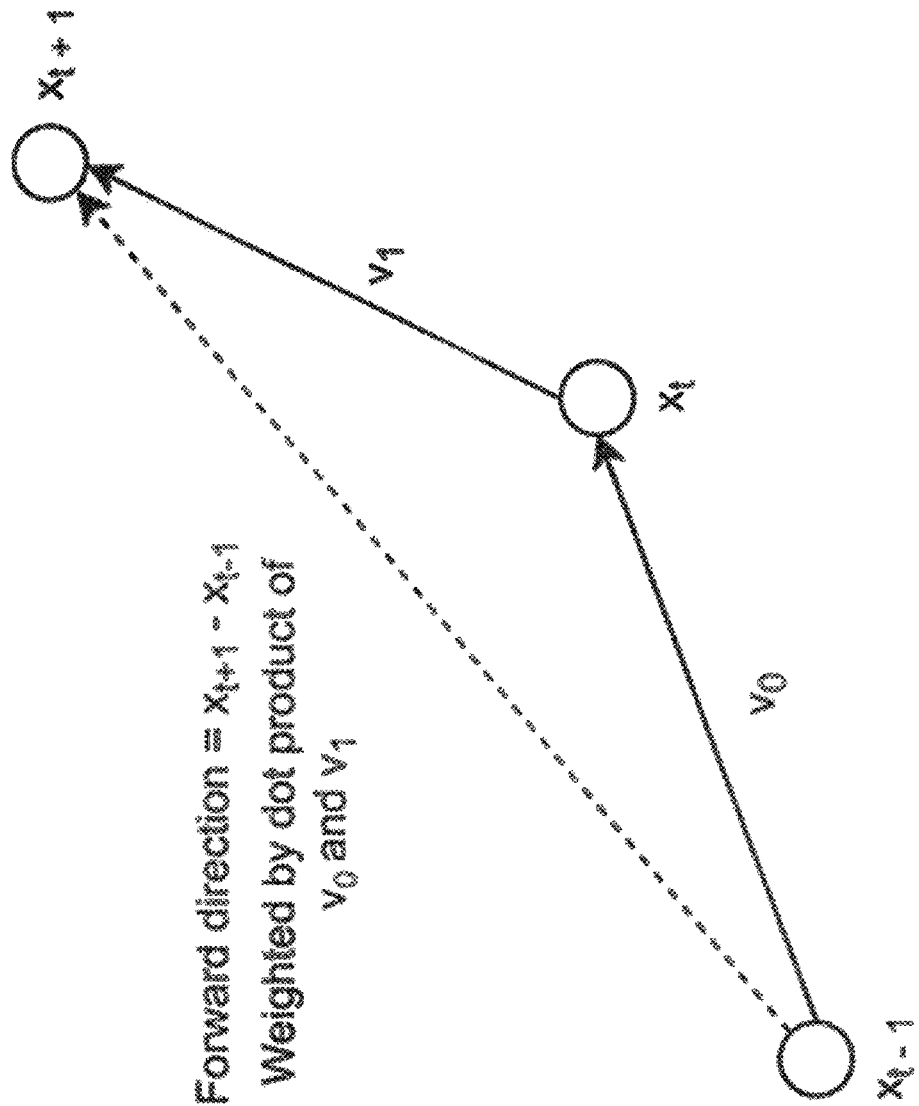
FIG. 15 illustrates certain principles of an image-based measurement of forward direction.

This is illustrated in FIG. 15.

In other words, this exploits the observation that the vector difference $x_{t+1} - x_{t-1}$ lies (approximately) parallel to the vehicle's longitudinal axis $a_L$ when the vehicle 300 is travelling in an (approximately) straight line, in order to estimate the angular offset of the camera 302 relative to the vehicle 300. This is captured in the weighted average by assigning greater weight to intervals of more linear (straight line) motion.

Note that, strictly speaking, the vector difference $x_{t+1} - x_{t-1}$ lies approximately parallel to the vehicles longitudinal axis so long as the rate of turn is approximately constant (it doesn't actually require the vehicle to be travelling in a straight line). However the assumption of approximate constant rate of turn will be more likely to be true when the vehicle is more closely travelling in a straight line.

The calculation is performed as a vector average, in which the vector that represents the average forward motion of the car as expressed in the camera coordinate system. This vector when projected forwards will cut the image plane at a specific pixel (the forward point pixel). This pixel is the point which the car would seem to be moving towards if it were driving on a perfectly straight and flat road (the "forward point" as that term is used herein).

By way of example, the forward direction of the vehicle can be computed as a weighted average of the vector difference between the longitudinal axes of the camera and vehicle respectively according to the equation 1:

$$\frac{\sum_t w_{L,t}(x_{t+1} - x_{t-1})}{\sum_t w_{L,t}} \quad (1)$$

where $w_{L,t} = v_0 \cdot v_1$ as evaluated at time t.

The longitudinal vehicle axis $a_L$ at time t is assumed to lie parallel to the vector difference $x_{t+1} - x_{t-1}$.

Note that $x_{t+1} - x_{t-1}$ needs to be evaluated in the reference frame of the image capture device 302 in this context, in order to give meaningful results, i.e. in order for the weighted average of equation (1) to provide an accurate estimate of the direction of the vehicle's longitudinal axis $a_L$ relative to the camera's longitudinal axis $a_L'$.

The SLAM process will derive absolute values for $x_{t+1}$ and $x_{t-1}$, i.e. in the global coordinate system. However, the direction of the camera axes in the global coordinate system, i.e. the absolute orientation of the image capture device, at time t is also derived via the SLAM process itself, which can in turn be used to transform vectors in the global frame of reference into the frame of reference of the image capture device 302.

The dot product $v_0 \cdot v_1$ depends on the magnitude of the change in direction between t−1 and t+1, such that the smaller the change in the magnitude of direction, the greater weighting that is given to the measurement at time t.

As noted above, strictly speaking, the vector difference $x_{t+1} - x_{t-1}$ lies approximately parallel to the vehicles longitudinal axis so long as the rate of turn is approximately constant (it doesn't actually require the vehicle to be travelling in a straight line). Therefore an alternative weighting scheme could be used in which the vector difference at each time is weighted according to the change in curvature exhibited in the vehicle path between t−1 and t+1.

Of course, typically the orientation of the vehicle's axes remains fixed in the image capture device's frame of reference as the vehicle moves, because the camera 302 is expected to remain in an essentially fixed orientation relative to the vehicle 300—the time dependency in the above stems from the fact that the estimates of the vehicle and camera axes are not exact.

Time t corresponds to a certain point on the camera path CP, and can be a time at which one of the images was captured or a time in between captured images, to which a camera pose can be assigned by interpolation of the camera poses for different images.

In an alternative implementation, the offset between $a_L$ and $a_L'$ could be represented as a pair of angles.

With reference to FIG. 10, once the angular orientation of the camera 302 relative to the vehicle 300 has been computed in this way, it is then possible to determine the orientation of the vehicle's longitudinal axis $a_L$ at any point along the camera path CP (including when the vehicle is not travelling in a straight line), based on the orientation of the camera's longitudinal axis $a_L'$ at that point, which is known from the SLAM computations.

5) The rotational orientation of the camera within the car—i.e. the rotational offset between the camera's vertical axis $a_V'$ and the vehicle's vertical axis $a_V$ (that is, the vehicle's vertical axis $a_V$ as measured within a frame of reference of the image capture device)—can be automatically deduced by noting that most roads are locally flat and so when the car is in a turn, the vector that is perpendicular to the surface described by the camera path will point directly downwards from the camera to the road surface. In more detail, again three equidistant points on the path are taken (though again it is not essential for these point to be equidistant), the cross product of the two vectors from the centre to the two outer points is taken and that is continuously averaged weighted by the magnitude of the cross product. Thus, times when the car is travelling in a curve are weighted more strongly than times when the car is travelling straight (at which point there is no information about the normal).

Figure 16:
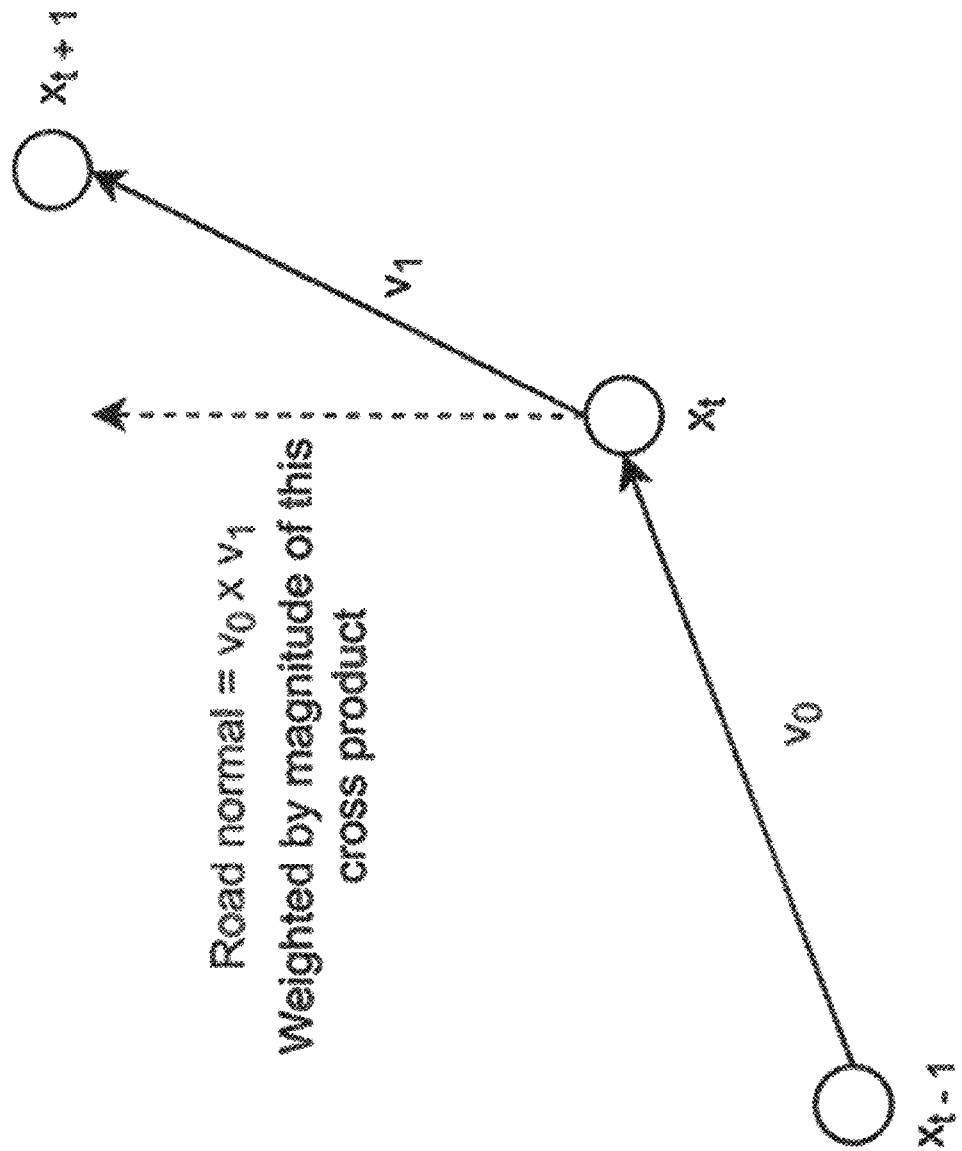
FIG. 16 illustrates certain principles of an image-based measurement of a road normal.

This is illustrated in FIG. 16.

In other words, this exploits the observation that, when the vehicle is exhibiting angular acceleration such that the vehicle path exhibits local curvature in 3D space, the plane in which the curved portion of the vehicle path lies is at least approximately parallel to the plane of the road surface under normal driving conditions; or, equivalently, the normal to the locally curved portion of the path is at least approximately parallel to the vertical axis $a_V$ of the vehicle 300.

The average normal vector of the path expressed in camera coordinates. The plane that is perpendicular to this road surface normal vector can be intercepted with the image plane and this will provide a line across the image that would match the horizon if the car were driving along a perfectly straight and level road (the "horizon line" as that term is used herein).

By way of example, the rotational orientation of the camera within the vehicle can be computed as a weighted average of the offset angle between the vertical axes of the camera and vehicle respectively according to the equation (2):

$$\frac{\sum_t w_{V,t} v_0 \times v_1}{\sum_t w_{V,t}} \quad (2)$$

where:
$w_{V,t} = |v_0 \times v_1|$ as evaluated at time t,
$v_0 = x_t - x_{t-1}$,
$v_1 = x_{t+1} - x_t$.

The vertical vehicle axis $a_V$ at time t is assumed to lie parallel to the vector cross product $v_0 \times v_1$.

As above, $v_0 \times v_1$ needs to be evaluated in the reference frame of the image capture device 302 in this context, in order to give meaningful results, i.e. in order for the weighted average of equation (s) to provide an accurate estimate of the direction of the vehicle's vertical axis $a_V$ relative to the camera's longitudinal axis $a_L'$. As noted above, the absolute orientation of the image capture device as determined via the SLAM process can be used to transform vectors from the global frame of reference into the frame of reference of the image capture device.

The magnitude of the cross-product $|v_0 \times v_1|$ increases as the constituent vectors move towards being perpendicular, as that is expected to yield the most accurate results. More generally they are weighted by a factor that increases as an offset angle α between those vectors tends towards ninety degrees, where $|v_0 \times v_1| = |v_0||v_1| \sin \alpha$.

As will be appreciated, many of the observations made above in relation to the angular orientation measurement also apply to the rotational orientation measurement.

6) The height of the camera above the road (H) can be calculated by generating a surface mesh of the road from the SLAM process (even though this is low accuracy) and then averaging the height of all points on the camera path above this mesh. The averaging across the whole path counteracts the poor accuracy of the mesh generated by the SLAM process.

The height H at a given point on the camera path CP is defined the distance between a point on the camera path CP and the mesh along the vehicle's vertical axis $a_V$ at that point. A reason the rotational orientation of the camera 302 within the vehicle 300 is needed is to determine where the vehicle's vertical axis lies at each point on the path so that the height estimation can be computed. This is illustrated in FIG. 11, in which the reconstructed surface map is labelled SM.

7) The left to right position of the camera (S) within the lane and also the width of the lane (W) can be estimated by using various computer vision techniques to detect the lane boundaries.

Detecting the lane edges is obviously a hard problem (and the whole purpose of generating this lane training data is to train a neural network to solve this problem). However, detecting lane edges in this specific case can be made into a significantly easier problem by virtue of having two additional pieces of information. Firstly, the known path of the camera (and thus shape of the lane) can be used to create a transform to effectively straighten out the road prior to doing any lane boundary detection. Secondly the positions at which to search for lane boundaries are significantly reduced because the centre line of the lane is (nearly) known from the camera path and lanes have widths that are relatively fixed.

For example, the images can be projected into a top down view, transformed to straighten out the road (using the camera path information) and then a Hough transform can be used to detect dominant lines with the correct approximate position and orientation.

The width of the road at each point on the camera path CP is defined as the distance between the detected lane boundaries along the transverse vehicle axis $a_T$ at that point. A reason the angular orientation of the camera 302 within the training vehicle 300 is needed in addition to the rotational orientation is to determine where the vehicle's transverse axis $a_T$ lies in order to estimate W and C at each point along the path. This is also illustrated in FIG. 11.

By exploiting all of the above, it is possible to fully automatically generate annotation of the lane driven by the car in all images of the video, using only images captured from a low-cost and un-calibrated image capture device.

It is also desirable to extend these techniques to label multiple lanes. One way to do this is as follows:

8) Multiple lanes (and thus the entire road surface) can be automatically annotated by driving along each lane and creating a single 3D SLAM reconstruction that includes the paths for each lane. It is necessary to merge the separate videos of driving along each line into a single reconstruction in order to obtain relative positioning of the lanes and the entire road surface.

Figure 17:
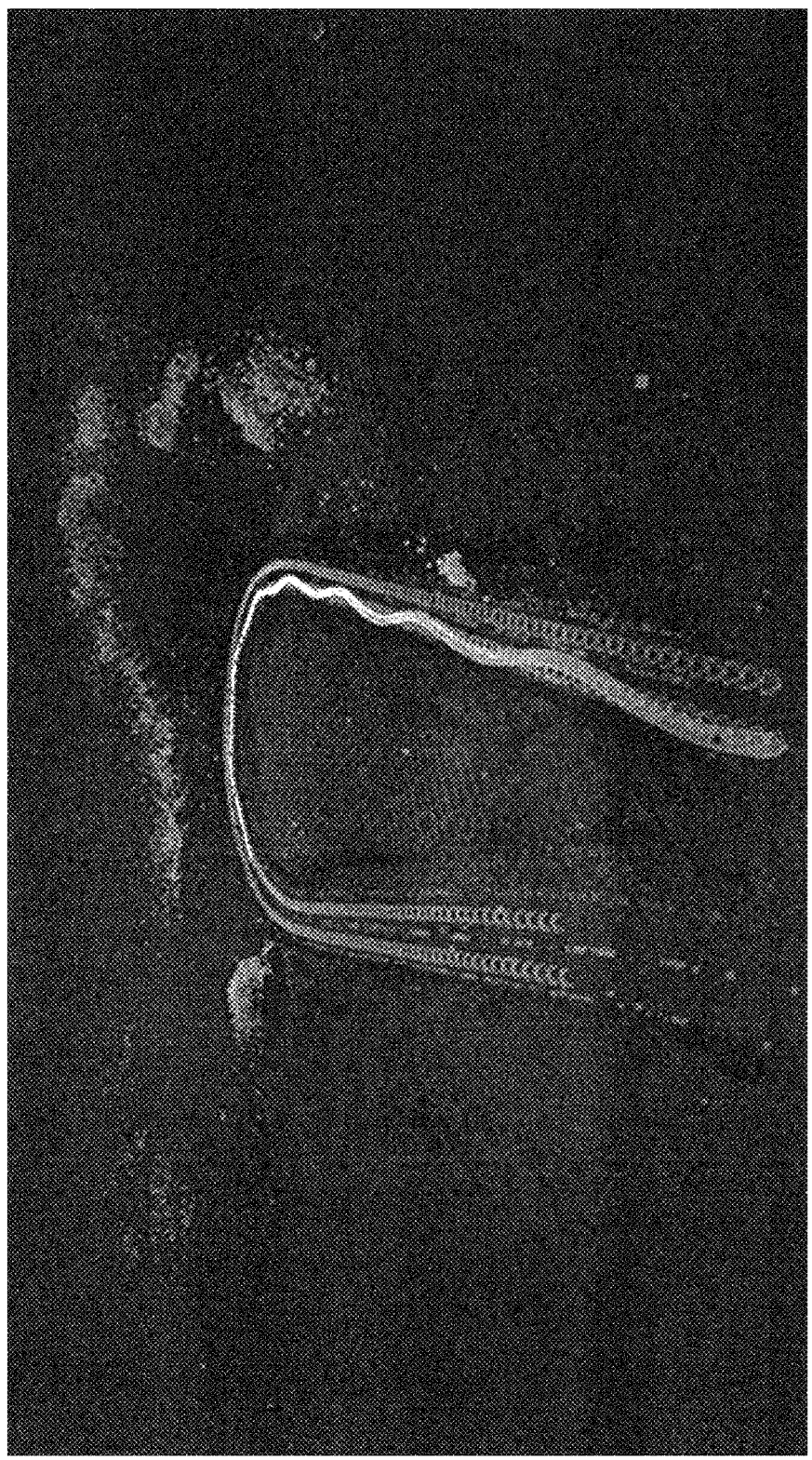
FIG. 17 shows an example image of a SLAM reconstruction of camera positions moving through a point cloud world.

FIG. 17 shows an image of a SLAM reconstruction of camera positions moving through a point cloud world, where there are two sets of camera images.

9) It is difficult to merge images from multiple videos into a single 3D reconstruction unless the camera images are all facing the same direction; i.e. it is not practical to merge videos of cars driving in opposite directions along the road into a single 3D reconstruction. One way to solve this is to drive in one direction with a forward-facing camera, and drive in the other direction (on the other lane) using a backwards-facing camera. This gives a single set of images all pointing in the same direction along the road.

Extension—Human Fixer Stage:

The fully automated annotation system described produces usable annotation, however it is still subject to a number of errors than can be fixed up with very little effort by a human annotator. For example:

the calculated camera height may not be exactly correct
the left/right position within the lane may not be exactly right the width of the lane may not be exactly right In addition to these fix ups for imperfect automatic calculations, there are some additional annotations that a human can add that are very low effort to add but provide significant benefit if they exist in the training data. For example:

Adjacent lanes can be added (without having to drive these lanes). They are easy to add because adjacent lanes generally have parallel boundaries to the lane that the car has driven.

Non-drivable parallel road features can be added. Regions of the road reserved for cycles or buses/taxis can be added simply (again they are generally just parallel regions of the ground that follow the driven lane).

Regions of pavement adjacent to the road can be added.

10) A tool with a simple user interface has been developed that allows a human annotator to make these 'fix ups' and also add these additional annotations. The major benefit of this tool is that the fix ups and additional annotations can be made in one frame of the video and the system can automatically propagate these changes through all the frames in the video.

This efficient saving stems from the fact that the user can adapt the 3D road model (via the model adaptation component 410) using one frame and its annotation data as a reference, and the fact that the adapted 3D road model can in turn can be applied to multiple images.

Note also, that the technology is not limited to manual adjustment of automatically generated road/lane models. Any object in the world that is stationary can be marked and that object's position in each image of the video can be calculated (since the motion of the camera is known).

In this way one frame of video with already pre-populated nearly correct annotations can be provided to a human and with minimal fix up they can generate circa 50-100 well annotated images. It would be possible to generate even more images if longer fragments of video were used, but in our experience, the length of video that it is convenient to 3D reconstruct and is also reasonably similar in its construction is sufficient to contain 50-100 images.

11) Note that the images that are used as training data are sampled from the whole video such that they are spaced a reasonable distance apart in space (not time) to provide some diversity of training data for the networks. There is little benefit in taking every image from the video as most of them are very similar to each other.

Figure 6:
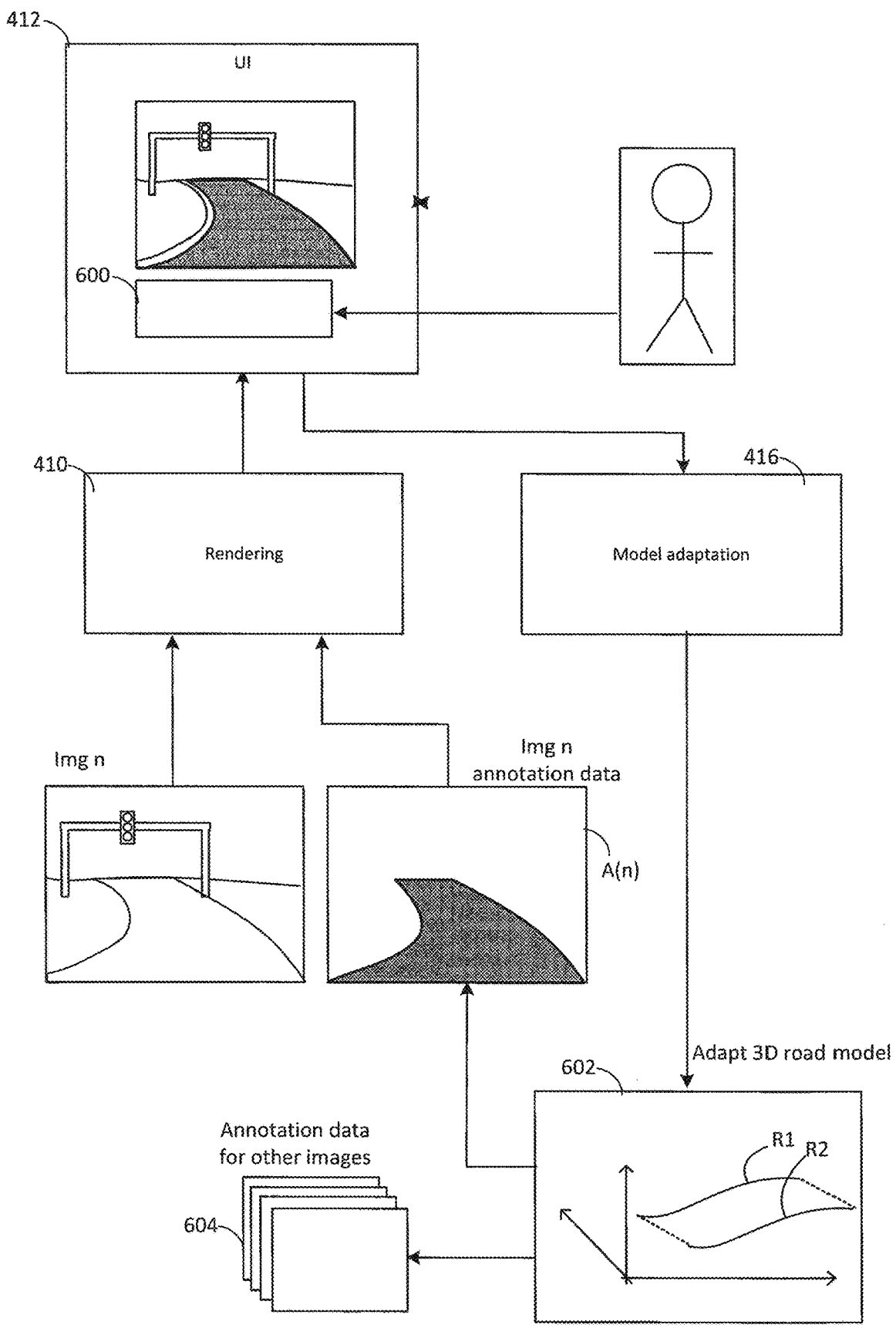
FIG. 6 shows a schematic block diagram denoting image system functionality to facilitate adjustment at a human fixer stage.

FIG. 6 shows a schematic block diagram that illustrates an example of the types of adjustment that can be performed at the human fixer stage. The rendering component can render data of any one of the captured images on a display of the user interface 412, overlaid with its associated annotation data A(n). One or more selectable options 600 are also rendered, which a user can select in order to cause the model adaptation component 410 to adapt the 3D road model 602, in a fast and intuitive manner. As indicated in FIG. 6, as the road model 602 is updated, not only is the annotation data A(n) that is currently being rendered modified in accordance with the adapted model 602, but the adapted model 602 can also be used to update the annotation data 604 for other images in the same video sequence. By way of example, the top part of FIG. 6 shows a marked road or lane within an image. Although the right-hand side boundary R2 accurately coincides with a real-world right-side boundary visible in the image, the left-side boundary R1 is slightly off. The user can fix this quickly by shifting the position of the left-side boundary in the 3D model, using the current image and the annotation data rendered on the current image as a reference to manually adapt the location of the left-side boundary R2 until it corresponds with areal-world left-side boundary visible in the image. This change will apply across multiple images in the sequence, meaning that the left-side road boundary will be accurately placed in those images for as long as the road/lane remains the same width.

The fact that much of the road structure of interest lies parallel to the vehicle path is exploited to provide a range of extremely quick manual annotation options:

The width or location of the automatically-determined road structure can easily be changed ("nudging");

Additional road structure that lies parallel to the vehicle path/automatically determined road can easily be created, and its width and location can be easily nudged in the same way. The additional road structure is oriented parallel to the vehicle path/existing road structure automatically. For example, the automatically determined road structure may be an "ego lane", i.e. the lane along with the vehicle drives. Additional structure can very easily be added across multiple images such as:

other lanes, e.g. non-ego lanes, bus lanes, cycle lanes, central or left/right road markings, or any other parallel road markings, non-drivable areas such as pavements, grass, barriers, roadside growth (trees, hedges etc.)

Perpendicular road structure, i.e. extending perpendicular to the automatically determined road structure/vehicle path, can also be added very easily, and its width and location can be nudged in the same way. Examples include junctions, give-way lines or other perpendicular road marking's etc., or other structure at an assumed angle from the path (e.g. branching points in the road).

Changes in the width of the road, e.g. due to the number of lanes changing, can be accommodated by allowing the user to "split" the video sequence at a point of his/her choosing. After a split point the video, the user's adaptations will only be applied to the 3D road model at points after the split points—the parts of the model preceding the split point will remain unchanged, which in turn means the annotation data for the images before the split point remains unchanged.

By way of example, the following workflow is considered. The user starts at the beginning of a training sequence. The 3D ego-lane has been automatically determined using the techniques above. Moreover, the locations of the centre and left/right lane markers have been determined, by assuming these are of a certain width and lie at the centre and far right/far left of the ego lane. At this point the user can adapt the ego lane width and position, and also the width and position of the road markings if necessary, to align them with the actual ego lane/road markings visible in the image. The user can also add additional parallel structure at this point, such as non-ego lanes, non-driveable areas etc.

An example of an automatically annotated image, pre-fix up is shown in FIG. 18, in which only the ego lane (and its assumed centre line and lane boundaries) are marked. As can be seen, the markings do not exactly line with the actual lane boundaries. FIG. 19 shown the image after a fix up, where the width and position of the ego-lane has been adjusted, and the other lanes and non-drivable regions have been marked.

These changes are applied to the underlying 3D model, hence will also be applied to the subsequent images in the sequence. The user can then cycle through the following images, quickly verifying that everything still matches up.

When the user gets to a point in the video at which a junction is clearly visible in one of the images s/he can add a junction structure at that point, and nudge its location/ width as needed. Again, this is applied to the 3D model, therefore will apply to all of the images in which the junction is visible. Non-drivable road structure at the edges of the road will be automatically adapted to accommodate the parallel junction (i.e. any part of the non-drivable road structure that overlaps with the new junction will be removed automatically).

Figure 22:
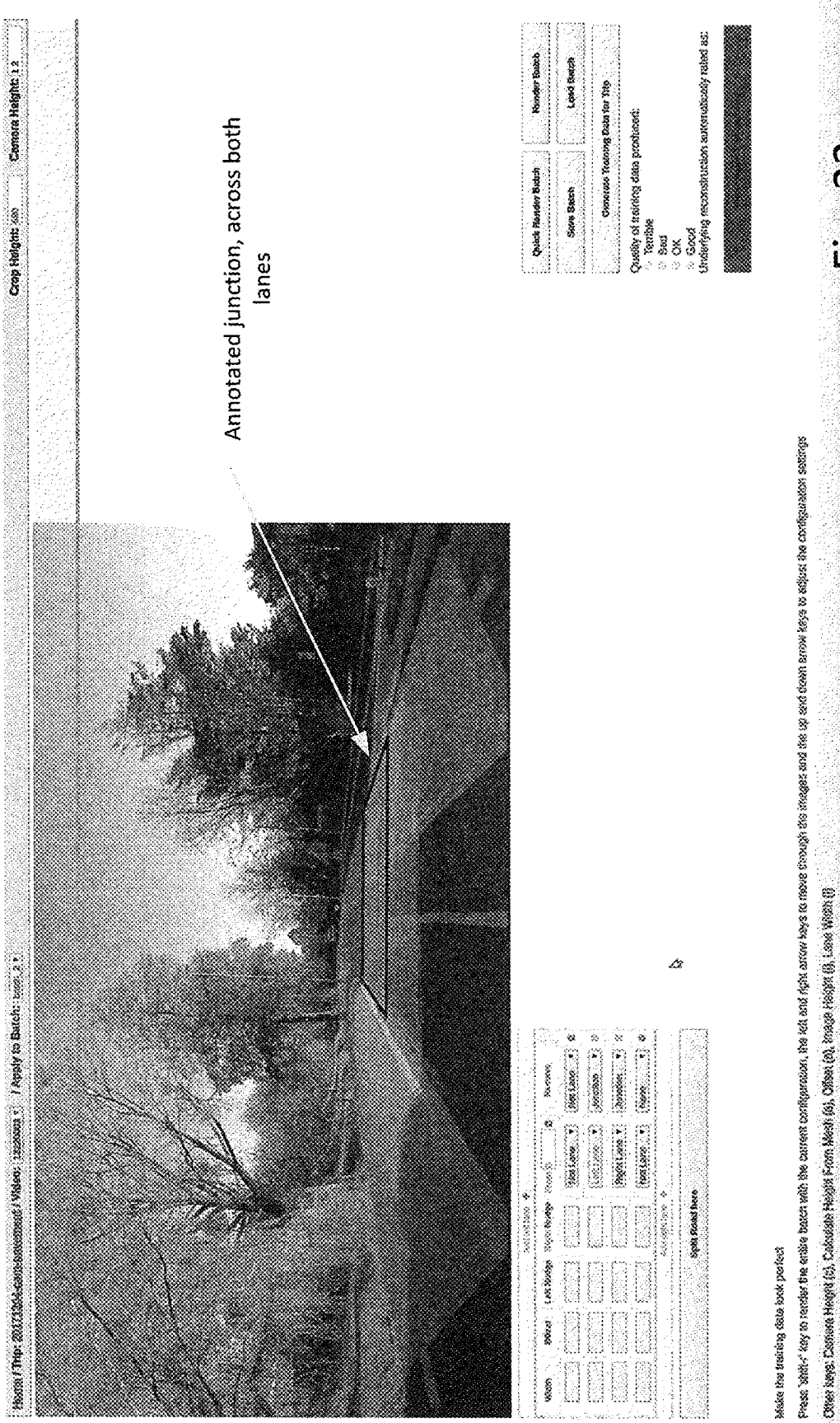

An example of the UI when a junction has just been added is shown in FIG. 22. The user has defined the junction as cutting through the left and right lanes, perpendicular to the lanes.

Figure 12:
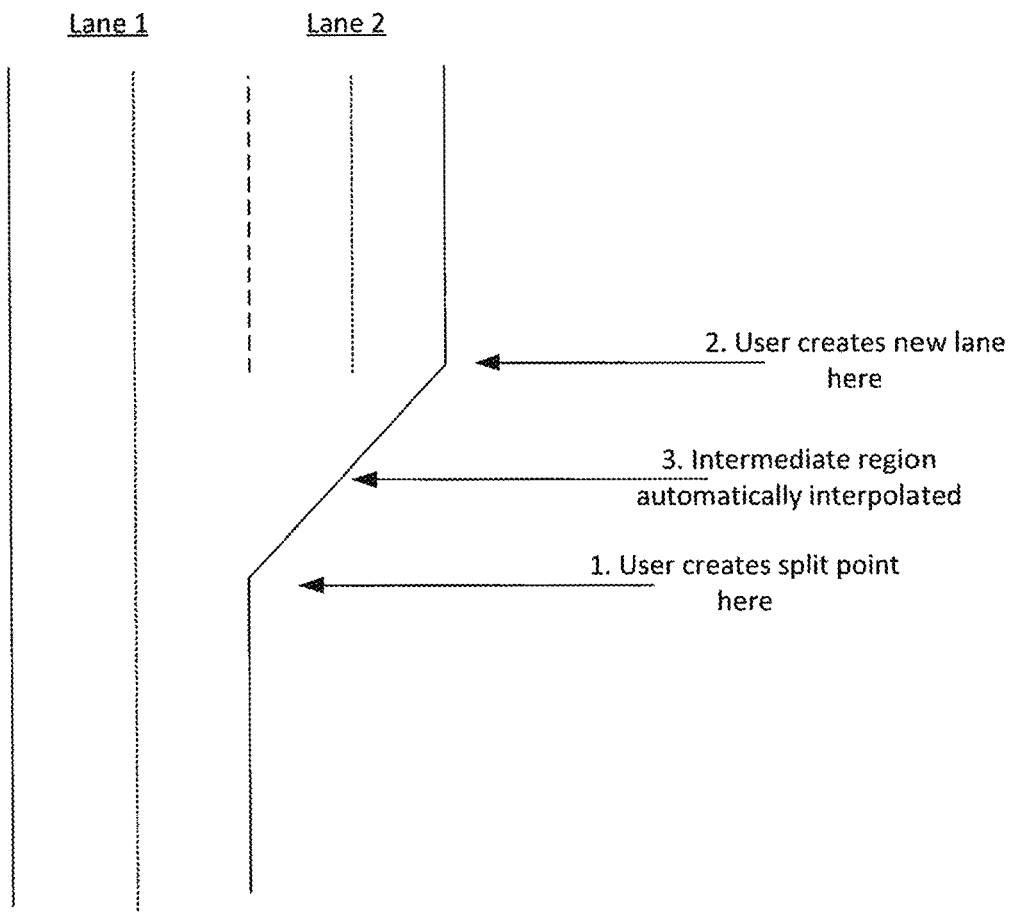
FIG. 12 shows an example of a manual adjustment at a human fixer stage.

With reference to FIG. 12, when the user gets to a point in the video at which the road/lane width changes (e.g. lane narrows/widens, the number of lanes changes or is reduced etc.), s/he can split the video at that point and modify the underlying model using that frame as a reference (step 1, FIG. 12). The location of the current video frame is mapped to a point on the vehicle path, which in turn is used to restrict adaptations of the 3D model to the part of the model after that point only—points before that (where the user has already verified that the annotations match the images) are unaffected. At this point, the user can change the road width, add a lane etc. The system is capable of automatically interpolating parallel structure around split points, e.g. linearly interpolating. For example, when adding a lane, typically the road will gradually widen until it is able to accommodate the new lane, the user can go forward into the video to the point at which the new lane reaches its full width, and add the lane at that point (step 2, FIG. 12). The system automatically interpolates between the intermediate region, in which the width of the new lane is assumed to increase linearly until reaching its final width (for example)—step 3, FIG. 12.

Figure 23:
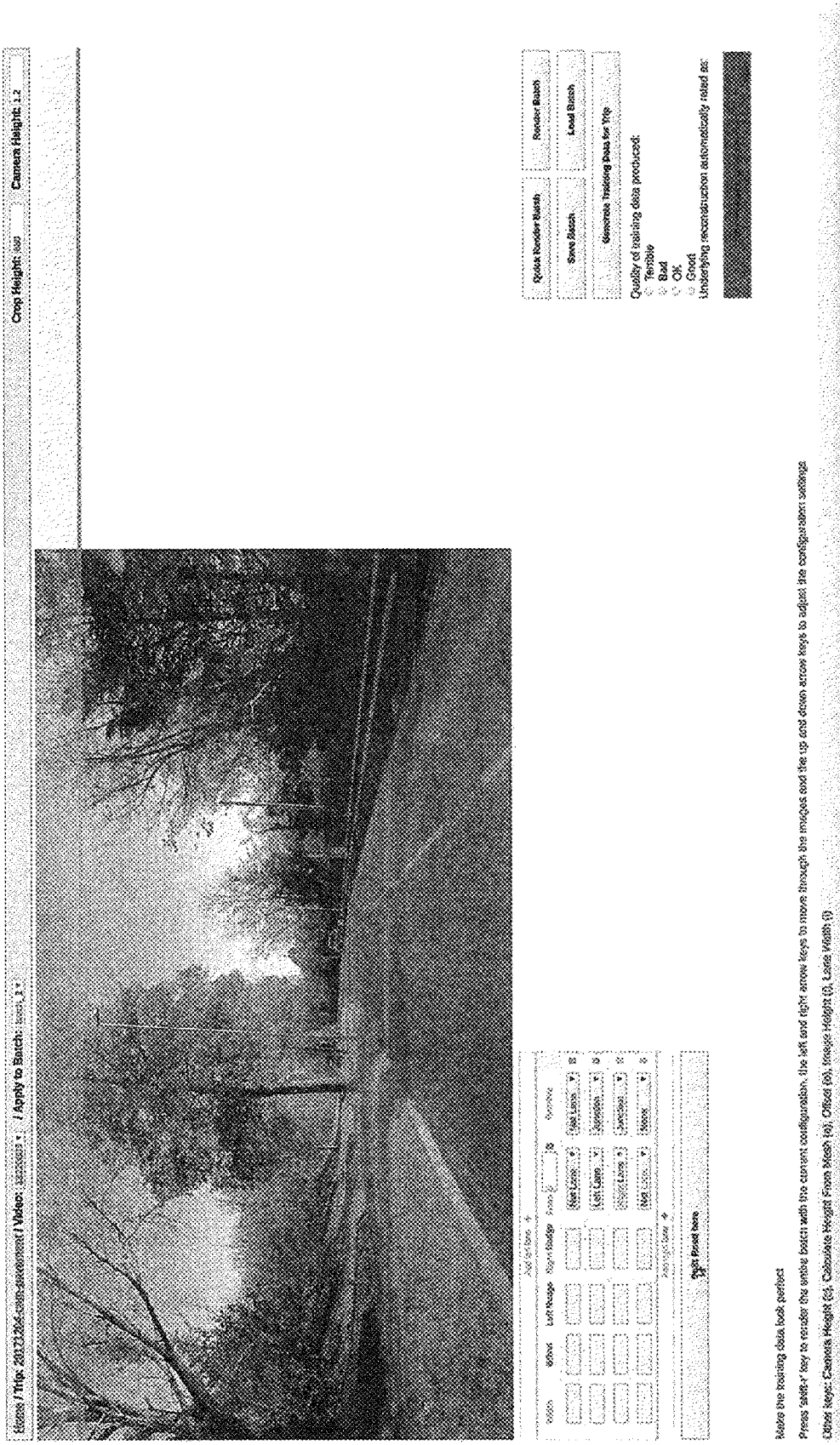
Figure 24:
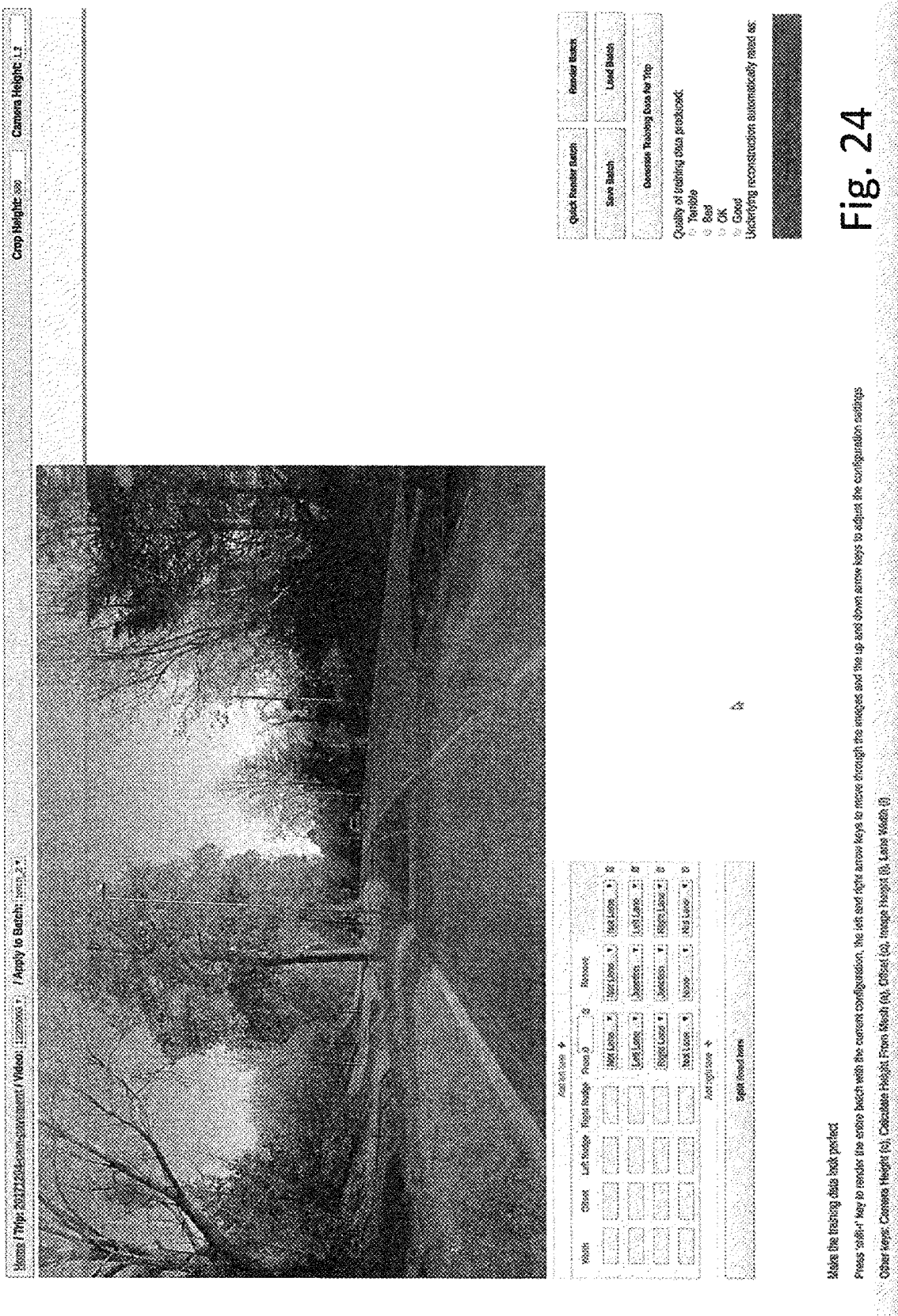

FIGS. 23 and 24 show an example of this. In FIG. 23, the user has selected the option to split the video shortly after the junction of FIG. 22, to accommodate the fact that there is now a wider non-drivable region of road on the right hand side, which the user has annotated accordingly in FIG. 24.

As an extension, the user can also mark an area of sky in the images. This can be a simple case of the user defining a sky line, above which all of the images are definitely sky. Even though this will not label all of the sky in the images, this can still be useful in preventing the trained neural network from identifying sky as road structure. More sophisticated techniques could use the 3D road structure to infer a sky line in each image, e.g. based on the highest point of the road in 3D space.

Extensions Beyond Lane Training Data:

Any feature in the video that is parallel to the path followed can benefit from the same speed up in annotation and single click addition by the human annotator.

12) For example, the road markings can be annotated in this way. Both in position and type. Including centre dashed or solid lines, road edge lines, double yellow lines etc. For example, cycle lanes can be added in this way, as can pavements.

Figure 20:
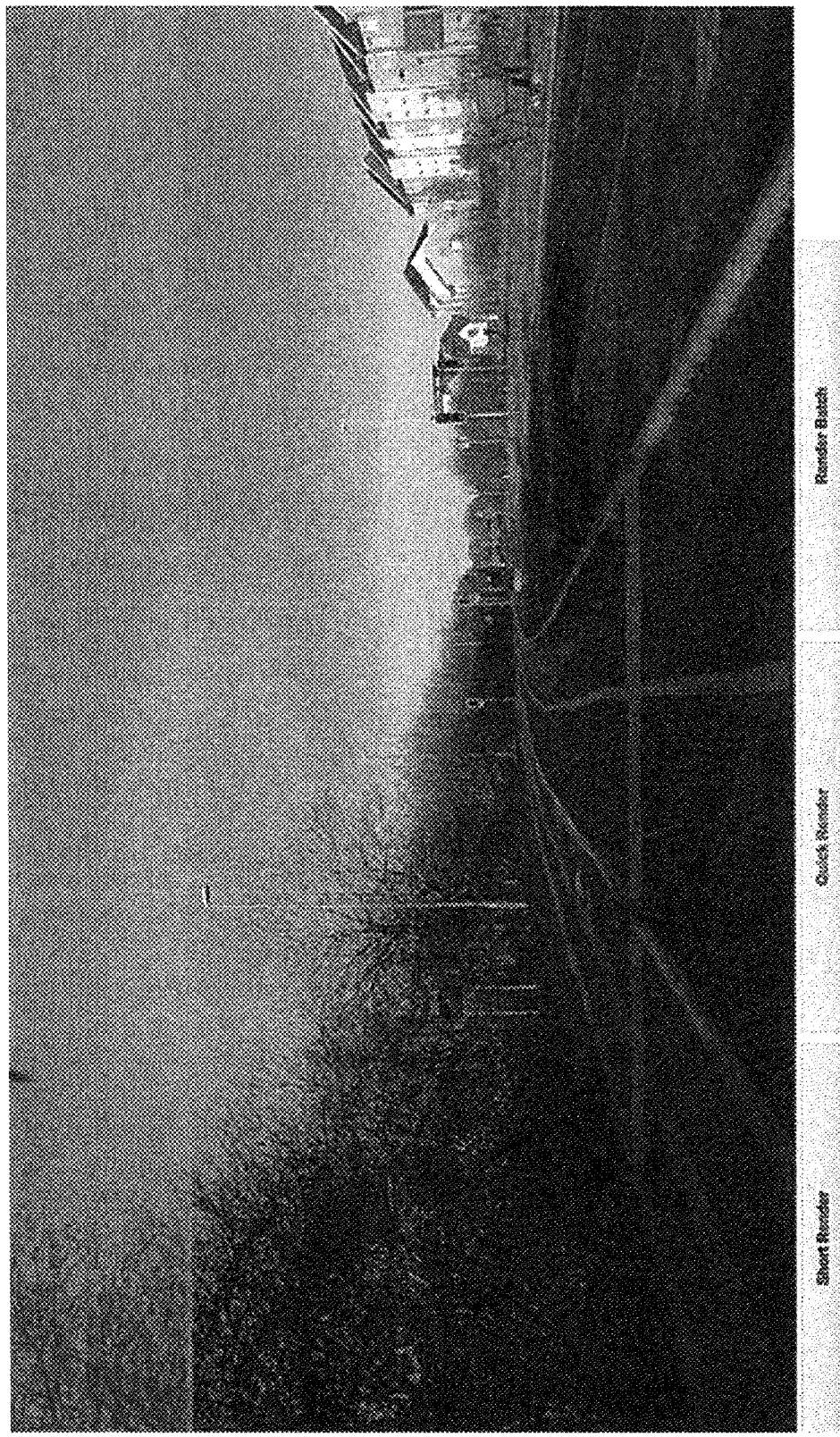

FIG. 20 shows an example of an image in which a cycle lane is marked, to the left-hand side.

Annotating Objects

Returning briefly to FIG. 4A, in addition to the above-described components, an object annotation component 420 is shown. This represents an object annotation function of the image processing system, which allows objects which are not part of the road to be annotated efficiently, based on certain about the relationship of such objects to the 3D road model.

The object annotation component 420 is shown having inputs connected to the 3D road modelling component 404 and the UI 412 respectively, and an output for providing object annotation data both for rendering by the rendering component 416 and for storage in the electronic storage 414.

The functionality of the object annotation component 420 will now be described.

Static Objects

Any feature in the video stationary in the world can benefit from some level of speed up. Even if they cannot directly be created as a result of their shape being parallel to the path driven, they can still benefit from the fact that they can be marked up by a human in one frame of the video and automatically propagated through to all frames of the video.

13) For example, road signs can be annotated in this way. The sign can be specifically marked out by a human in one frame (with or without any initial hint provided by a poor-quality detection) and then automatically propagated though the entire set of images in the video.

Annotation for stationary vehicles can be generated in this same way. Although the technique does not automatically allow annotation of moving objects to be sped up in the same way, the technique can be used for parked vehicles. Thus, allowing a subset of vehicles in the scene to be annotated with minimal effort. Moving vehicles could be annotated by marking the same object in multiple (at least two) images and assuming constant speed in-between the annotations. Then the label can be propagated to all images in-between the annotated ones.

14) Note that vehicles that are stationary look just the same as vehicles that are moving, so a neural network trained on annotated images of stationary vehicles, can be used at run time to detect moving vehicles.

Figure 21:
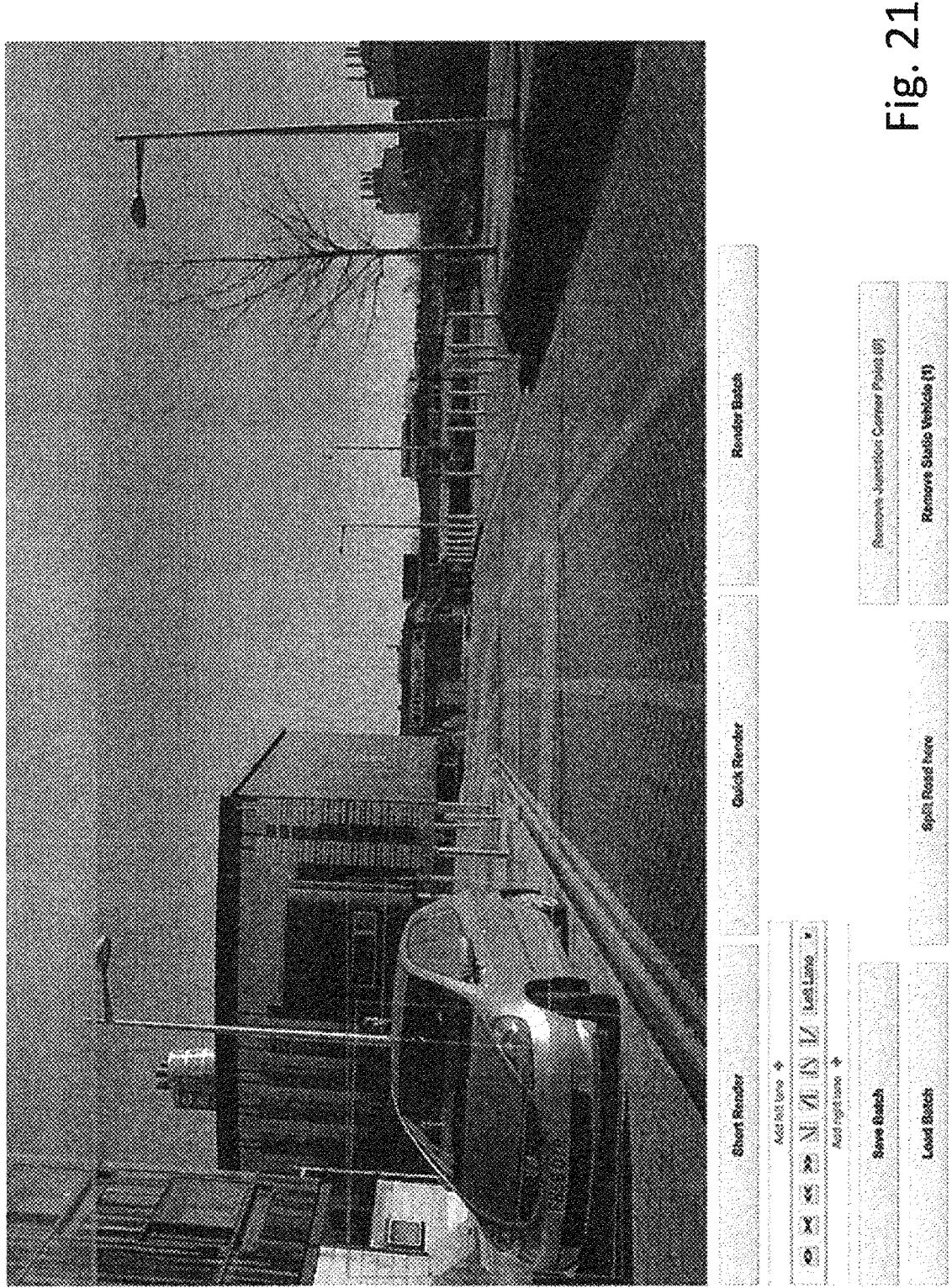

FIG. 21 shown an image in which a 3D bounding box of a vehicle is being added.

Another benefit of this technique is that the human can choose to annotate an object in an image in the video when the camera is close to it (i.e. when the object is large). This accurate annotation is then propagated to all images even when the object is small within the image.

15) Since there is a 3D model underlying the whole sequence of images in the video, then annotations automatically generated when the object is more distant from the camera will have the accuracy of annotation when the object was large and annotated by a human. This can often be more accurate than could be achieved by a human trying to annotate the small image of the object.

FIG. 21 considers a static object. An extension of this technique to moving objects (i.e. moving relative to the road) will now be described.

Annotating Moving Objects

An extension of the above techniques to moving objects will now be described (i.e. moving relative to the road such that, unlike static objects, they do not maintain a fixed position relative to the road).

Using the 3D vehicle path, together with certain reference parameters that may be derived from the images themselves, a 3D model road model is determined. The road is modelled as a 2D manifold embedded in 3D space. By geometrically projecting the road model into the image planes of the captured images, those images can be efficiently annotated with 2D road structure annotations.

Fast data annotation software allows a 3D model of the path of the ego vehicle to be reconstructed, from which the path of the road can be inferred. The basic insight is that the camera vehicle nearly always follows a lane, so the vehicle trajectory implies a likely lane path in 3D space. This allows a set of parallel lanes of a road to be annotated very efficiently, since lane structures can be automatically generated that already follow the road's shape.

In some implementations, a degree of manual annotation inputs are provided via a user interface (UI) in respect of a small number of 2D images. These are used, together with the 3D road model, to extrapolate those inputs to other images automatically.

Structure of the road, such as individual lanes, is also modelled. Lanes can be added to the model efficiently via the UI, on the assumption that lanes run parallel to the ego vehicle path VP.

The reconstructed vehicle path VP is used to determine a 3D road model, on the assumption that the shape of the reconstructed vehicle path corresponds to the shape of a road and/or lane (referred to generally as road shape) along which the vehicle is travelling.

Annotating Moving Objects

The functionality of the above image processing system can be extended in the present context to provide efficient annotation of other vehicles moving on the same road. Those images can then be used to train an object detector for example. The process is not limited to vehicles and can be applied to any object which can be assumed to move in a way that follows the shape of the road, such as pedestrians walking along a pavement beside the ego road.

In addition to understanding the lanes of the road, an autonomous vehicle also needs to recognise other road users, to avoid collisions. Training data for this task can be generated by annotating other vehicles, cyclists and pedestrians in video taken from the car.

Annotating a static object such as a parked car, as in the FIG. 21, is relatively straightforward, since once a correct location, orientation and extent is established in the 3D model (by annotating the object with respect to one frame), this annotation will be valid for all frames in which the object is visible. However, a vehicle proceeding along the road is in a different location in 3D space in each frame, which would require each vehicle to be manually annotated in each frame.

Building on the insight that the path of the ego vehicle implies the path of the road, this is now reversed, to build in the assumption that that the inferred path of the road is a good prediction of the likely path of other vehicles. Once an annotator has annotated a moving vehicle at a single point in time, they can mark it as 'oncoming' or 'ahead', and the system then animates it along the road trajectory at a constant speed. To correct the speed, the animator moves to an earlier or later frame, and then repositions the annotation box to coincide with the position of the target vehicle at that point in time. This then yields an average speed between the two points; where the target vehicle accelerates or decelerates significantly while in view, further positions can be marked. Small lateral deviations, e.g. where the target vehicle driver took a slightly different line through a section of road, can similarly be annotated by slightly repositioning the annotation, and the system will interpolate between the different given offsets along the line of the road.

For many common cases of leading and oncoming traffic, this system makes it quick and easy to annotate other vehicles accurately.

Figure 29:
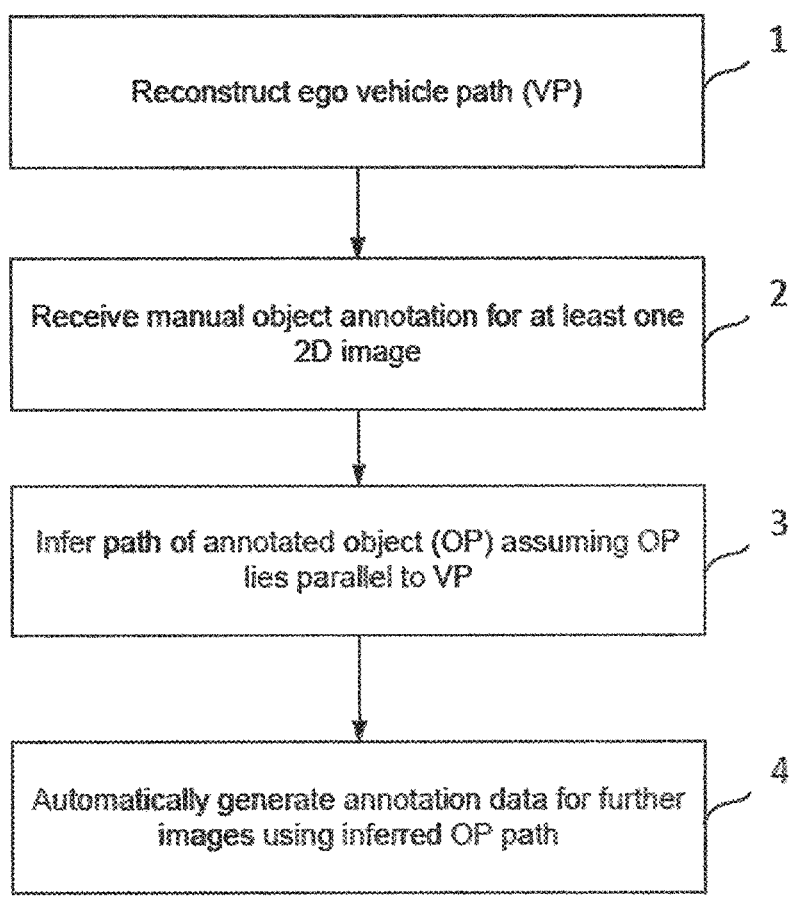
FIG. 29 shows a flow chart for a method of annotating moving objects.
Figure 30:
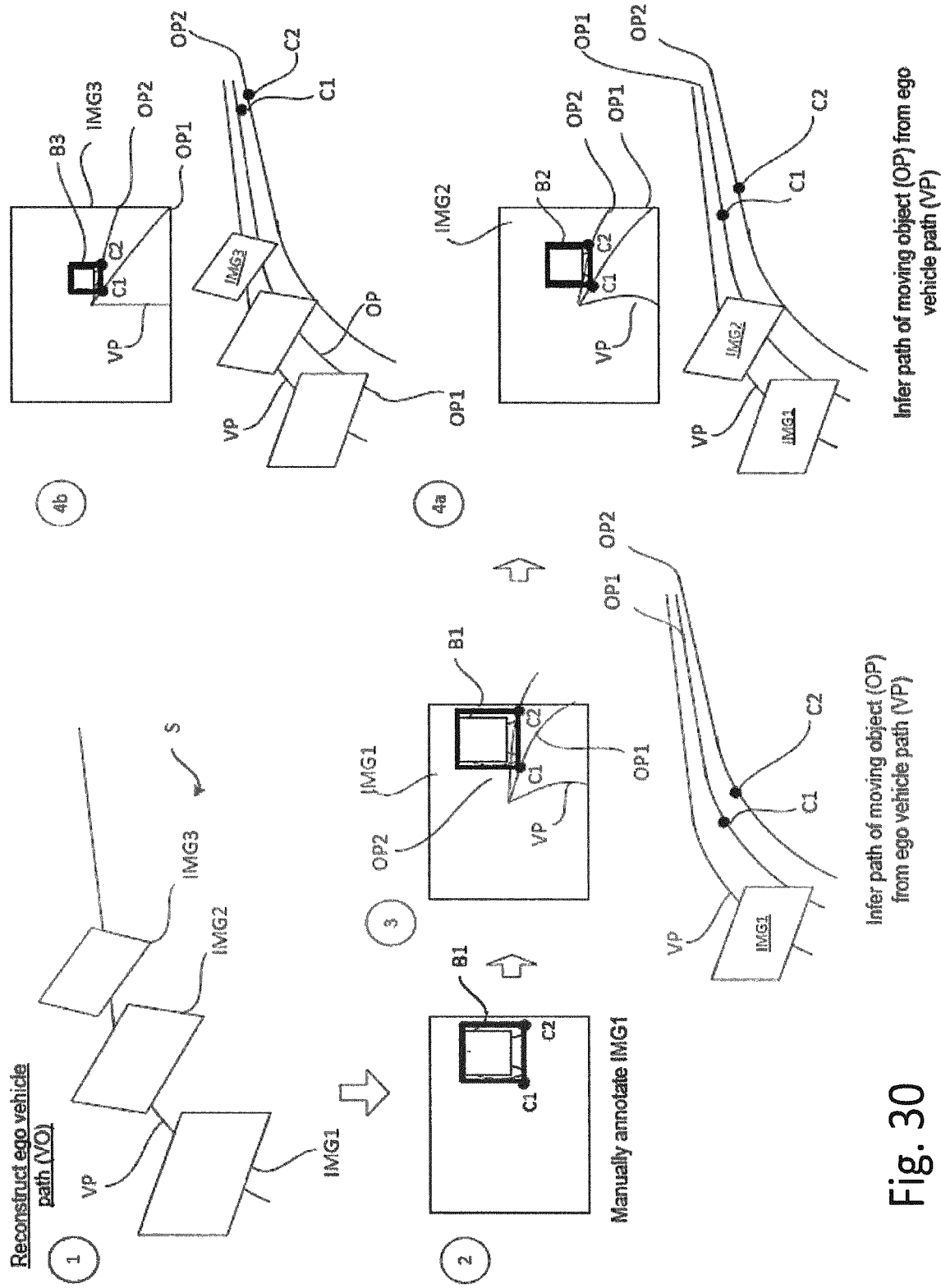
FIG. 30 shows a schematic illustration of how the steps of the method of FIG. 29 might be applied in practice.

FIG. 29 shows a flow chart for a method of automatically generating annotation data for moving objects, which is implemented in the above image processing system. FIG. 30 shows a graphical illustration of how the steps of FIG. 29 might be applied. Numbered circles are used in FIG. 30 to denote correspondence with steps of FIG. 29.

At step 1, a 3D road structure model is determined for a time sequence S of captured images using the above image processing methods. As indicated, the road is modelled as a 2D manifold (surface) in 3D space. This is based on a 3D reconstruction of the ego vehicle path VP. The processing also estimates a forward direction f (the direction in which the ego vehicle is travelling at that point) and a road surface normal n (perpendicular to the road surface—vertical direction herein) at different points along the reconstructed vehicle path VP. These define a direction r=f×n perpendicular to the forward direction f and road surface normal n (the lateral direction).

FIG. 30 shows three images IMG1, IMG2 and IMG3 of the time sequence S but the time sequence may contain any number of images. The time sequence S may for example be formed of frames of a short video sequence captured by the ego vehicle's camera.

At step 2, at least one of the images is manually annotated to mark a location of a moving object in the image.

In the example of FIG. 30, IMG1 is manually annotated via the UI to define a 2D bounding box B1 around a moving object (which is another vehicle) visible in IMG1.

Under the assumption that the moving object travels along a path OP that lies parallel to the reconstructed ego vehicle path VP, it becomes possible to estimate the moving object path OP from only the manually-annotated bounding box B1 and the reconstructed ego vehicle path VP (step 3).

This can be formulated as an assumption that the path OP of moving object maintains a fixed lateral offset (i.e. in the direction of r) and a fixed vertical offset (i.e. in the direction of the road surface normal n) from the ego vehicle path VP (elevation from road surface).

In the example of FIG. 30, two 3D paths OP1 and OP2 are determined for the other vehicle, which are paths traced by reference points C1, C2 on the bottom edge of the bounding box B1—in this example, at the lower two corners of the bounding box B1. The reference points C1 and C2 are assumed to lie in the plane of the road, i.e. with zero vertical offset from the ego vehicle path VP. Hence the object paths OP1 and OP2 can be uniquely defined as paths in 3D space that have a fixed lateral offset and a zero vertical offset from the ego vehicle path VP, and which, when geometrically projected back into the image plane of IMG1, intersect the reference points C1, C2 of the manually annotated bounding box B1. Initial locations of C1 and C2 in 3D space are also known to be the points in 3D space corresponding to the points in the 2D image plane of IMG1 at which C1 and C2 intersect OP1 and OP2 respectively.

As will be appreciated, the lower bounding box corners are just one example of suitable reference points at road height, and other suitable reference points may be used instead. For example, the locations of the upper corners of the bounding box B1 of IMG1 may be assumed to lie vertically above C1 and C2. In general, the manually annotated bounding box B1 can be mapped from the 2D image plane of IMG1 to any suitable representation in 3D space by exploiting the geometry of the 3D road model.

Figure 33:
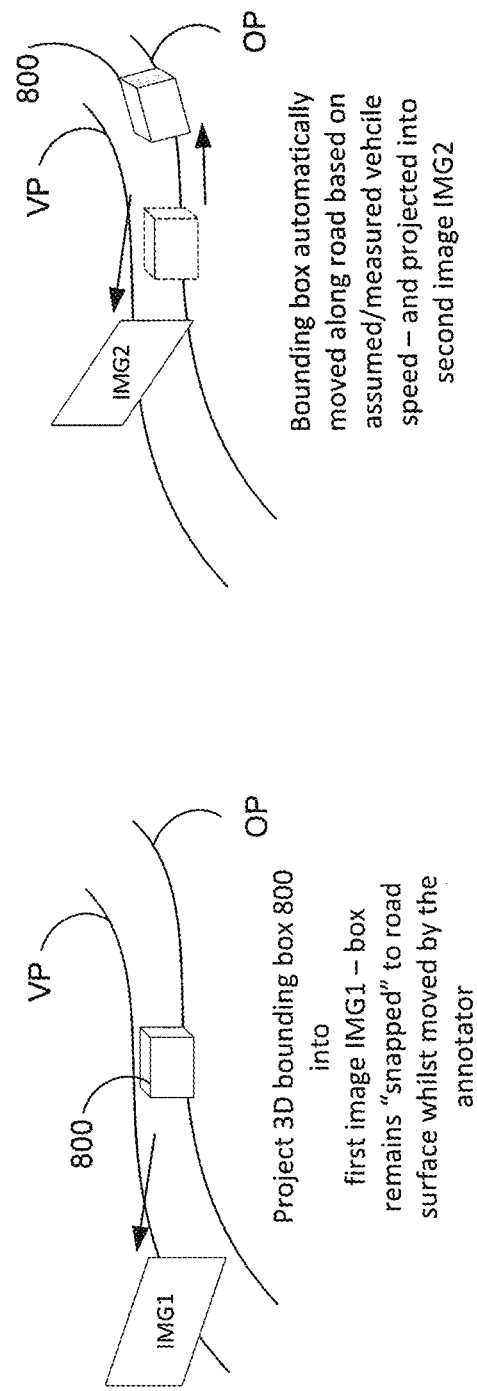
FIG. 33 shows how the steps of the method of FIG. 29 may be applied to a 3D annotation element, for generating 2D and/or 3D annotation data.

As another example, another way of establishing the initial location in 3D space is as follows. The animator starts with a 2D annotation, which is projected into 3D space to create a 3D annotation element representing the moving object, which is a cuboid in 3D space in this example (3D bounding box) but which can take different geometric forms. This is illustrated in FIG. 33, in which the 3D annotation element is denoted by reference numeral 800.

Alternatively, the 3D annotation element can be placed at multiple locations in 3D space, and projected back into the image plane of a first frame.

The cuboid 800 is located in 3D space at an initial location under the assumption that 3D element is at a predetermined elevation from the road surface. For example, it may be assumed that the four lowest corners of the cuboid have zero separation from a defined road surface in the direction of the road surface normal n. The road surface is defined as lying flat in the lateral direction (r) at every point along the reconstructed vehicle path VP (although it is not assumed to lie flat generally—in the forward direction f it is defined as following the shape of the vehicle path VP). The annotator then provides manual annotation inputs, via the UI 412, in response to which the cuboid may be re-located, but maintaining this fixed elevation to the road surface (fixed vertical elevation from the vehicle path VP). The cuboid is projected back into the plane of the current image IMG1, so the annotator can see when it is correctly placed. By imposing the geometric restriction of a fixed elevation from the road surface, the annotation element can be accurately placed in 3D space using only a 2D view. The annotator is also able to edit the size, shape etc. of the annotation element in 3D space to match it to the 2D image manually.

For a moving vehicle, for example, the assumption may be that the moving vehicle sits on the road surface at all times as it moves along the path, e.g. that one or more predetermined reference points of the object annotation element (e.g. the four bottom corners of a cuboid) have a zero or substantially zero vertical separation from the road surface.

Having determined a representation of the bounding box in 3D space for IMG1, this can then be "animated" for further images (e.g. IMG2 in FIG. 33), in 3D space, exploiting the assumed knowledge as to the 3D path of the moving object. By moving the 3D representation of the bounding box (e.g. cuboid) 800 to its assumed location relative to the capture location of a further image IMG2, annotation data can be automatically generated for that image IMG2 by geometrically projecting the moved representation 800 into the image plane thereof.

At step 4, the path information determined at step 3 is used to automatically annotate further images in the sequence. In order to annotate a further image (e.g. IMG2 or IMG3), it is assumed the reference points C1 and C2 have moved a certain distance along paths OP1 and OP2 respectively, relative to their initial locations that are known from the manual annotation of IMG1. This provides the locations of those reference points C2, C3 relative to the capture location of the further image, which in turn allows hounding boxes (e.g. B2 or B3 for IMG2 and IMG3 in FIG. 30) to be automatically generated, by geometrically projecting the reference points C1, C2 back into the image plane of the further image (e.g. IMG2, IMG3).

Following the example of FIG. 30, it is assumed that the reference points C1, C2 remain on the object paths OP1 and OP2 respectively and the only unknown is the distance travelled along those paths.

In the alternative example described above, where the cuboid is placed in 3D space on the assumption of a fixed elevation from the road surface, a single expected path for the cuboid can be defined in 3D space in exactly the same way, relative to a path reference point (e.g. centre point, corner etc.) of the cuboid. This path reference point is moved along the expected 3D path in the same manner, to determine the new location of the cuboid. The expected path is determined on the assumption that (i) it follows the expected shape of the road (as derived from the vehicle path VP), and (ii) the predetermined elevation from the road surface is maintained (e.g. the four lowest corners stay at road height at all times, or that the applicable reference point(s) maintains a predetermined elevation from the road surface). As will be appreciated, this operates on the same underlying principles, and all description herein pertaining to C1 or C2 on OP1 and OP2 applies equally to a reference point, as defined with respect to a 3D annotation element such as a cuboid established, and 3D path thereof. In that event, the further annotation data is automatically generated by geometrically projecting the cuboid into the image plane of e.g. IMG2 or IMG3, once it has been moved to the relevant expected location using the above assumptions.

In the event that only a single image is manually annotated, it is assumed that the other vehicle is moving at the same speed of the ego vehicle. Hence, in this case, when annotating a further image (e.g. IMG2 or IMG3), if the ego vehicle has moved a distance $D_V$ along the ego vehicle path VP relative to the capture location of IMG1, it is assumed that the other vehicle has also moved a distance $D_V$ along its path, and that the reference points C1 and C2 have therefore moved a distance $D_V$ along paths OP1 and OP2 respectively.

When at least two images in the sequence S are manually annotated, this allows the speed of the other vehicle to be estimated, a speed estimation component 422 of the object annotation component 420. This can be a straightforward linear extrapolation, wherein if the other vehicle is determined to have moved a distance $D_0$ between the two manually annotated images two images captured at time T apart, then the reference points C1, C2 can be assumed to have travelled a distance $$D'_0 = D_0 * \frac{T'}{T}$$

along OP1 and OP2 respectively between two images captured time T' apart.

This can be refined via the UI 412. For example, when a user first annotates an image with an object bounding box, the system will initially estimate the other vehicle's speed as matching the ego vehicle's speed.

When the user moves to the next (or a later) image in the sequence, that image will be automatically annotated on the assumption that the other vehicle is travelling at the same speed as the vehicle. If this looks correct, the user can simply keep moving though the sequence. However, if the annotation is incorrect, the user can manually adjust it. In so doing, the user has now accurately annotated two images, which in turn allows the system to refine the other vehicle speed estimate. When the user moved on again, the next image is annotated automatically using the refined speed estimate, and will therefore likely be of acceptable accuracy (unless the other vehicle's speed has changed significantly).

In any event, knowledge of the road layout that is known from the 3D road model can be used to infer the direction of travel. For example, where the other vehicle is determined to be in a lane that is marked as oncoming traffic, it can be assumed to be travelling in the opposite direction to the ego vehicle.

As another example, the 3D annotation element could be 3D model of the moving object (non-cuboidal and more accurate than a 3D bounding box). A benefit of a 3D model is that, when projected back into the image place, it can provide more accurate 2D annotation data, such as a more tightly fitted 3D bounding box. A 3D model can also be used to generate 2D annotation data in the form of a segmentation mask, where the aim is to essentially trace the outline of the object in the image plane. This can be used for instance segmentation training, for example.

Validation Images

Another extension to the above stems from the realization that where objects are located in relation to the surrounding road structure provides a useful layer of information for the purpose of validating a trained object detector. Validation is a process of testing that a trained model can perform with acceptable accuracy on images it as not encountered during training, and is hence a structured test of the model's ability to generalize.

In the context of autonomous driving, there are particular circumstances in which accurate object detection is critical, and circumstances in which object detection, whilst potentially useful, is not critical. A simple example is that it is critical for an AV to be able to accurately detect and localize other vehicles on the road, but less critical for it to detect parked vehicles individually at the side of the road.

As indicated, as part of the above image processing system, a road model is created with detailed road structure, which may include for example individual lanes, parking areas to the side of a road, non-drivable areas (pavements, bus lanes etc.). When object annotation is performed using that model as a basis, as described above, a consequence is that it is straightforward to infer, for any given image, where an annotated object is in relation to the road structure—for example, whether it is in the ego lane (the lane in which the ego vehicle is travelling), or a different lane, or in a parking area etc.

This in turn allows the images to be tagged or otherwise categorized with such information, i.e. tags or other categorization data can be associated with the image to provide information about what objects in contains and, importantly, how those objects relate to surrounding road structure. This in turn allows specific types of images to be located for the purpose of validation. In particular, images which capture a context in which accurate object detection is critical, because of the way in which other vehicles are located relative to the surrounding road structure, can be identified and used for the purposes of validation to ensure the object detection model is able to achieve acceptable results on such critical images.

User Interface Extensions

A number of user interface features are also provided to facilitate fast annotation of both static and moving objects. These will now be described.

Whilst the above image processing considers 2D images only, albeit annotated using a 3D road model, the present techniques can be extended to 3D structure data. For example, 3D structure data may be derived from stereo image pairs, LiDAR, RADAR etc. or a combination of multiple such sensor modalities.

In the context of the image processing examples described above, frames took the form of 2D images. With the extensions to 3D structure data, the term frame also encompasses 3D frames, and the steps of FIG. 29 can also be applied to 3D frames.

In this 3D context, a 3D frame can be any captured 3D structure representation, i.e. comprising captured points which define structure in 3D space (3D structure points), and which provide a static "snapshot" of 3D structure captured in that frame (i.e. a static 3D scene. The frame may be said to correspond to a single time instant, but does not necessarily imply that the frame or the underlying sensor data from which it is derived need to have been captured instantaneously—for example, LiDAR measurements may be captured by a mobile object over a short interval (e.g. around 100 ms), in a LiDAR sweep, and "untwisted", to account for any motion of the mobile object, to form a single point cloud. In that event, the single point cloud may still be said to correspond to a single time instant, in the sense of providing a meaningful static snapshot, as a consequence of that untwisting, notwithstanding the manner in which the underlying sensor data was captured. In the context of a time sequence of frames, the time instant to which each frame corresponds is a time index (timestamp) of that frame within the time sequence (and each frame in the time sequence corresponds to a different time instant).

In the following examples, each frame is in the form of an RGBD (Red Green Blue Depth) image captured at a particular time instant. An RGBD image has four channels, three of which (RGB) are colour channels (colour component) encoding a "regular" image, and the fourth of which is a depth channel (depth component) encoding depth values for at least some pixels of the image. RGB is referred to by way of example however the description applies more generally to any image having colour and depth components (or, indeed, to images having only depth components). In general, the colour component of an image can be encoded in any appropriate colour space using one or more colour channels (including grayscale/monochrome). The point cloud computation component 302 converts each frame to point cloud form to allow that frame to be annotated in 3D space. More generally, a frame corresponds to a particular time instant and may refer to any set of data in which a static "snapshot" structure, i.e. a static 3D scene, has been captured for that time instant (such as multiple RGBD images, one or more point clouds etc.). Hence, all description pertaining to RGBD images in the following applies equally to other forms of frame. Where the frames are received at the annotation system 300 in point cloud form, the point cloud conversion is unnecessary. Although the following examples are described with reference to point clouds derived from RGBD images, the annotation system can be applied to any modality of point cloud, such as monocular depth, stereo depth, LiDAR, radar etc. A point cloud can also be derived two or more such sense modalities and/or from multiple sensor components of the same or different modalities, by merging the outputs of different sensors. Hence, the term "point cloud of a frame" can refer to any form of point cloud corresponding to a particular time instant, including a frame received at the annotation computer system 300 in point cloud form, a point cloud derived from a frame (e.g. in the form of one or more RGBD images) by the point cloud computation component 302, or a merged point cloud.

As noted, although a frame corresponds to a particular time instant, the underlying data from which the fame is derived may be captured over a (typically short) time interval, and transformed as necessary to account for the passage of time. So the fact that a frame corresponds to a particular time instant (e.g. denoted by a timestamp) does not necessarily imply the underlying data has all been captured simultaneously. Hence, the term frame encompasses point clouds received at time stamps different to the frame e.g. a lidar sweep that is captured over 100 ms is 'untwisted' into a single point cloud for a particular time instant (such as the time that the image was captured). The time series of frames 301 may also be referred to as a video segment (noting that the frames of the video segment need not be images and may for example be point clouds).

FIGS. 31 and 32A-E show a schematic illustration of an example annotation interface 300 that may be used to efficiently place initial 3D bounding boxes in step 3 of the method of FIG. 29. That is, the initial two bounding boxes placed around a moving object from which bounding boxes for other frames may be extrapolated based on assumption of e.g. (i) constant (or otherwise known e.g. assumed or measured) speed and (ii) the moving object following the shape of the road (as noted above, manual placement of a single 3D bounding box will also suffice in the event that the speed of the external vehicle can be assumed to match that of the ego vehicle).

Figure 31:
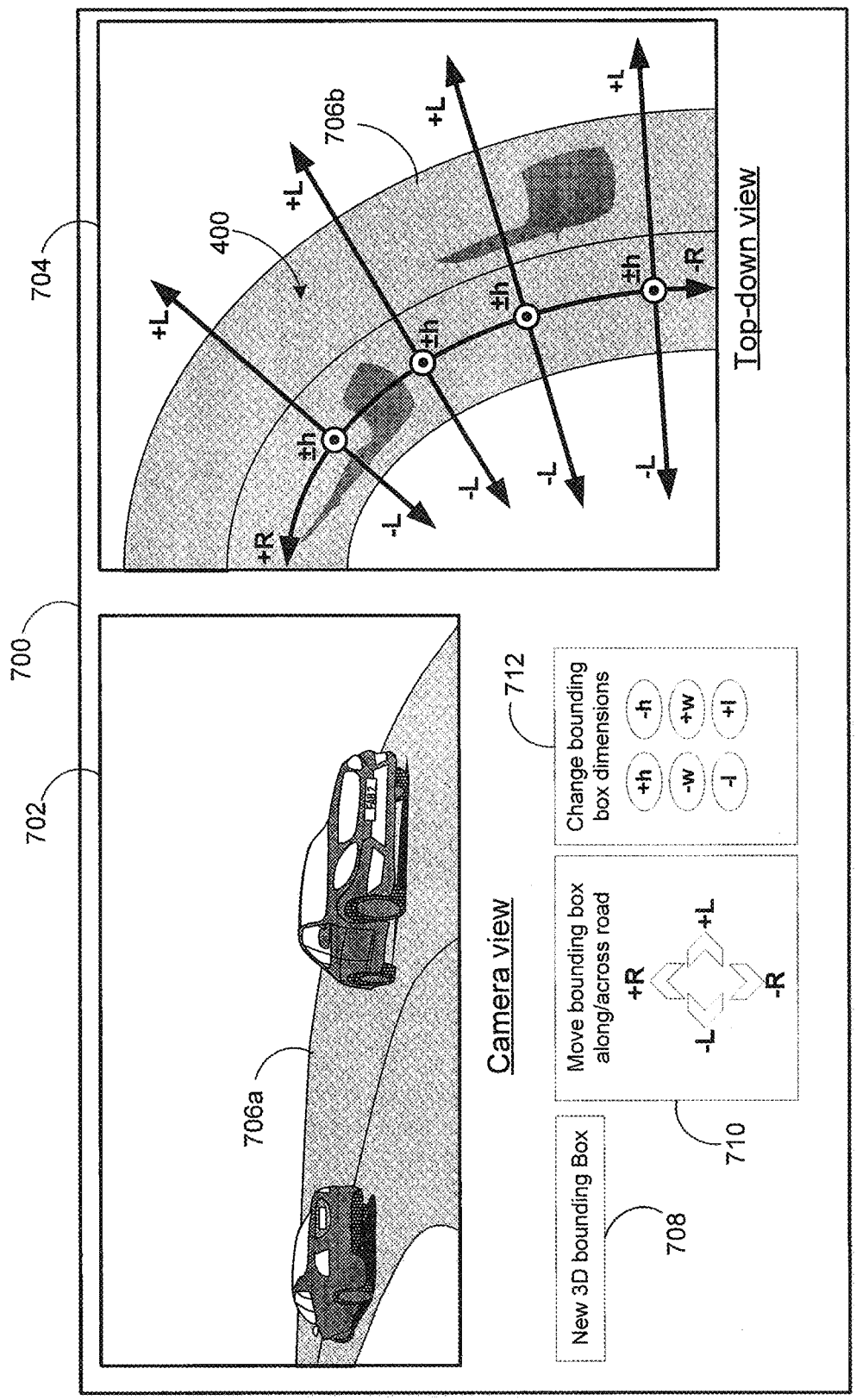
FIG. 31 shows an example of an annotation interface for annotating 3D frames.

FIG. 31 shows a schematic illustration of an annotation interface 700 which may be rendered via the UI 412.

Within the annotation interface 700, the colour component of an RGBD image 702 (current frame) is displayed on the left-hand side. On the right-hand side, a top-down view 704 of the point cloud 400 of that frame is displayed.

In addition, a projection 706a of the 3D road model into the image plane of the RGBD image is overlaid on the displayed image 702. Likewise, a projection 706b of the 3D road model into the top-down view is displayed overlaid on the top-down view of the point cloud 400.

A selectable option 708 is provided for creating a new 3D bounding box for the current frame. Once created, selectable options 710 and 712 are provided for moving and re-sizing the bounding box respectively.

The options 710 for moving the bounding box include options for moving the bounding box longitudinally along the road in either direction (±R, as shown in the top-down view on the right-hand side), and laterally across the road the road (±L).

The options 712 for re-sizing the bounding box include options for changing the width (w), height (h) and length (l) of the bounding box.

Although depicted as displayed UI elements, the associated inputs could alternatively be provided using keyboard shortcuts, gestures etc.

An example workflow for placing a 3D annotation object will now be described. As will be appreciated, this is just one example of the way in which the annotator can utilize the annotation functions of the annotation interface 700.

Figure 32A:
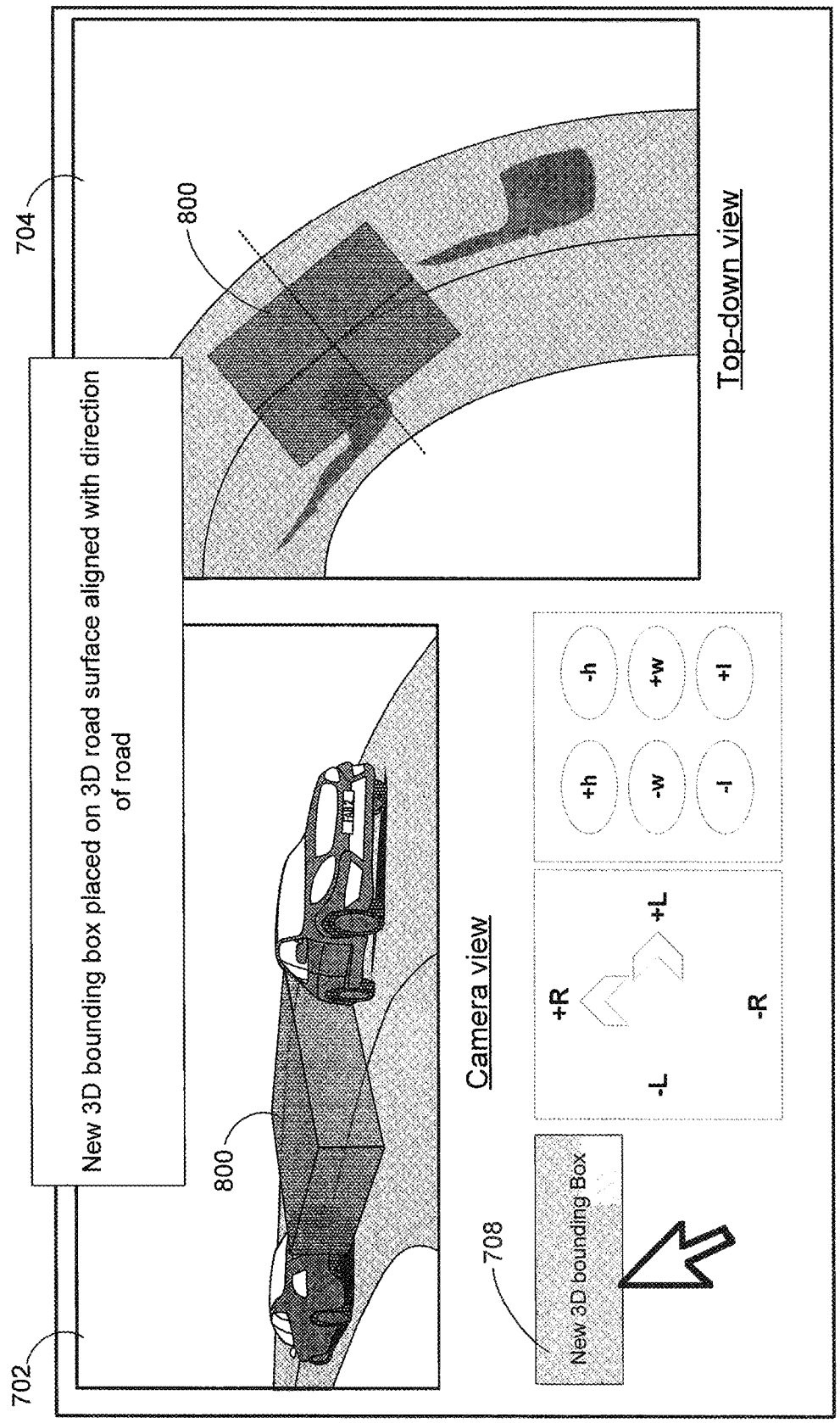
FIGS. 32A-E show an example of the extended annotation interface in use.

FIG. 32A shows the annotation interface once a new bounding box 800 has been created. The bounding box 800 is placed at an initial location in 3D annotation space at road height and oriented parallel to the direction of the road at that location (as captured in the 3D road model). To assist the annotator, the 3D bounding box 800 is projected into both the image plane of the displayed image 702 and the top-down view 704.

Figure 32B:
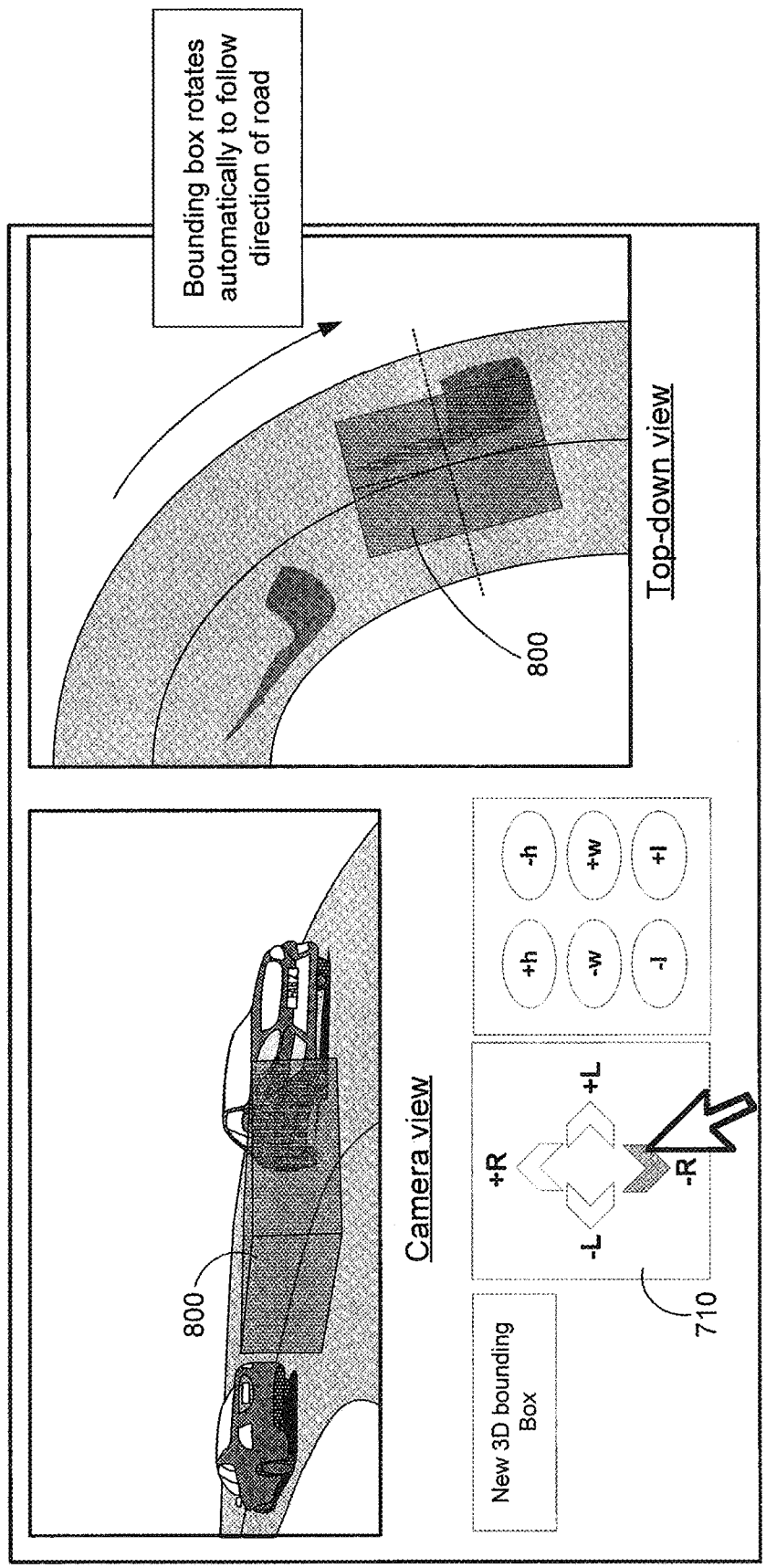

As illustrated in FIG. 32B, as the annotator moves the bounding box 800 along the road, in the +R direction, the bounding box 800 is automatically re-orientated so that it remains parallel with the direction of the road. In this example, the aim of the annotator is to manually fit the bounding box 800 to the vehicle that is visible in the right half of the image and faces into the image plane.

Figure 32C:
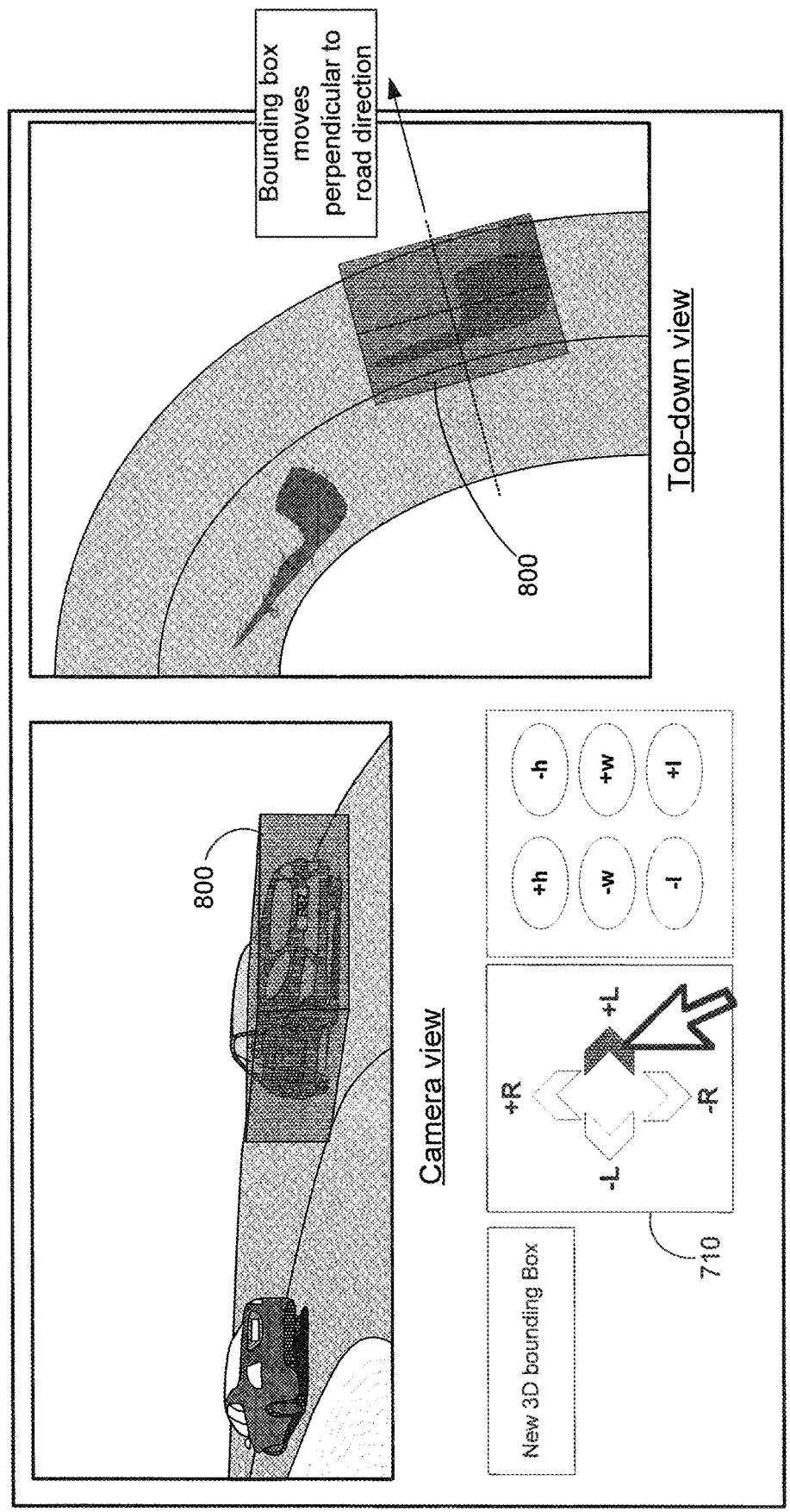

As illustrated in FIG. 32C, once the annotator has moved the bounding box 800 to the desired location along the road, he then moves it laterally, i.e. perpendicular to the direction of the road, to the desired lateral location—in the +L direction in this example.

Figure 32D:
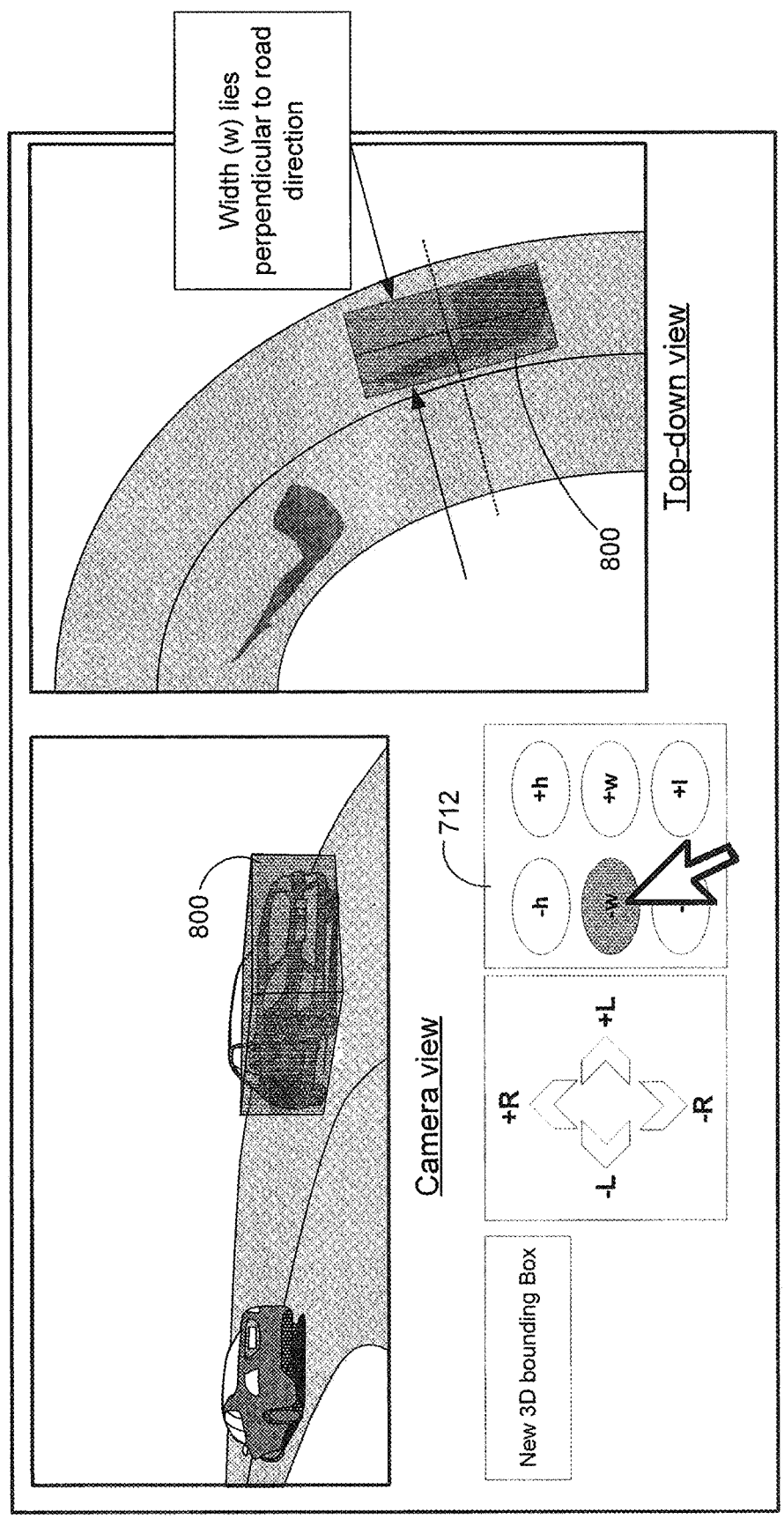
Figure 32E:
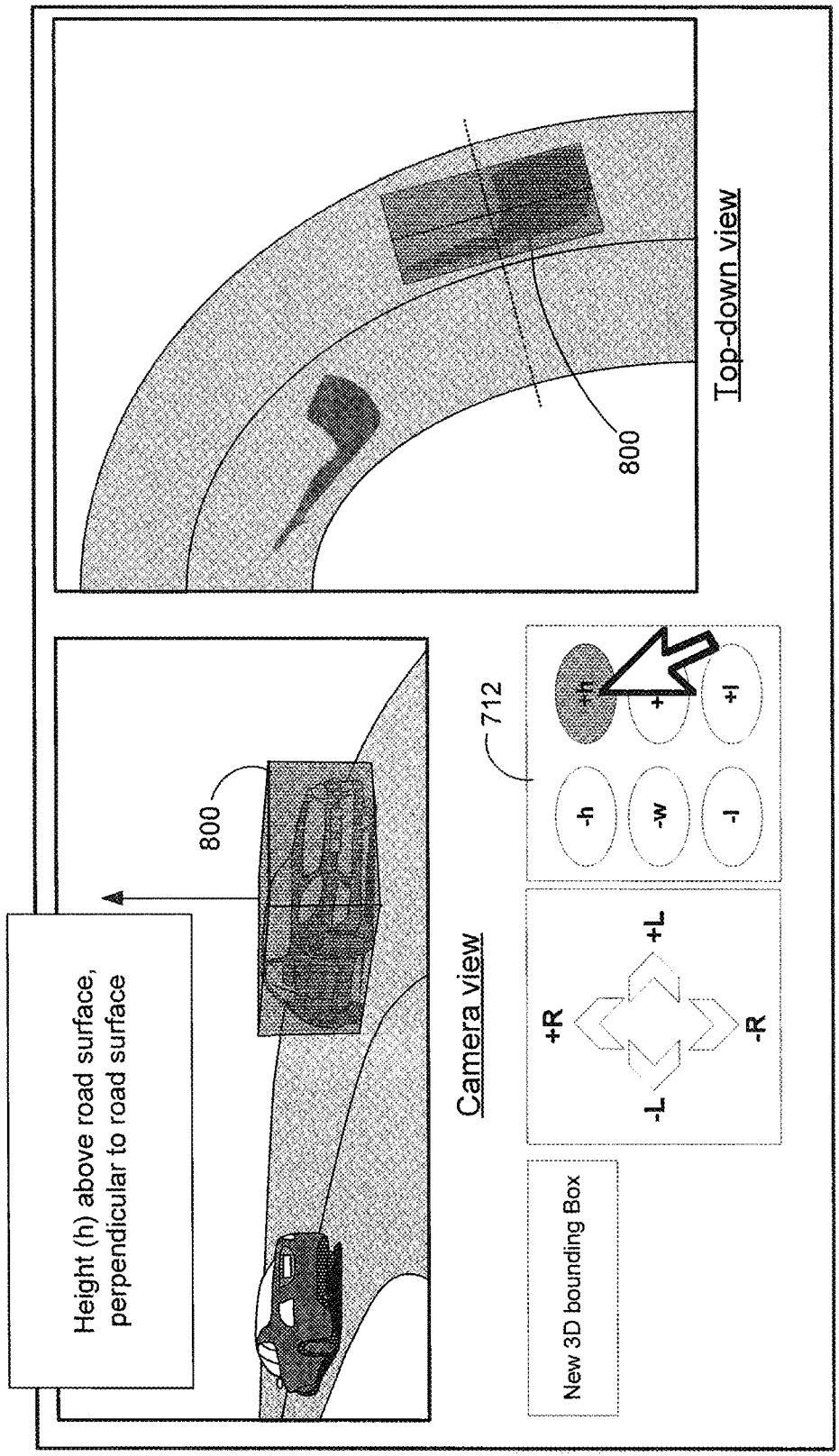

As illustrated in FIGS. 32D and 32E respectively, the annotator then adjusts the width (decreasing it in this case, denoted by "−w") and height (increasing it, denoted by "+h") of the bounding box 800 as appropriate. It happens that no length adjustments are required in this example, but the length of the bounding box could be adjusted as needed in the same way. The width dimension of the bounding box 800 remains parallel to the direction of the road at the location of the bounding box 800, and the height dimension remains perpendicular to the surface of the road at the location of the bounding box 800.

The above example assumes that the bounding box 800 remains bound to the 3D road model as it is adjusted. Although not depicted, the annotation interface may also allow "free" adjustments, which are not constrained by the 3D road model, i.e. the annotator may also be able to freely move or rotate the bounding box 800 as needed. This may be useful for example when annotating vehicles whose behaviour deviates at times from the assumed behaviour (e.g. during a turn or lane change).

Having placed 3D bounding boxes in this manner for at least one moving object, steps 3 to 4 of the method of FIG. 29 can be applied in essentially the same way as described above. The location and orientation of the 3D bounding box 800 can be extrapolated in the same way, on the assumption he other vehicle follows the shape of the 3D road model. Just at the 3D bounding box 800 can be "snapped" to the 3D road model when making manual adjustments of the kind shown in FIGS. 32A-E, the 3D bounding box 800 can remain snapped to the 3D road model when automatically extrapolating between frames. The system moves the 3D bounding box longitudinally along the road between frames—in the same way as it would be moved by the user manually selecting the ±R options of the selectable options 710)—but can now do so automatically by an automatically determined amount determined from the speed of the vehicle and a time interval between the frames.

Note that, in this context, the desired 3D annotation data could be 3D annotation data. That is, 3D annotation data in this context is not only used to determine 2D annotation data for the moving object for training a 2D machine learning perception component, but as an alternative, or in addition, 3D annotation data may be used to train a machine learning component to interpret 3D structure data.

As noted, the 3D annotation element 800 could alternatively take the form of a 3D model. With 3D frames, the 3D model can be derived from one or more of the 3D frames themselves, for example by selectively extracting points from the 3D frame(s) belonging to the 3D model.

By way of example reference is made to United Kingdom Patent Application Nos. 1910382.9, 1910395.1, 1910390.2 and 1910392.8, each of which is incorporated herein by reference in its entirety. These disclose techniques of object modelling based on 3D frames, which can be applied in this context. A 3D bounding box can be placed around an object in one or more 3D frames (e.g. manually), and a subset of points can then be extracted from with the 3D bounding box in the/each frame, to build a 3D model of the object, which can then be applied in other frame(s). That 3D model can be placed in that other frame(s) based on the assumed motion of the object along the road.

Alternative Road Modelling Methods

In the above, the road modelling component 404 applies "structure from motion" (SfM) processing which is applied to the series of 2D images in order to reconstruct the 3D path of the vehicle VP which captured the images (ego path). This, in turn, is used as a basis for extrapolating the 3D surface of the road along which the vehicle travelled. Moving objects can the be assumed to at least approximately follow the same road surface. This is based on 2D feature matching between the images of a video sequence (segment).

The road model may also be determined in alternative ways e.g. point cloud fitting e.g. the ego path could be based on 3D structure matching applied to the depth maps or point clouds, and/or using high accuracy satellite positioning (e.g. GPS). Alternatively, an existing road model may be loaded and frames may be localized, as needed, inside the existing road model.

More generally, examples of technologies which may be used to reconstruct the ego vehicle path VP include accelerometers/IMUs (internal measurement units—where the path may be reconstructed from internal sensor data), visual-odometry, LIDAR-odometry, RADAR-odometry, wheel encoders etc.

The aforementioned reference uses the 3D road model extrapolated from the vehicle's own path to efficiently generate 2D annotation data for annotating the structure of the road in the original images. In the present context, this is extended to allow a 3D bounding box to be placed efficiently around other objects on the road across multiple frames in a video segment, such as other vehicles, cyclists etc., by assuming that other road users generally follow the shape of the road over time.

REFERENCES

5. Brostow, G. J., Fauqueur, J., Cipolla, R.: Semantic object classes in video: A high-definition ground truth database. Pattern Recognition Letters 30(2) (2009) 88-97
6. Cordts, M., Omran, M., Ramos, S., Rehfeld, T., Enzweiler, M., Benenson, R., Franke, U., Roth, S., Schiele, B.: The cityscapes dataset for semantic urban scene understanding. CVPR (2016)
7. Neuhold, G., Ollmann, T., Bulo, S. R., Kontschieder, P.: The mapillary vistas dataset for semantic understanding of street scenes. In: Proceedings of the International Conference on Computer Vision (ICCV), Venice, Italy. (2017) 22-29
14. Brostow, G. J., Shotton, J., Fauqueur, J., Cipolla, R.: Segmentation and recognition using structure from motion point clouds. In: European conference on computer vision, Springer (2008) 44-57
15. Sengupta, S., Sturgess, P., Torr, P. H. S., Others: Automatic dense visual semantic mapping from street-level imagery. In: Intelligent Robots and Systems (IROS), 2012 IEEE/RSJ International Conference on, IEEE (2012) 857-862
16. Scharwachter, T., Enzweiler, M., Franke, U., Roth, S.: Efficient multi-cue scene segmentation. In: German Conference on Pattern Recognition, Springer (2013)
17. Fritsch, J., Kuehnl, T., Geiger, A.: A new performance measure and evaluation benchmark for road detection algorithms. In: 16th International IEEE Conference on Intelligent Transportation Systems (ITSC 2013), IEEE (2013) 1693-1700
18. Aly, M.: Real time detection of lane markers in urban streets. In: IEEE Intelligent 675 676 Vehicles Symposium, Proceedings, IEEE (2008) 7-12
19. TuSimple: Lane Detection Challenge (Dataset). http://benchmark.tusimple.ai (2017)
27. Barnes, D., Maddern, W., Posner, I.: Find Your Own Way: Weakly-Supervised Segmentation of Path Proposals for Urban Autonomy. ICRA (2017)
28. Mapillary: OpenSfM (Software). https://github.com/mapillary/OpenSfM (2014)
29. Badrinarayanan, V., Kendall, A., Cipolla, R.: Segnet: A deep convolu-f)" tional encoder-decoder architecture for image segmentation. arXiv preprint arXiv:1511.00561 (2015)
32. He, K., Gkioxari, G., Dollar, P., Girshick, R. B.: Mask R-CNN. CoRR abs/1703.06870 (2017)
33. Brabandere, B. D., Neven, D., Gool, L. V.: Semantic instance segmentation with a aki discriminative loss function. CoRR abs/1708.02551 (2017)
34. Li, S., Seybold, B., Vorobyov, A., Fathi, A., Huang, Q., Kuo, C. C. J.: Instance embedding transfer to unsupervised video object segmentation (2018)
35. Fathi, A., Wojna, Z., Rathod, V., Wang, P., Song, H. O., Guadarrama, S., Murphy, K. P.: Semantic instance segmentation via deep metric learning. CoRR 713 abs/1703.10277 (2017)
36. Kong, S., Fowlkes, O: Recurrent pixel embedding for instance grouping (2017)
37. Comaniciu, D., Meer, P.: Mean shift: A robust approach toward feature space analysis. IEEE Trans. Pattern Anal. Mach. Intell. 24(5) (May 2002) 603-61

| ANNEX A |
| --- |
| Algorithm 1 Automated ego-lane estimation |

| | |
|---|---|
| 1: | Measure height of the camera above road h |
| 2: | Apply OpenSFM to get $c_i$, $R_i$ |
| 3: | Estimate road normal n according Eq. (3) |
| 4: | Estimate forward direction f according Eq. (5) |
| 5: | Derive vector across road r according Eq. (4) |
| 6: | Set $w_i^{left} = \frac{1}{2}w$ and $w_i^{right} = -\frac{1}{2}w$, where w is the default lane width |
| 7: | Derive border points $b_i^{left}$, $b_i^{right}$ according Eq. (1) |
| 8: | for each frame i do |
| 9: | Get all future border points $\hat{b}_j^{left}$, $\hat{b}_j^{right}$, j > i according Eq. (2) |
| 10: | Draw polygons with edges $\hat{b}_j^{left}$, $\hat{b}_j^{right}$, $\hat{b}_{j+1}^{right}$, $\hat{b}_{j+1}^{left}$, |

The invention claimed is:

1. A method of annotating frames of a time sequence of frames captured by at least one travelling vehicle, the method comprising, in a frame processing system:
   determining a three-dimensional (3D) road model for an area captured in the time sequence of frames;
   receiving first annotation data denoting a known 3D location of a moving object for a first frame of the time sequence of frames; and
   automatically generating second annotation data for marking an expected moving object location in at least a second frame of the time sequence of frames, by assuming the moving object moves along an expected path determined from the known 3D location and the 3D road model.

2. The method of claim 1, wherein the frames are 2D images.

3. The method of claim 1, wherein the 3D location of the moving object is determined for the first frame based on an imposed geometric restriction on an elevation of the known 3D location relative to a road surface of the 3D road model.

4. The method of claim 3, wherein the geometric restriction restricts the known 3D location to a predetermined zero or non-zero elevation relative to the road surface of the 3D road model.

5. The method of claim 3, wherein a 3D annotation element is located at an initial 3D location, the 3D annotation element is geometrically projected into the image plane of the first frame, and the 3D location is adjusted whilst said geometric restriction is maintained to match the projection of the 3D annotation element to the moving object in the first frame, thereby determining the known 3D location of the moving object.

6. The method of claim 5, wherein the 3D location is manually adjusted to manually match the projection to the moving object in the image plane whilst maintaining said geometric restriction.

7. The method of claim 5, wherein the second annotation data is determined by transforming the 3D annotation element to move it along the expected path to the expected moving object location in 3D space.

8. The method of claim 7, wherein the second annotation data comprises 2D annotation data for marking the expected moving object location in the image plane of the second frame, the 2D annotation data determined by projecting the 3D annotation element at the expected moving object location into the image plane of the second frame.

9. The method of claim 5, wherein first 2D annotation data is determined for the first frame by projecting the 3D annotation element at the known 3D location into the image plane of the first frame.

10. The method of claim 1, wherein the expected path is determined based on a speed of the moving object and a time interval between the first and second frames.

11. The method of claim 10, wherein the speed is assumed to match a speed of the travelling vehicle.

12. The method of claim 10, wherein an additional known 3D location of the moving object is determined for a third of the frames, and the known 3D location and the additional known 3D location are used to estimate the speed based on a time interval between the first and third frames.

13. The method of claim 1, wherein the expected road model is determined by reconstructing a path travelled by the vehicle whilst capturing the time sequences of images, the 3D road model exhibiting a road shape that corresponds to the shape of the reconstructed vehicle path.

14. The method of claim 13, wherein the expected path of the moving object is defined as having zero vertical offset from the reconstructed vehicle path in the direction of a road surface normal and a fixed lateral offset from the reconstructed vehicle path.

15. The method of claim 1, wherein a direction of movement is inferred for the moving object based on its location relative to a road structure of the 3D road model.

16. The method of claim 1, wherein the annotated frames are used to train a machine learning model in a supervised training process.

17. The method of claim 1, wherein location data captured in association with the time sequence of frames is used to match the time sequence of frames to an area of a map in order to determine a road shape for the 3D road model.

18. The method of claim 1, wherein the second annotation data takes the form of a 3D annotation element located at the expected moving object location in 3D space.

19. A processing computer system comprising:
one or more processors configured to:
receive a time sequence of frames captured by at least one travelling vehicle;
determine a three-dimensional (3D) road model for an area captured in the time sequence of frames;
receive first annotation data denoting a known 3D location of a moving object for a first frame of the time sequence of frames; and
automatically generate second annotation data for marking an expected moving object location in at least a second frame of the time sequence of frames, by assuming the moving object moves along an expected path determined from the known 3D location and the 3D road model.

20. At least one computer-readable storage medium having encoded thereon executable instructions which, when executed on one or more processors of a computer system, cause the computer system to:
receive a time sequence of frames captured by at least one travelling vehicle;
determine a three-dimensional (3D) road model for an area captured in the time sequence of frames;
receive first annotation data denoting a known 3D location of a moving object for a first frame of the time sequence of frames; and
automatically generate second annotation data for marking an expected moving object location in at least a second frame of the time sequence of frames, by assuming the moving object moves along an expected path determined from the known 3D location and the 3D road model.

* * * * *